US011747975B2

(12) United States Patent
Nilo et al.

(10) Patent No.: US 11,747,975 B2
(45) Date of Patent: Sep. 5, 2023

(54) DEVICES, METHODS, AND GRAPHICAL USER INTERFACES FOR TOUCH INPUT PROCESSING

(71) Applicant: Apple Inc., Cupertino, CA (US)

(72) Inventors: Bruce D. Nilo, Cupertino, CA (US); Christopher K. Thomas, Sunnyvale, CA (US); Dominik Wagner, San Francisco, CA (US); Michael T. Turner, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/679,036

(22) Filed: Feb. 23, 2022

(65) Prior Publication Data

US 2022/0179535 A1 Jun. 9, 2022

Related U.S. Application Data

(63) Continuation of application No. 16/522,536, filed on Jul. 25, 2019, now Pat. No. 11,269,508, which is a
(Continued)

(51) Int. Cl.
*G06F 17/00* (2019.01)
*G06F 3/0488* (2022.01)
(Continued)

(52) U.S. Cl.
CPC .......... *G06F 3/0488* (2013.01); *G06F 3/0486* (2013.01); *G06F 3/04842* (2013.01); *G06F 3/04845* (2013.01)

(58) Field of Classification Search
CPC .............. G06F 3/0488; G06F 3/04842; G06F 3/04845; G06F 3/0486; G06F 3/0481; G06F 3/0484
See application file for complete search history.

(56) References Cited

U.S. PATENT DOCUMENTS 5,564,112 A 10/1996 Hayes et al.
9,250,788 B2 2/2016 Whiddett
(Continued)

FOREIGN PATENT DOCUMENTS

WO WO 2016/196042 A1 12/2016

OTHER PUBLICATIONS

Ameur, Safa, Anouar Ben Khalifa, and Mohamed Salim Bouhlel. "A comprehensive leap motion database for hand gesture recognition." 2016 7th international conference on sciences of electronics, technologies of information and telecommunications (SETIT). IEEE, 2016 (Year: 2016).*
(Continued)

*Primary Examiner* — Andrew T McIntosh
(74) *Attorney, Agent, or Firm* — Morgan, Lewis & Bockius LLP

(57) ABSTRACT

An electronic device, while displaying a user interface of an application, detects a user input on a portion of the user interface associated with a plurality of gesture recognizers. A first set of standard gesture recognizers are associated with the portion of the user interface by the application; a second set of supplemental gesture recognizers are associated with the portion of the user interface by a system process; and a first failure requirement determines which gesture recognizers must fail before other gesture recognizers can recognize a user input. In one example, the first failure requirement is that a particular standard gesture recognizer (e.g., an intensity-based gesture recognizer) must fail before a particular supplemental gesture recognizer (e.g., a drag start gesture recognizer) can recognize a user input.

48 Claims, 46 Drawing Sheets

Related U.S. Application Data continuation of application No. 15/917,467, filed on Mar. 9, 2018, now Pat. No. 10,409,477.

(60) Provisional application No. 62/507,096, filed on May 16, 2017.

(51) Int. Cl.
    *G06F 3/04845*      (2022.01)
    *G06F 3/04842*      (2022.01)
    *G06F 3/0486*      (2013.01)

(56) References Cited

U.S. PATENT DOCUMENTS

| | | | |
|---|---|---|---|
| 2007/0252821 A1* | 11/2007 | Hollemans | G06F 3/0488 345/173 |
| 2009/0315826 A1* | 12/2009 | Lin | G06F 3/04883 345/157 |
| 2011/0173574 A1* | 7/2011 | Clavin | G06F 3/017 715/863 |
| 2011/0181526 A1* | 7/2011 | Shaffer | G06F 9/451 345/173 |
| 2011/0216015 A1 | 9/2011 | Edwards | |
| 2012/0001861 A1 | 1/2012 | Townsend et al. | |
| 2012/0133579 A1 | 5/2012 | Prieur et al. | |
| 2013/0038552 A1 | 2/2013 | Chan et al. | |
| 2013/0321349 A1 | 12/2013 | Kim et al. | |
| 2013/0346912 A1 | 12/2013 | Buening | |
| 2014/0325410 A1 | 10/2014 | Jung et al. | |
| 2016/0054793 A1* | 2/2016 | Kasahara | G06F 3/0412 345/633 |
| 2016/0070399 A1 | 3/2016 | Hotelling | |
| 2016/0357388 A1 | 12/2016 | Paine et al. | |
| 2018/0335922 A1 | 11/2018 | Nilo et al. | |
| 2019/0346986 A1 | 11/2019 | Nilo et al. | |

OTHER PUBLICATIONS

Maskrey, Molly, et al. "Taps, Touches, and Gestures." Beginning iPhone Development with Swift 3: Exploring the iOS SDK (2016): 597-620 (Year: 2016).*

Kammer et al., "Taxanomy and Overview of Multi-touch Framework: Architecture, Scope and Features", openexhibits.org, Jan. 2010, 5 pages.
First Action Interview, dated May 8, 2019, received in U.S. Appl. No. 15/917,467, 4 Pages.
Notice of Allowance, dated Jun. 12, 2019, received in U.S. Appl. No. 15/917,467, 27 Pages.
Office Action, dated Sep. 7, 2020, received in Chinese Patent Application No. 201911262546.3, which corresponds with U.S. Appl. No. 15/917,467, 9 pages.
Notice of Allowance, dated Jan. 8, 2021, received in Chinese Patent Application No. 201911262546.3, which corresponds with U.S. Appl. No. 15/917,467, 4 pages.
Patent, dated Feb. 2, 2021, received in Chinese Patent Application No. 201911262546.3, which corresponds with U.S. Appl. No. 15/917,467, 6 pages.
Office Action, dated Apr. 17, 2018, received in Danish Patent Application No. 20177371, which corresponds with U.S. Appl. No. 15/917,467, 4 pages.
Office Action, dated Jan. 7, 2019, received in Danish Patent Application No. 201770371, which corresponds with U.S. Appl. No. 15/917,467, 2 pages.
Intention to Grant, dated May 1, 2019, received in Danish Patent Application No. 201770371, which corresponds with U.S. Appl. No. 15/917,467, 2 pages.
Intention to Grant, dated Sep. 11, 2019, received in Danish Patent Application No. 201770371, which corresponds with U.S. Appl. No. 15/917,467, 2 pages.
Notice of Allowance, dated Oct. 24, 2019, received in Danish Patent Application No. 201770371, which corresponds with U.S. Appl. No. 15/917,467, 2 pages.
Patent, dated Nov. 27, 2019, received in Danish Patent Application No. 201770371, which corresponds with U.S. Appl. No. 15/917,467, 5 pages.
Office Action, dated Jul. 15, 2021, received in U.S. Appl. No. 16/522,536, 6 pages.
Notice of Allowance, dated Nov. 1, 2021, received in U.S. Appl. No. 16/522,536, 11 pages.
International Search Report and Written Opinion, dated Aug. 20, 2018, received in International Patent Application No. PCT/US2018/032917, which corresponds with U.S. Appl. No. 15/917,467, 12 pages.

* cited by examiner

700

At an electronic device with a display and a touch-sensitive surface:

702 Display, on the display, a user interface for a first application that includes a plurality of user interface objects 704 While displaying the user interface for the first application, receiving, at the first application, information that describes a first touch detected at a location on the touch-sensitive surface that corresponds to a respective user interface object of the plurality of user interface objects in the first application 706 In response to receiving the information that describes the first touch: in accordance with a determination that the first touch meets predefined criteria associated with initiating a respective type of interface operation:

(A1) (A2)

708 Initiating a user interface operation of the respective type involving the respective user interface object; (F)

710 While the first touch continues to be detected on the touch-sensitive surface and while the user interface operation involving the respective user interface object continues:

712 Receiving, at the first application, instructions to ignore the first touch with respect to user interface operations other than the respective type of interface operation (E)

714 Ignoring, by the first application, the first touch with respect to user interface operations other than the respective type of interface operation (B)

710 While the first touch continues to be detected on the touch-sensitive surface and while the user interface operation involving the respective user interface object continues:

---
750 While the user interface operation involving the respective user interface object continues, receiving information that describes a change in a second touch on the touch-sensitive surface at a location that corresponds to the first application

---

752 In response to detecting the change in the second touch, processing the information that describes the change in the second touch using one or more gesture recognizers associated with the first application without regard to the first touch

---

754 Receiving, at the first application, information that describes a second touch distinct from the first touch

---

756 In response to receiving the information that describes the second touch, and in accordance with a determination that the second touch meets predefined add criteria associated with the user interface operation:

758 Receiving, at the first application, instructions to ignore the second touch with respect to user interface operations other than the respective type of interface operation

760 Ignoring, by the first application, the second touch with respect to user interface operations other than the respective type of interface operation

762 The predefined add criteria include a criterion that is met when a distance between the first touch and the second touch is less than a predefined proximity threshold

Figure 7D

```
┌─────────────────────────────────────────────────────────────────┐
│ 778  The instructions received at the first application to ignore the first touch │
│ with respect to user interface operations other than the respective type of │
│         interface operation include a touch cancel event        │
└─────────────────────────────────────────────────────────────────┘
                                    │
                                    ▼
┌─────────────────────────────────────────────────────────────────┐
│ 780  In response to receiving the touch cancel event, forgoing performance of │
│ user interface operations other than the respective type of interface operation, │
│     and failing to recognize the first touch as a gesture other than one of a │
│   predefined set of gestures associated with the respective type of interface │
│                                  operation                       │
└─────────────────────────────────────────────────────────────────┘
```

┌─────────────────────────────────────────────────────────────────┐
│ 708 Initiating a user interface operation of the respective type involving the
│                 respective user interface object;
│
│
│ ┌───────────────────────────────────────────────────────────┐
│ │ 782  Initiating a user interface operation of the respective type involving │
│ │    the respective user interface object includes providing, to the first │
│ │    application, a unique session identifier identifying the user interface │
│ │   operation of the respective type and the respective user interface object │
│ └───────────────────────────────────────────────────────────┘
│                          │
│                          ▼
│ ┌───────────────────────────────────────────────────────────┐
│ │    784  The unique session identifier is associated with additional │
│ │  information about the drag operation, including one or more of: a total │
│ │  number of user interface objects, including the respective user interface │
│ │  object, involved in the user interface operation of the respective type, and │
│ │   one or more content types of user interface objects involved in the user │
│ │              interface operation of the respective type │
│ └───────────────────────────────────────────────────────────┘
│
│ ┌───────────────────────────────────────────────────────────┐
│ │   786  The user interface operation of the respective type has an │
│ │ associated operation phase value that describes a current phase of the │
│ │ user interface operation, and wherein the phase value is selected from │
│ │           the group consisting of: exit, enter, and within │
│ └───────────────────────────────────────────────────────────┘
└─────────────────────────────────────────────────────────────────┘

At an electronic device with a display and a touch-sensitive surface:

802 Display, on the display, a user interface including a plurality of views, including:
 a first view that is associated with a first set of one or more standard gesture recognizers used to process touch inputs that are directed to the first view; and
 a second view that is associated with a second set of one or more standard gesture recognizers used to process touch inputs that are directed to the second view;
 wherein one or more of the plurality of views are associated with a first interaction identifier that indicates that a first set of one or more supplemental gesture recognizers can be added to the corresponding view (A)

804 Detect, via the touch-sensitive surface, a touch input at a location on the touch-sensitive surface that corresponds to a respective view of the plurality of views (B1) (B2) (B3)

806 In response to detecting, via the touch-sensitive surface, the touch input:

808 In accordance with a determination that the touch input meets supplemental-gesture-recognizer addition criteria, wherein the supplemental-gesture-recognizer addition criteria include a criterion that is met when the respective view has the first interaction identifier: (C)

810 Add the first set of one or more supplemental gesture recognizers associated with the first interaction identifier to the respective view 812 Process the touch input with the one or more supplemental gesture recognizers and the one or more standard gesture recognizers associated with the respective view 814 In accordance with a determination that the touch input does not meet the supplemental-gesture-recognizer addition criteria, process the touch input at the respective view without adding the first set of one or more supplemental gesture recognizers associated with the first interaction identifier to the respective view (D)

At an electronic device with a display and a touch-sensitive surface:

902 Display, on the display, a user interface of an application

904 While displaying the user interface of the application, detecting a user input that corresponds to a portion of the user interface of the application that is associated with a plurality of gesture recognizers, wherein:
 a first set of one or more standard gesture recognizers of the plurality of gesture recognizers were associated with the portion of the user interface by the application;
 a second set of one or more supplemental gesture recognizers in the plurality of gesture recognizers were associated with the portion of the user interface by a system process; and
 a first failure requirement involving a first standard gesture recognizer and a first supplemental gesture recognizer were associated with the portion of the user interface by the system process

906 In response to detecting the user input, processing the user input in accordance with the first standard gesture recognizer, the first supplemental gesture recognizer, and the first failure requirement

Figure 9A (A3)

---
940 The first failure requirement includes a requirement that the first standard gesture recognizer fail in order for the first supplemental gesture recognizer to successfully recognize a gesture ---
942 The first supplemental gesture recognizer is an intensity-based gesture recognizer, and the first supplemental gesture recognizer is a drag start gesture recognizer

---

(A4)

---
944 The first supplemental gesture recognizer is a drag start gesture recognizer, and the drag start gesture recognizer includes, in order for a drag start gesture to be recognized:
 a requirement that the user input include a contact at a location that corresponds to a respective user interface element in the user interface for at least a predefined period of time; and
 a requirement that, subsequent to the location of the contact corresponding to the respective user interface element for at least the predefined period of time, a change in location of the contact satisfy a lateral displacement threshold

---

(A5)

---
946 The first supplemental gesture recognizer is a drag start gesture recognizer, and the drag start gesture recognizer includes, in order for a drag start gesture to be recognized:
 a requirement that the user input include two concurrent contacts, on the touch-sensitive surface, at locations that correspond to a respective user interface element in the user interface; and
 a requirement that changes in locations of the two concurrent contacts satisfy a lateral displacement threshold

---

(A6)

---
948 The first supplemental gesture recognizer is a drag start gesture recognizer, and the drag start gesture recognizer includes, in order for a drag start gesture to be recognized, a requirement that the user input include two concurrent contacts, at locations that correspond to a respective user interface element in the user interface, and liftoff of the two concurrent contacts within a predefined period of time

DEVICES, METHODS, AND GRAPHICAL USER INTERFACES FOR TOUCH INPUT PROCESSING

RELATED APPLICATIONS

This application is a continuation of U.S. application Ser. No. 16/522,536, filed Jul. 25, 2019, which is continuation of U.S. application Ser. No. 15/917,467, filed Mar. 9, 2018, now U.S. Pat. No. 10,409,477, which claims priority to U.S. Provisional Application Ser. No. 62/507,096, filed May 16, 2017, all of which are incorporated by reference herein in their entireties.

TECHNICAL FIELD

This relates generally to electronic devices with touch-sensitive surfaces, including but not limited to electronic devices with touch-sensitive surfaces that use heuristics and other gesture recognition techniques to distinguish between a variety of touch inputs, including drag and drop gestures, long press gestures, swipe gestures, and the like.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary manipulations include dragging and dropping objects or user interface elements, such as to move information from one application to another, or from one part of an application or data structure to another. Other manipulations include selecting user interface objects by touching them in a predefined manner, launching applications by tapping or otherwise interacting with corresponding application launch icons or other user interface elements, accessing application features by performing swipe, drag, tap, pinch, long press, deep press (e.g., with intensity above a threshold) and other touch inputs on respective user interface elements of an application's user interface.

Disambiguating between various touch-based gestures, such as drag and drop gestures, springloading gestures (e.g., to open an object so as to see elements of the object), and swipe and long press gestures is very important, so that the device or system perform actions corresponding to the user's intent. Such disambiguation can be challenging, given the sometimes subtle differences between touch-based gestures.

While gesture recognizers with distinct event or gesture definitions have been used to help with such disambiguation. Disambiguating between touch-based drag and drop gestures, and spring loading (sometimes written "springloading") gestures (e.g., to open an object so as to see elements of the object) on the one hand, and swipe and long press gestures on the other hand, continues to be challenging, and sometimes cumbersome and inefficient. Such inefficiency can relate both to the mechanisms for disambiguation, and the delivery of touch input information to various software mechanisms once disambiguation, or at least a portion of the disambiguation, has been achieved. Furthermore, as devices with touch-based input mechanisms offer more and more features, the number of active gesture recognizers for at least some applications or application views has grown to the point of making such mechanisms cumbersome and inefficient in circumstances in which only a portion of those gesture recognizers are needed to handle user inputs.

SUMMARY

Accordingly, there is a need for electronic devices with faster, more efficient methods and interfaces for handling drag and drop gestures, and corresponding drag and drop operations (and optionally springloading operations as well). Such methods and interfaces optionally complement or replace conventional methods for touch input processing and gesture recognition and handling. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and optionally one or more sensors to detect intensities of contacts with the touch-sensitive surface. The method includes: displaying, on the display, a user interface for a first application that includes a plurality of user interface objects, and while displaying the user interface for the first application, receiving, at the first application, information (e.g., one or more touch events) that describes a first touch detected at a location on the touch-sensitive surface that corresponds to a respective user interface object of the plurality of user interface objects in the first application. The method includes, in response to receiving the information that describes the first touch, and in accordance with a determination that the first touch meets predefined criteria associated with initiating a respective type of interface operation: initiating a user interface operation of the respective type involving the respective user interface object; while the first touch continues to be detected on the touch-sensitive surface and while the user interface operation involving the respective user interface object continues, receiving, at the first application, instructions to ignore the first touch with respect to user interface operations other than the respective type of interface operation, and ignoring, by the first application, the first touch with respect to user interface operations other than the respective type of interface operation. In some embodiments, the respective type of interface operation is a drag operation, for dragging an object from the first application or a view of the first application; or a drag and drop operation, in which a dragged object is dropped into a different application or application view than the one from which it was dragged; or a springloading operation, in which a view or container in which content can be stored is opened or a control of a view or object is activated.

In accordance with some embodiments, a method is performed at an electronic device with a display, a touch-sensitive surface, and optionally one or more sensors to detect intensities of contacts with the touch-sensitive surface. The method includes: displaying, on the display, a user interface including a plurality of views, including a first view that is associated with a first set of one or more standard gesture recognizers used to process touch inputs that are directed to the first view, and a second view that is associated with a second set of one or more standard gesture recognizers used to process touch inputs that are directed to the second view, wherein one or more of the plurality of views are associated with a first interaction identifier (e.g., a drag, drop, or springloading interaction identifier) that indicates that a first set of one or more supplemental gesture recognizers can be added to the corresponding view. The method further includes detecting, via the touch-sensitive surface, a touch input at a location on the touch-sensitive surface that corresponds to a respective view of the plurality of views; and in response to detecting, via the touch-sensitive surface, the touch input: in accordance with a determination that the touch input meets supplemental-gesture-recognizer addition criteria, wherein the supplemental-gesture-recognizer addition criteria include a criterion that is met when the respective view has the first interaction identifier, adding the first set of one or more supplemental gesture recognizers associated with the first interaction identifier to the respective view; and processing the touch input with the one or more supplemental gesture recognizers and the one or more standard gesture recognizers associated with the respective view. The method further includes, in accordance with a determination that the touch input does not meet the supplemental-gesture-recognizer addition criteria, processing the touch input at the respective view without adding the first set of one or more supplemental gesture recognizers associated with the first interaction identifier to the respective view.

In accordance with some embodiments, a method is performed at an electronic device with a display, a touch-sensitive surface, and optionally one or more sensors to detect intensities of contacts with the touch-sensitive surface. The method includes: displaying, on the display, a user interface of an application; and while displaying the user interface of the application, detecting a user input that corresponds to a portion of the user interface of the application that is associated with a plurality of gesture recognizers, wherein: a first set of one or more standard gesture recognizers of the plurality of gesture recognizers were associated with (e.g., assigned to) the portion of the user interface by the application; a second set of one or more supplemental gesture recognizers in the plurality of gesture recognizers were associated with (e.g., assigned to) the portion of the user interface by a system process (e.g., an application independent process); and a first failure requirement involving a first standard gesture recognizer and a first supplemental gesture recognizer were associated with (e.g., assigned to) the portion of the user interface by the system process. The method further includes, in response to detecting the user input, processing the user input in accordance with the first standard gesture recognizer, the first supplemental gesture recognizer, and the first failure requirement. For example, in some embodiments, the first set of one or more standard gesture recognizers and the second set of one or more gesture recognizers are arranged in a gesture recognition hierarchy, wherein the first failure requirement includes a requirement that a first respective gesture recognizer fail in order for a second respective gesture recognizer to successfully recognize a gesture, wherein the first respective gesture recognizer is at a higher level in the gesture recognition hierarchy than the second respective gesture recognizer.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein.

In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein.

In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein.

In accordance with some embodiments, an electronic device includes: a display, a touch-sensitive surface, and optionally one or more sensors to detect intensity of contacts with the touch-sensitive surface; and means for performing or causing performance of the operations of any of the methods described herein.

In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for processing touch-based inputs, including drag and drop gestures, long press gestures, and other gestures that could potentially be validly recognized for use in the same application, or application view, thereby increasing the effectiveness, efficiency, and user satisfaction with such devices. Such methods and interfaces may complement or replace conventional methods for processing touch inputs in such electronic devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7F are flow diagrams illustrating a method of processing touch inputs recognized as drag gestures, in accordance with some embodiments.

FIGS. 8A-8E are flow diagrams illustrating a method of dynamically adding supplemental gesture recognizers to an application or application view in response to detecting a touch input when specified criteria are met, in accordance with some embodiments.

FIGS. 9A-9D are flow diagrams illustrating a method of establishing failure dependencies between a first set of standard gesture recognizers associated with a portion of the user interface of an application and a second set of supplemental gesture recognizers associated with the same portion of the user interface of the application, in accordance with some embodiments.

DESCRIPTION OF EMBODIMENTS

Figure 1:
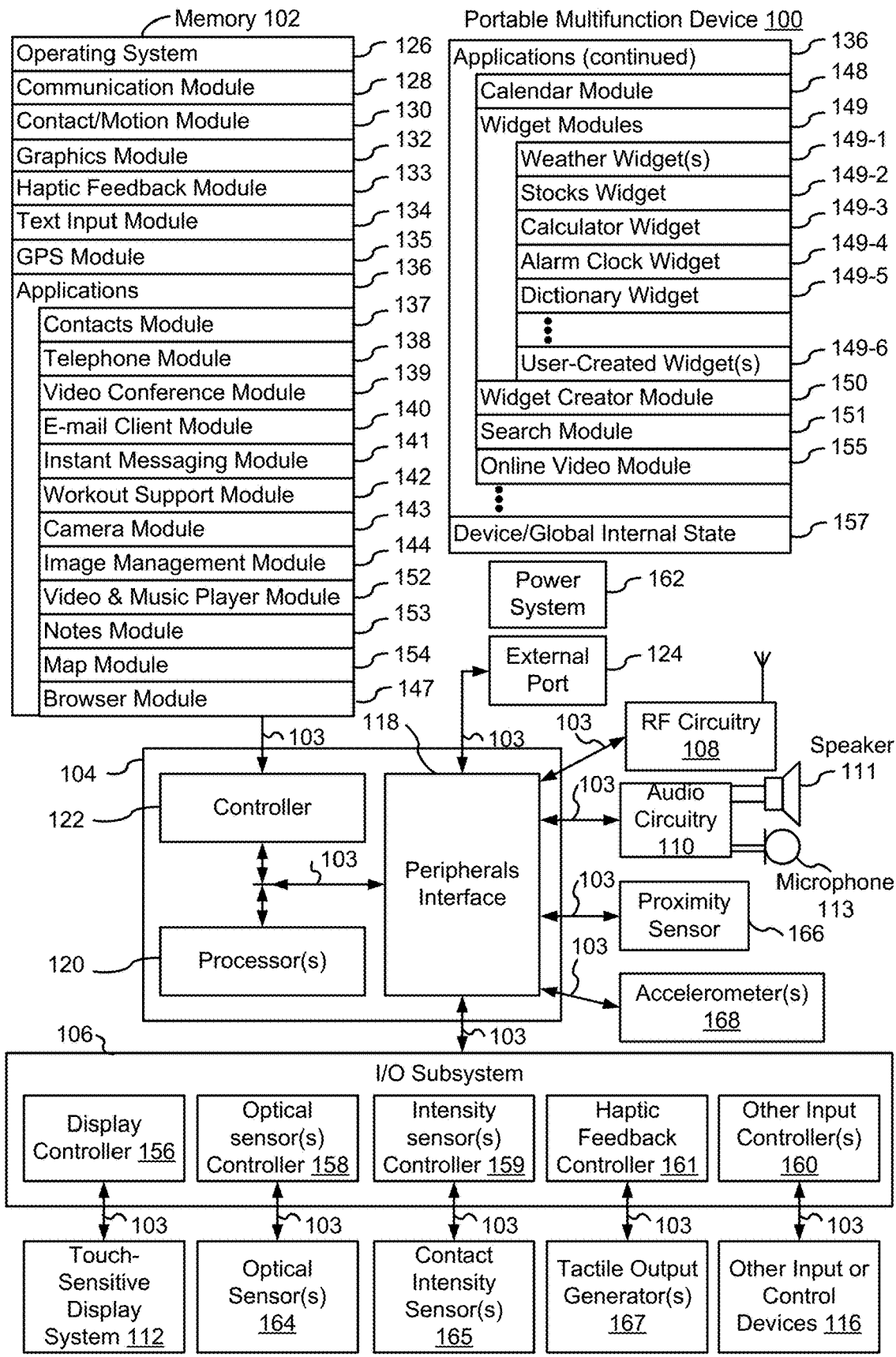
FIG. 1 is a block diagram illustrating a portable multifunction device with a touch-sensitive display in accordance with some embodiments.

Many electronic devices have graphical user interfaces and touch-sensitive surfaces, whether integrated with a display or otherwise, for receiving touch inputs by a user. As the number of touch input-based gestures increases, disambiguation between various possible gestures becomes both more difficult, and more important for successful and efficient use of such electronic devices. In fact, multiple gestures useable in the same user-interface region may begin with the same initial touch characteristics, such as a stationary touch that remains stationary (e.g., moves less than a predefined distance or amount) for at last a predefined initial amount of time. One mechanisms to help disambiguate between such gestures is to use gesture recognizers, each for recognizing a respective gesture or type of gesture, and to establish failure requirements that certain gesture recognizers fail to recognize a user input before other gesture recognizers are allowed to successfully recognizer the user input as a particular gesture. For example, when a user interface region accepts both a long press input for initiating a first operation, and a drag input for starting a drag and drop operation, the gesture recognizer for recognizing long press gestures may be made dependent on the failure of a drag start gesture recognizer for recognizing the start of a drag and drop operation.

In another aspect, certain types of gesture recognizers may be added by an application to user interface regions for the application, while supplemental gesture recognizers may be added by a system process to the same user interface regions when certain criteria are satisfied. In this way, the number of gesture recognizers established for a particular user interface region may be kept relatively low until the supplemental gesture recognizers are needed, or potentially needed, as indicated by the aforementioned criteria being satisfied. For example, gesture recognizers for handling drag and drop operations may be added to user interface region, as supplemental gesture recognizers, when they are needed or potentially needed.

In yet another aspect, interaction identifiers are associated with applications, or application views, to indicate which supplemental gesture recognizers, if any, can be added to those applications or application views. For example, only applications or application views that can participate in drag and drop operations as associated with an interaction identifier for drag operations. A second distinct interaction identifier may be used for drop interactions, since some application regions may be the source of a drag and drop operation, but not the destination, or vice versa. A third interaction identifier may be used for springloading interactions, since some, but not all application regions, may include containers that can be opened, or have controls that can be activated using a springloading gesture. In this way, only applications and views that allow certain types of gestures or operations, such as drag and drop gestures and operations, or springloading gestures and operations, are associated with corresponding interaction identifiers. The use of such interaction identifiers, and the resulting control over which application regions have supplemental gesture recognizers added to them, improves the operating efficiency of electronic devices, and also improves the responsiveness of such devices to user inputs, by reducing the number of gesture recognizers that process such user inputs.

Figure 2:
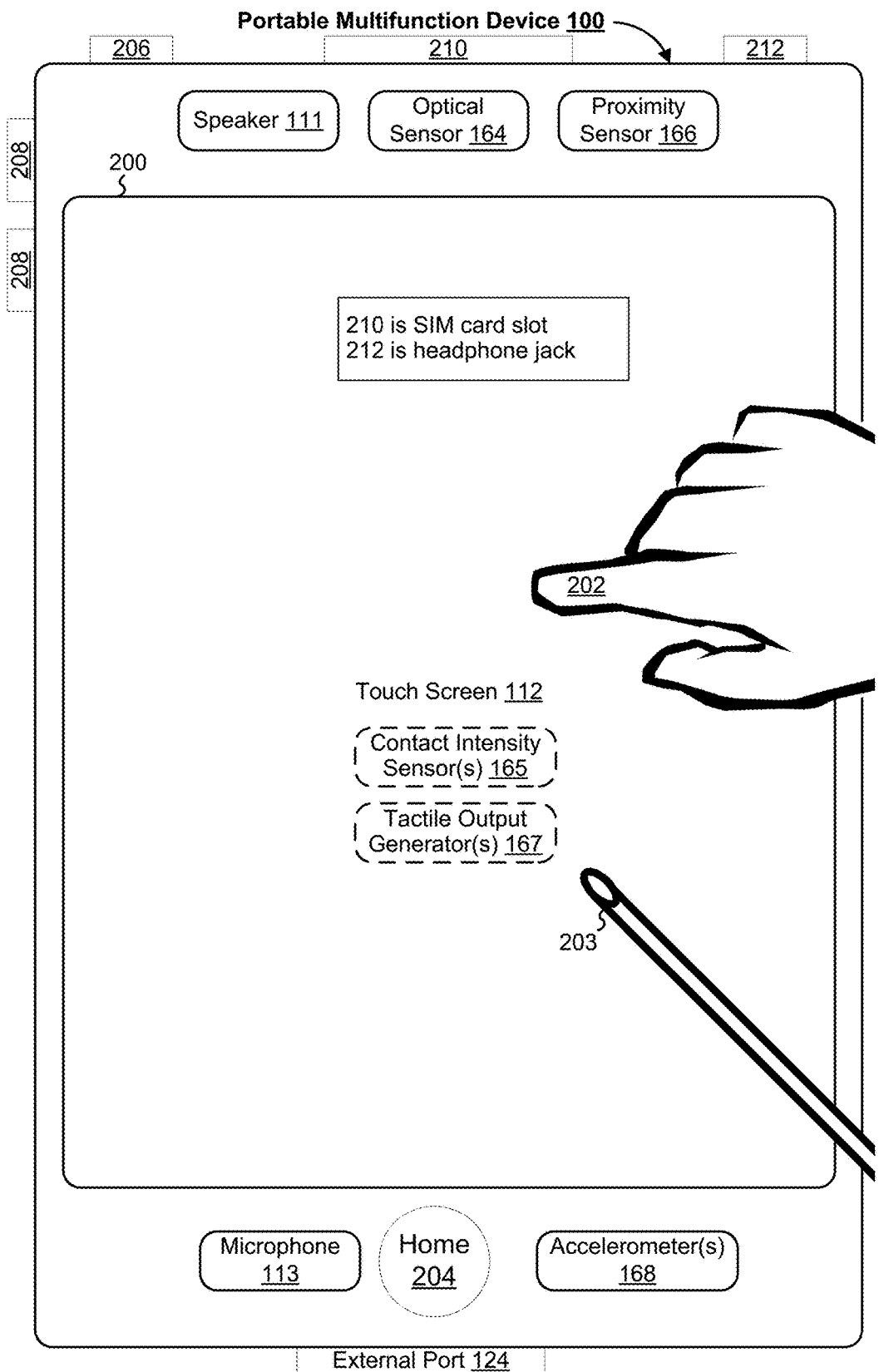
FIG. 2 illustrates a portable multifunction device having a touch screen in accordance with some embodiments.
Figure 3A:
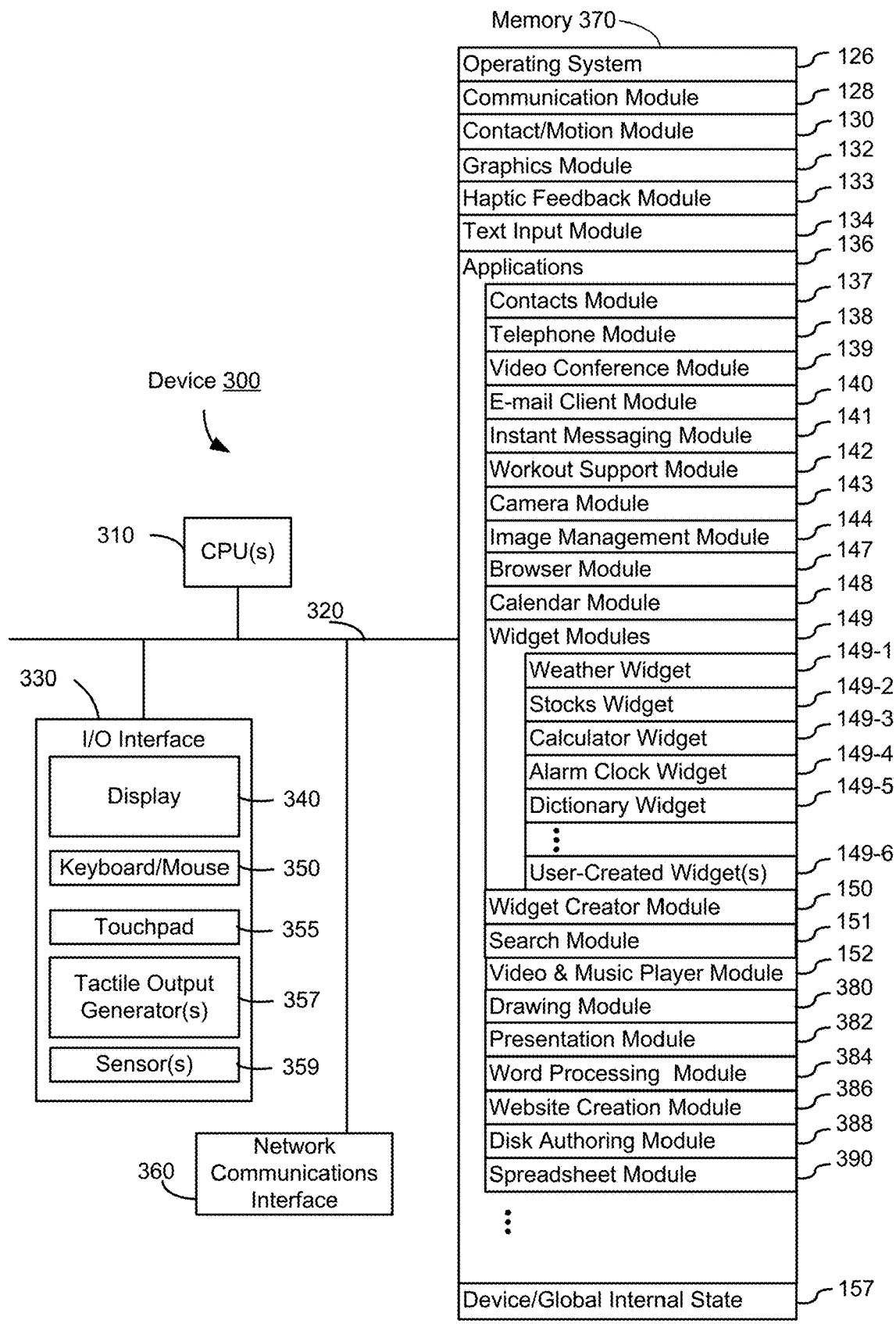
FIG. 3A is a block diagram of an example multifunction device with a display and a touch-sensitive surface in accordance with some embodiments.
Figure 3B:
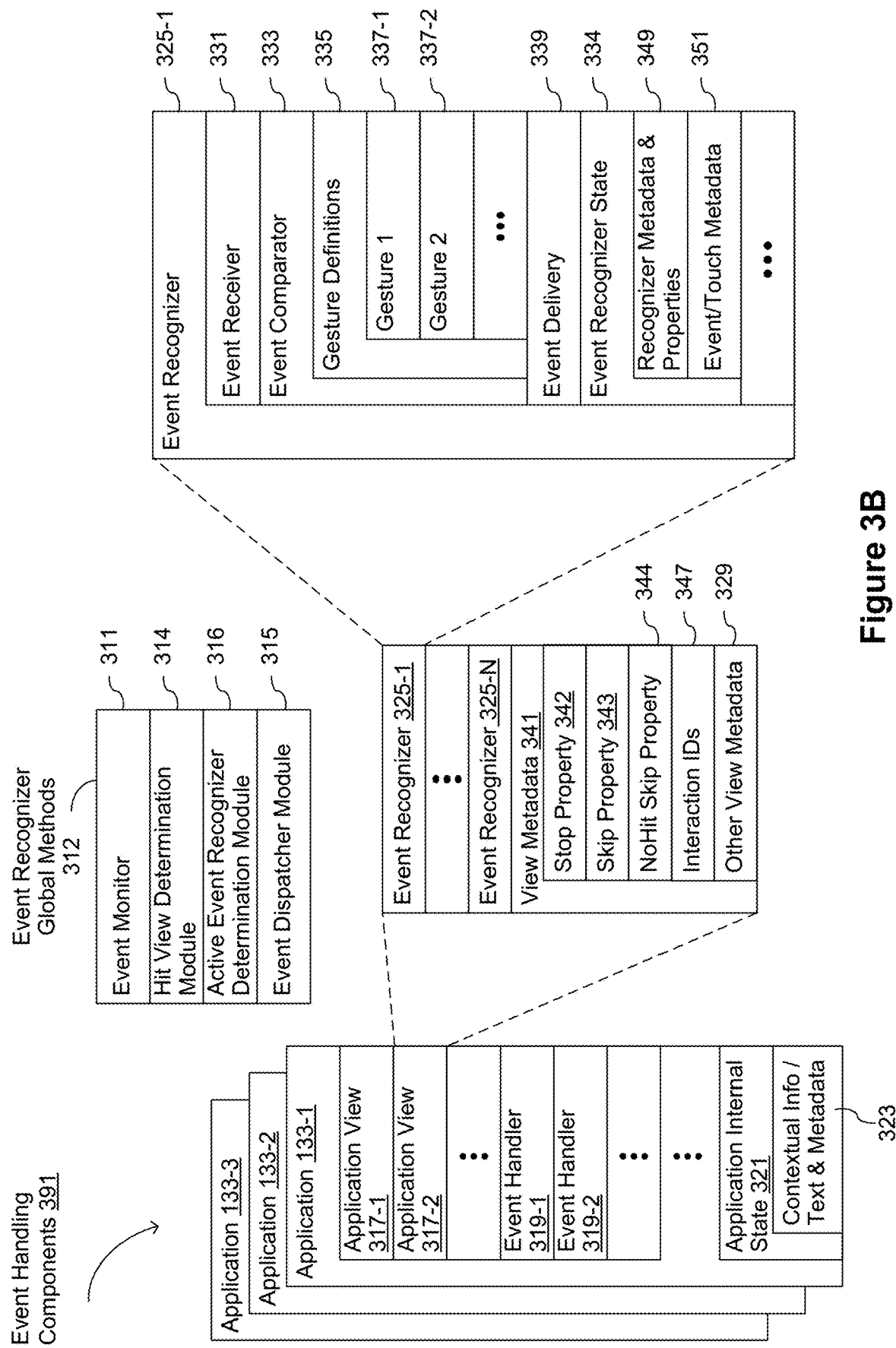
FIG. 3B is a block diagram illustrating exemplary components for event handling in accordance with some embodiments.
Figure 3C:
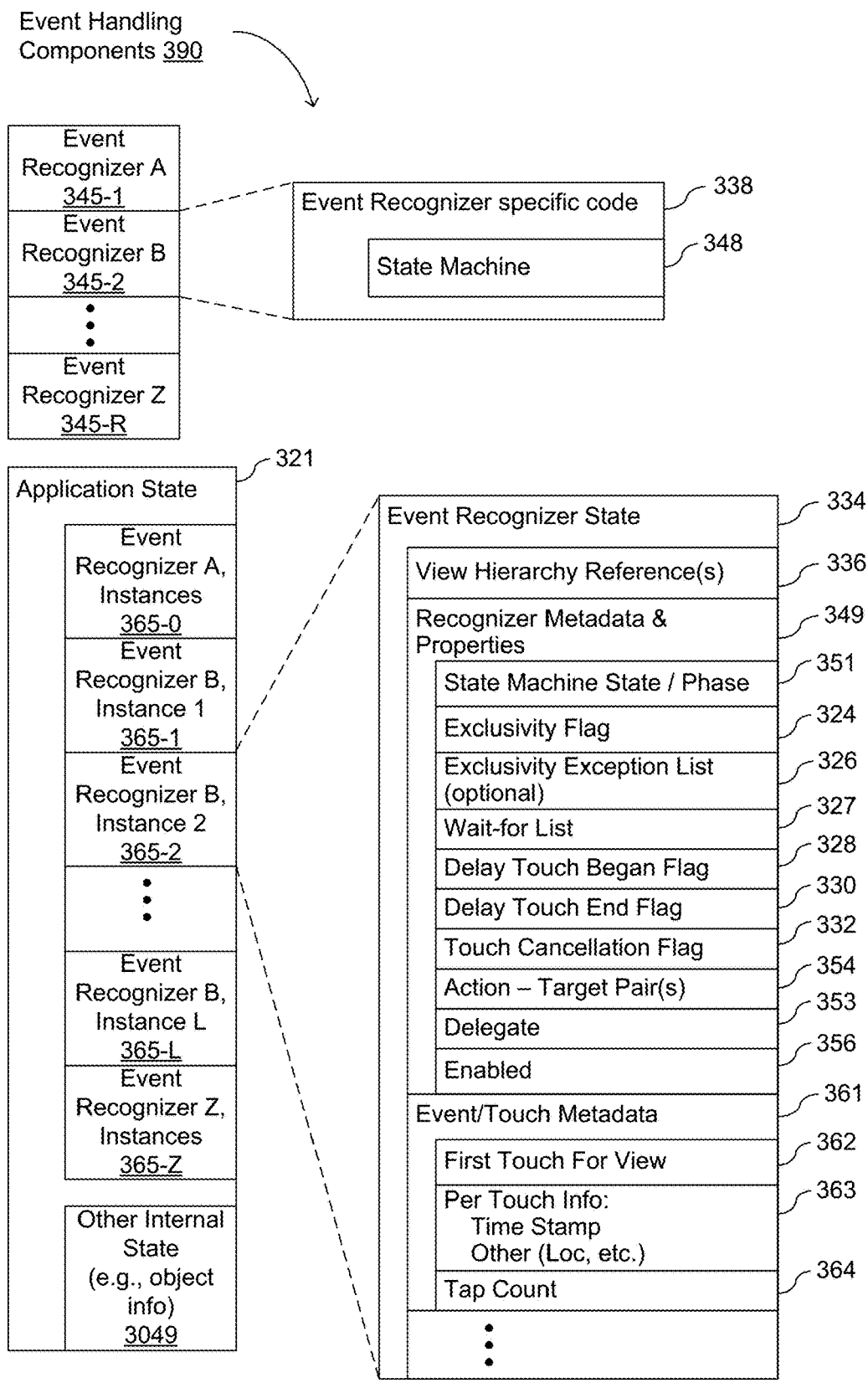
FIG. 3C is a block diagram illustrating exemplary classes and instances of gesture recognizers in accordance with some embodiments.
Figure 3D:
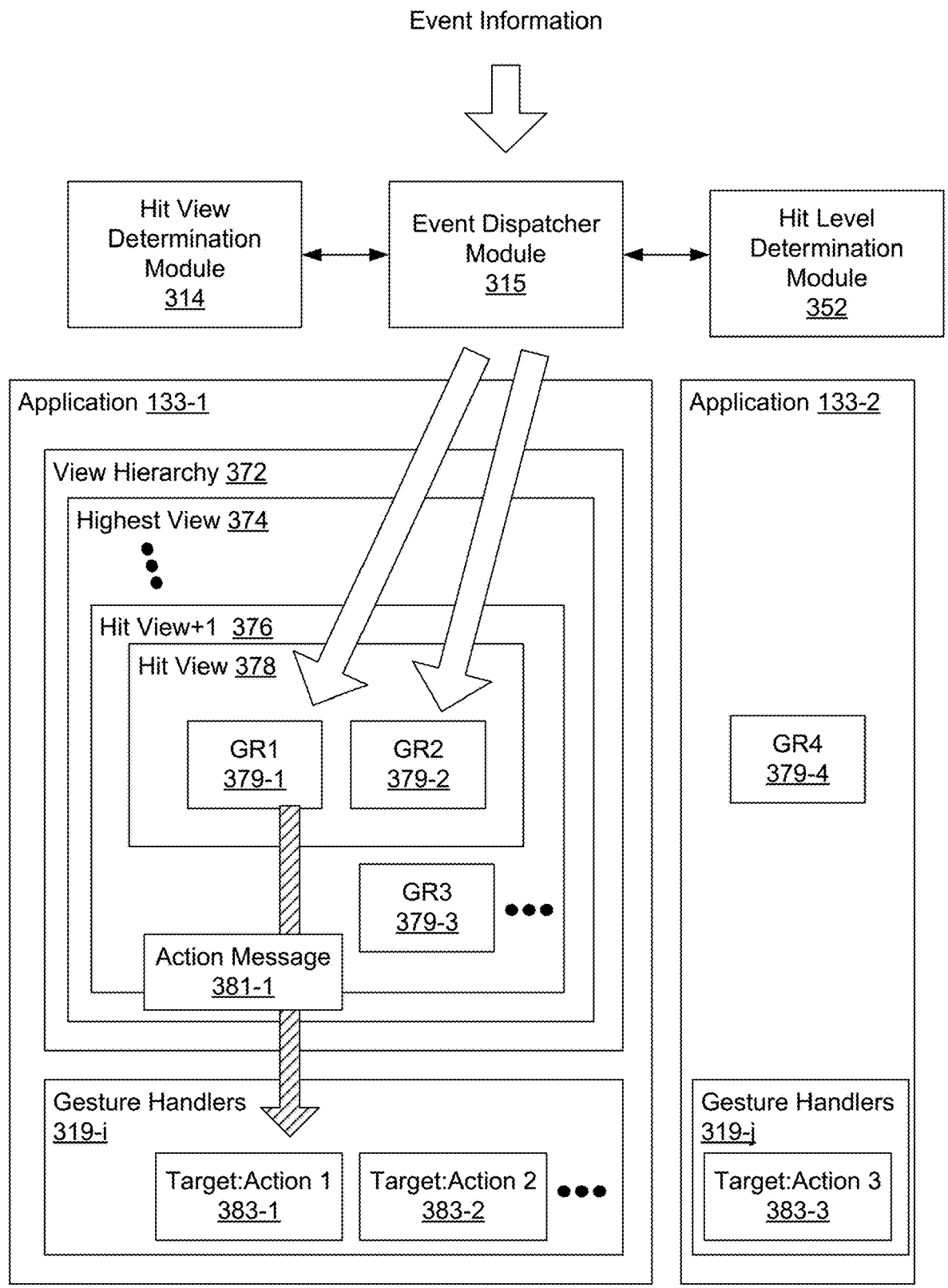
FIG. 3D is a block diagram illustrating the flow of event information in accordance with some embodiments.

FIGS. 1, 2, and 3A show example devices, FIG. 3B-3D show event and gesture recognition and touch even delivery mechanisms, FIGS. 4A-4B and 5A-5R illustrate example user interfaces for drag and drop operations. FIG. 6A-6C depict touch event and draft event generation and management mechanisms. FIGS. 7A-7F illustrate a flow diagram of a method of processing touch inputs recognized as drag gestures. FIGS. 8A-8E illustrate a flow diagram of a method of dynamically adding supplemental gesture recognizers to an application or application view. FIGS. 9A-9D illustrate a flow diagram of a method of establishing failure dependencies between a first set of standard gesture recognizers associated with a portion of the user interface of an application and a second set of supplemental gesture recognizers associated with the same portion of the user interface of the application. The user interfaces in FIGS. 5A-5R and the mechanisms shown in FIGS. 3B-3D and 6A-6C are used to illustrate the processes in FIGS. 7A-7F, 8A-8E, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1 is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" is physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1 are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1 shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1 shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1 shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1 shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1 shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1 and 3A. Device/global internal state 157 includes one or more of: active application state, indicating which applications, if any, are currently active; display state, indicating what applications, application views or other information occupy various regions of touch-sensitive display system 112; sensor state, including information obtained from the device's various sensors and other input or control devices 116; and location and/or positional information concerning the device's location and/or attitude; and optionally other state information.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

A respective software application typically has, at least during execution, an application state, indicating the state of the respective software application and its components (e.g., gesture recognizers); see application internal state 321 (FIG. 3B) described below.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156 (also called herein display system controller 156), contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 2 illustrates a portable multifunction device 100 having a touch screen (e.g., touch-sensitive display system 112, FIG. 1) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330, including display 340, which is typically a touch-screen display. I/O interface 330 also optionally includes a keyboard and/or mouse (or other pointing device) 350 and touch-sensitive touchpad 355, tactile output generator 357 for generating tactile outputs on device 300 (e.g., similar to tactile output generator(s) 167 described above with reference to FIG. 1), sensors 359 (e.g., optical sensors 164, accelerometer(s) 168, proximity sensor 166, and/or contact intensity sensors 165 described above with reference to FIG. 1). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 3B is a block diagram illustrating exemplary components for event handling (e.g., event handling components 391) in accordance with some embodiments. In some embodiments, memory 102 (FIG. 1) includes event recognizer global methods 312 and one or more applications (e.g., 133-1 through 133-3).

In some embodiments, event recognizer global methods 312 include event monitor 311, hit view determination module 314, active event recognizer determination module 316, and event dispatcher module 315. In some embodiments, event recognizer global methods 312 are located within an event delivery system in operating system 126 (FIG. 1). Alternatively, event recognizer global methods 312 are implemented in a respective application 133-1. In yet other embodiments, event recognizer global methods 312 are implemented as a stand-alone module, or a part of another module stored in memory 102 (e.g., a contact/motion module (not depicted)).

Event monitor 311 receives event information from one or more sensors 359, touch-sensitive display 340, and/or one or more input devices 350, 355. Event information includes information about an event (e.g., a user touch on touch-sensitive display 340, as part of a multi-touch gesture or a motion of device 102) and/or a sub-event (e.g., a movement of a touch across touch-sensitive display 340). For example, event information for a touch event includes one or more of: a location and time stamp of a touch. Similarly, event information for a swipe event includes two or more of: a location, time stamp, direction, and speed of a swipe. Sensors 359, touch-sensitive display 340, and input devices 128 transmit information event and sub-event information to event monitor 311 either directly or through a peripherals interface, which retrieves and stores event information. In some embodiments, sensors 359 include one or more of: proximity sensor, accelerometer(s), gyroscopes, microphone, and video camera. In some embodiments, sensors 359 also include input devices 128 and/or touch-sensitive display 340.

In some embodiments, event monitor 311 sends requests to sensors 116 and/or the peripherals interface at predetermined intervals. In response, sensors 116 and/or the peripherals interface transmit event information. In other embodiments, sensors 116 and the peripheral interface transmit event information only when there is a significant event (e.g., receiving an input beyond a predetermined noise threshold and/or for more than a predetermined duration).

Event monitor 311 receives event information and relays the event information to event dispatcher module 315. In some embodiments, event monitor 311 determines one or more respective applications (e.g., 133-1) to which to deliver the event information. In some embodiments, event monitor 311 also determines one or more respective views 317 of the one or more respective applications to which to deliver the event information.

While a view is often thought of as being a window or other portion of a user interface, more technically a view is the portion of an application that manages a particular area or region of the application's user interface. A view is typically implemented as an instance of a particular class, or one of its subclasses, and manages a rectangular area in an application window. Thus, a view is an object having an associated display region or user interface portion, and also one or more computer programs, sometimes called "methods," associated with the class of which the view is an instance. Views are responsible for drawing content, handling multitouch events, and managing the layout of any subviews. Drawing content involves using various graphics technologies to draw shapes, images, and text inside a view's rectangular area. A view responds to touch events in its rectangular area either by using gesture recognizers or by handling touch events directly. In the view hierarchy, parent views are responsible for positioning and sizing their child views and can do so dynamically. This ability to modify child views dynamically enables views to adjust to changing conditions, such as interface rotations and animations.

Views can be viewed as building blocks that a programmer or application developer uses to construct the user interface of an application. Rather than use one view to present all content for the application, several views are typically used to build a view hierarchy. Each view in the hierarchy presents a particular portion of the application's user interface and is often optimized for a specific type of content. For example, an application can have distinct views specifically for presenting images, text and other types of content.

In some embodiments, event recognizer global methods 312 also include a hit view determination module 314 and/or an active event recognizer determination module 316.

Hit view determination module 314, if present, provides software procedures for determining where an event or a sub-event has taken place within one or more views, when touch-sensitive display 340 displays more than one view. Views are made up of controls and other elements that a user can see on the display.

Another aspect of the user interface associated with a respective application (e.g., 133-1) is a set of views 317, sometimes herein called application views or user interface windows, in which information is displayed and touch-based gestures occur. The application views (of a respective application) in which a touch is detected may correspond to a particular view within a view hierarchy of the application. For example, the lowest level view in which a touch is detected may be called the hit view, and the set of events that are recognized as proper inputs may be determined based, at least in part, on the hit view of the initial touch that begins a touch-based gesture. Further discussion of view hierarchies is provided below with reference to FIG. 3D.

Hit view determination module 314 receives information related to events and/or sub-events. When an application has multiple views organized in a hierarchy, hit view determination module 314 identifies a hit view as the lowest view in the hierarchy which should handle the event or sub-event. In most circumstances, the hit view is the lowest level view in which an initiating event or sub-event occurs (i.e., the first event or sub-event in the sequence of events and/or sub-events that form a gesture). Once the hit view is identified by the hit view determination module, the hit view typically receives all events and/or sub-events related to the same touch or input source for which it was identified as the hit view. However, the hit view is not always a sole view that receives all events and/or sub-events related to the same touch or input source for which it was identified as the hit view. Stated differently, in some embodiments, another application (e.g., 133-2) or another view of the same application also receives at least a subset of the events and/or sub-events related to the same touch or input source, even though (or regardless of whether) a hit view has been determined for the touch or input source.

Active event recognizer determination module 316 determines which view or views within a view hierarchy should receive a particular sequence of events and/or sub-events. In some application contexts, active event recognizer determination module 316 determines that only the hit view should receive a particular sequence of events and/or sub-events. In other application contexts, active event recognizer determination module 316 determines that all views that include the physical location of an event or sub-event are actively involved views, and therefore determines that all actively involved views should receive a particular sequence of events and/or sub-events. In other application contexts, even if touch events and/or sub-events are entirely confined to the area associated with one particular view, views higher in the hierarchy still remain as actively involved views and thus the views higher in the hierarchy should receive a particular sequence of events and/or sub-events. Additionally, or alternatively, active event recognizer determination module 316 determines which application(s) in a programmatic hierarchy should receive a particular sequence of events and/or sub-events. Thus, in some embodiments, active event recognizer determination module 316 determines that only a respective application in the programmatic hierarchy should receive a particular sequence of events and/or sub-events. In some embodiments, active event recognizer determination module 316 determines that a plurality of applications in the programmatic hierarchy should receive a particular sequence of events and/or sub-events.

As further discussed below, in some embodiments, touches are initially treated as being attached to a particular view, or set of views, but when a drag gesture is detected, the touch or touches are "detached" and events related to the touch or touches may be delivered to other views, or the gesture recognizers of other views, as the touch or touches traverse the user interface regions associated with those other views.

Event dispatcher module 315 dispatches the event information to an event recognizer (also called herein "gesture recognizer") (e.g., event recognizer 325-1). In embodiments including active event recognizer determination module 316, event dispatcher module 315 delivers the event information to an event recognizer determined by active event recognizer determination module 316. In some embodiments, event dispatcher module 315 stores in an event queue the event information, which is retrieved by a respective event recognizer 325 (or event receiver 331) in a respective event recognizer 325).

In some embodiments, a respective application (e.g., 133-1) includes application internal state 321, which indicates the current application view(s) displayed on touch-sensitive display 340 when the application is active or executing. In some embodiments, device/global internal state 157 (FIG. 3A) is used by event recognizer global methods 312 to determine which application(s) is(are) currently active, and application internal state 321 is used by event recognizer global methods 312 to determine application views 317 to which to deliver event information.

In some embodiments, application internal state 321 includes additional information, such as one or more of: resume information to be used when application 133-1 resumes execution, user interface state information that indicates information being displayed or that is ready for display by application 133-1, a state queue for enabling the user to go back to a prior state or view of application 133-1, and a redo/undo queue of previous actions taken by the user. In some embodiments, application internal state 321 further includes contextual information/text and metadata 323.

In some embodiments, application 133-1 includes one or more application views 317, each of which has corresponding instructions for handling touch events that occur within a respective view of the application's user interface (e.g., a corresponding event handler 319, sometimes called gesture handlers). At least one application view 317 of application 133-1 includes one or more event recognizers 325. Typically, a respective application view 317 includes a plurality of event recognizers 325. In other embodiments, one or more of event recognizers 325 are part of a separate module, such as a user interface kit (not shown) or a higher level object from which application 133-1 inherits methods and other properties. In some embodiments, a respective application view 317 also includes one or more of: data updater, object updater, GUI updater, and/or event data received.

A respective application (e.g., 133-1) also includes one or more event handlers 319. Typically, a respective application (e.g., 133-1) includes a plurality of event handlers 319.

A respective event recognizer 325-1 receives event information from event dispatcher module 315 (directly or indirectly through application 133-1), and identifies an event from the event information. Event recognizer 325-1 includes event receiver 331 and event comparator 333.

The event information includes information about an event (e.g., a touch) or a sub-event (e.g., a touch movement). Depending on the event or sub-event, the event information also includes additional information, such as location of the event or sub-event. When the event or sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 333 compares the event information to one or more predefined gesture definitions (also called herein "event definitions") and, based on the comparison, determines an event or sub-event, or determines or updates the state of an event or sub-event. In some embodiments, event comparator 333 includes one or more gesture definitions 335 (as described above, also called herein "event definitions"). Gesture definitions 335 contain definitions of gestures (e.g., predefined sequences of events and/or sub-events), for example, gesture 1 (337-1), gesture 2 (337-2), and others. In some embodiments, sub-events in gesture definitions 335 include, for example, touch begin, touch end, touch movement, touch cancellation, and multiple touching. In one example, the definition for gesture 1 (337-1) is a double tap on a displayed object. The double tap, for example, comprises a first touch (touch begin) on the displayed object for a predetermined phase of the gesture, a first lift-off (touch end) for a next predetermined phase of the gesture, a second touch (touch begin) on the displayed object for a subsequent predetermined phase of the gesture, and a second lift-off (touch end) for a final predetermined phase of the gesture. In another example, the definition for gesture 2 (337-2) includes a dragging on a displayed object. The dragging, for example, comprises a touch (or contact) on the displayed object, a movement of the touch across touch-sensitive display 340, and lift-off of the touch (touch end).

In some embodiments, event recognizer 325-1 also includes information for event delivery 339. Information for event delivery 339 includes references to corresponding event handlers 319. Optionally, information for event delivery 339 includes action-target pair(s) 354. In some embodiments, in response to recognizing a gesture (or a part of a gesture), event information (e.g., action message(s)) is sent to one or more targets 383 (see FIG. 3D) identified by the action-target pair(s) 354. In other embodiments, in response to recognizing a gesture (or a part of a gesture), the action-target pair(s) are activated.

In some embodiments, gesture definitions 335 include a definition of a gesture for a respective user-interface object. In some embodiments, event comparator 333 performs a hit test to determine which user-interface object is associated with a sub-event. For example, in an application view in which three user-interface objects are displayed on touch-sensitive display 340, when a touch is detected on touch-sensitive display 340, event comparator 333 performs a hit test to determine which of the three user-interface objects, if any, is associated with the touch (event). If each displayed object is associated with a respective event handler 319, event comparator 333 uses the result of the hit test to determine which event handler 319 should be activated. For example, event comparator 333 selects an event handler 319 associated with the event and the object triggering the hit test.

In some embodiments, a respective gesture definition 337 for a respective gesture also includes delayed actions that delay delivery of the event information until after it has been determined whether the sequence of events and/or sub-events does or does not correspond to the event recognizer's event type.

When a respective event recognizer 325-1 determines that the series of events and/or sub-events do not match any of the events in gesture definitions 335, the respective event recognizer 325-1 enters an event failed state, after which the respective event recognizer 325-1 disregards subsequent events and/or sub-events of the touch-based gesture. In this situation, other event recognizers, if any, that remain active for the hit view continue to track and process events and/or sub-events of an ongoing touch-based gesture.

In some embodiments, when no event recognizer for the hit view remains, the event information is sent to one or more event recognizers in a higher view in the view hierarchy. Alternatively, when no event recognizer for the hit view remains, the event information is disregarded. In some embodiments, when no event recognizer for views in the view hierarchy remains, the event information is sent to one or more event recognizers in a higher programmatic level in the programmatic hierarchy. Alternatively, when no event recognizer for views in the view hierarchy remains, the event information is disregarded.

In some embodiments, a respective event recognizer 325-1 includes event recognizer state 334. Event recognizer state 334 includes a state of the respective event recognizer 325-1.

In some embodiments, event recognizer state 334 includes recognizer metadata and properties 349. In some embodiments, recognizer metadata and properties 349 include one or more of the following: A) configurable properties, flags, and/or lists that indicate how the event delivery system should perform event and/or sub-event delivery to actively involved event recognizers; B) configurable properties, flags, and/or lists that indicate how event recognizers interact with one another; C) configurable properties, flags, and/or lists that indicate how event recognizers receive event information; D) configurable properties, flags, and/or lists that indicate how event recognizers may recognize a gesture; E) configurable properties, flags, and/or lists that indicate whether events and/or sub-events are delivered to varying levels in the view hierarchy; and F) references to corresponding event handlers 319.

In some embodiments, event recognizer state 334 includes event/touch metadata 351. Event/touch metadata 351 includes event/touch information about a respective event/touch that has been detected and corresponds to a respective gesture definition 337 of gesture definitions 335. The event/touch information includes one or more of: a location, time stamp, speed, direction, distance, scale (or change in scale), and angle (or change in angle) of the respective event/touch.

In some embodiments, a respective event recognizer 325 activates event handler 319 associated with the respective event recognizer 325 when one or more particular events and/or sub-events of a gesture are recognized. In some embodiments, respective event recognizer 325 delivers event information associated with the event to event handler 319.

Event handler 319, when activated, performs one or more of: creating and/or updating data, creating and updating objects, and preparing display information and sending it for display on touch screen display 112 or touch-sensitive display 340.

In some embodiments, a respective application view 317-2 includes view metadata 341. As described above with respect to FIG. 3B, view metadata 341 includes data regarding a view. Optionally, view metadata 341 includes one or more of: stop property 342, skip property 343, NoHit skip property 344, Interaction identifiers 347 (discussed below with respect to dynamically added drag, drop and spring loading gesture recognizers), and other view metadata 329.

In some embodiments, a first actively involved view within the view hierarchy may be configured to prevent delivery of a respective sub-event to event recognizers associated with that first actively involved view. This behavior can implement the skip property 343. When the skip property is set for an application view, delivery of the respective sub-event is still performed for event recognizers associated with other actively involved views in the view hierarchy.

Alternately, a first actively involved view within the view hierarchy may be configured to prevent delivery of a respective sub-event to event recognizers associated with that first actively involved view unless the first actively involved view is the hit view. This behavior can implement the conditional NoHit skip property 344.

In some embodiments, a second actively involved view within the view hierarchy is configured to prevent delivery of the respective sub-event to event recognizers associated with the second actively involved view and to event recognizers associated with ancestors of the second actively involved view. This behavior can implement the stop property 342.

FIG. 3C is a block diagram illustrating exemplary classes and instances of gesture recognizers (e.g., event handling components 390) in accordance with some embodiments.

A software application (e.g., application 133-1) has one or more event recognizers 345. In some embodiments, a respective event recognizer (e.g., 345-2) is an event recognizer class. The respective event recognizer (e.g., 345-2) includes event recognizer specific code 338 (e.g., a set of instructions defining the operation of event recognizers) and state machine 348.

In some embodiments, application state 321 of a software application (e.g., application 133-1) includes instances of event recognizers. Each instance of an event recognizer is an object having a state (e.g., event recognizer state 334). "Execution" of a respective event recognizer instance is implemented by executing corresponding event recognizer specific code (e.g., 338) and updating or maintaining the state 334 of the event recognizer instance 365. The state 334 of event recognizer instance 365 includes the state 351 of the event recognizer instance's state machine 348.

In some embodiments, application state 321 includes a plurality of event recognizer instances 365. A respective event recognizer instance 365 typically corresponds to an event recognizer that has been bound (also called "attached") to a view of the application. In some embodiments, one or more event recognizer instances 365 are bound to a respective application in a programmatic hierarchy without reference to any particular view of the respective application. In some embodiments, application state 321 includes a plurality of instances (e.g., 365-1 to 365-L) of a respective event recognizer (e.g., 345-2). In some embodiments, application state 321 includes instances 365 of a plurality of event recognizers (e.g., 345-1 to 345-R).

In some embodiments, a respective instance (e.g., 365-2) of a gesture recognizer 345 includes event recognizer state 334. As discussed above, in some embodiments, event recognizer state 334 includes recognizer metadata and properties 349 and event/touch metadata 351. In some embodiments, event recognizer state 334 also includes view hierarchy reference(s) 336, indicating to which view the respective instance 365-2 of the gesture recognizer 345-2 is attached.

In some embodiments, recognizer metadata and properties 349 include the following, or a subset or superset thereof:
  exclusivity flag 324;
  exclusivity exception list 326;
  wait-for list 327; when included in the event recognizer state 334 for a respective event recognizer (or gesture recognizer), this list 327 indicates the set of event recognizers (or gesture recognizers), if any, that must enter the event impossible or event canceled state before the respective event recognizer can recognize a respective event. Stated another way, the listed event or gesture recognizers must fail to recognize an input or event before the event recognizer with the wait-for list 327 is allowed to recognize the input or event. In effect, the listed event recognizers have higher priority for recognizing an event than the event recognizer with the wait-for list 327.

delay touch began flag 328;
delay touch end flag 330; and
touch cancellation flag 332.

In some embodiments, one or more event recognizers may be adapted to delay delivering one or more sub-events of the sequence of sub-events until after the event recognizer recognizes the event. This behavior reflects a delayed event. For example, consider a single tap gesture in a view for which multiple tap gestures are possible. In that case, a tap event becomes a "tap+delay" recognizer. In essence, when an event recognizer implements this behavior, the event recognizer will delay event recognition until it is certain that the sequence of sub-events does in fact correspond to its event definition. This behavior may be appropriate when a recipient view is incapable of appropriately responding to cancelled events. In some embodiments, an event recognizer will delay updating its event recognition status to its respective actively involved view until the event recognizer is certain that the sequence of sub-events does not correspond to its event definition. Delay touch began flag 328, delay touch end flag 330, and touch cancellation flag 332 are provided to tailor sub-event delivery techniques, as well as event recognizer and view status information updates to specific needs.

In some embodiments, recognizer metadata and properties 349 include the following, or a subset or superset thereof:

state machine state/phase 351, which indicates the state of a state machine (e.g., 348) for the respective event recognizer instance (e.g., 365-2); state machine state/phase 351 can have various state values, such as "event possible", "event recognized", "event failed", and others, as described below; alternatively or additionally, state machine state/phase 351 can have various phase values, such as "touch phase began" which can indicate that the touch data structure defines a new touch that has not been referenced by previous touch data structures; a "touch phase moved" value can indicate that the touch being defined has moved from a prior position; a "touch phase stationary" value can indicate that the touch has stayed in the same position; a "touch phase ended" value can indicate that the touch has ended (e.g., the user has lifted his/her finger from the surface of a multi touch display); a "touch phase cancelled" value can indicate that the touch has been cancelled by the device; a cancelled touch can be a touch that is not necessarily ended by a user, but which the device has determined to ignore; for example, the device can determine that the touch is being generated inadvertently (i.e., as a result of placing a portable multi touch enabled device in one's pocket) and ignore the touch for that reason; each value of state machine state/phase 351 can be an integer number (called herein "gesture recognizer state value");

action-target pair(s) 354, where each pair identifies a target to which the respective event recognizer instance sends the identified action message in response to recognizing an event or touch as a gesture or a part of a gesture;

delegate 353, which is a reference to a corresponding delegate when a delegate is assigned to the respective event recognizer instance; when a delegate is not assigned to the respective event recognizer instance, delegate 346 contains a null value; and enabled property 356, indicating whether the respective event recognizer instance is enabled; in some embodiments, when the respective event recognizer instance is not enabled (e.g., disabled), the respective event recognizer instance does not process events or touches.

Additional information regarding gesture recognizers, including gesture recognizer states and properties, can be found in U.S. patent application Ser. No. 14/290,931, filed May 29, 2014, which is hereby incorporated by reference in its entirety.

Each touch data structure 361 can comprise various entries. In some embodiments, touch data structures may include data corresponding to at least the touch-specific entries in event/touch metadata 351 such as the following, or a subset or superset thereof:

"first touch for view" entry 362;

"per touch info" entry 363, including "time stamp" information, which indicates the particular time to which the touch data structure relates (e.g., the time of touch); optionally, "per touch info" entry 362 includes other information, such as a location of a corresponding touch; and optional "tap count" entry 364.

Thus, each touch data structure can define what is happening with a respective touch (or other input source) at a particular time (e.g., whether the touch is stationary, being moved, etc.) as well as other information associated with the touch (such as position). Accordingly, each touch data structure can define the state of a particular touch at a particular moment in time. One or more touch data structures referencing the same time can be added in a touch event data structure that can define the states of all touches a particular view is receiving at a moment in time (as noted above, some touch data structures may also reference touches that have ended and are no longer being received). Multiple touch event data structures can be sent to the software implementing a view as time passes, in order to provide the software with continuous information describing the touches that are happening in the view.

The ability to handle complex touch-based gestures, optionally including multi-touch gestures, can add complexity to the various software applications. In some cases, such additional complexity can be necessary to implement advanced and desirable interface features. For example, a game may require the ability to handle multiple simultaneous touches that occur in different views, as games often require the pressing of multiple buttons at the same time, or combining accelerometer data with touches on a touch-sensitive surface. However, some simpler applications and/or views need not require advanced interface features. For example, a simple soft button (i.e., a button that is displayed on a touch-sensitive display) may operate satisfactorily with single touches, rather than multi-touch functionality. In these cases, the underlying OS may send unnecessary or excessive touch data (e.g., multi-touch data) to a software component associated with a view that is intended to be operable by single touches only (e.g., a single touch or tap on a soft button). Because the software component may need to process this data, it may need to feature all the complexity of a software application that handles multiple touches, even though it is associated with a view for which only single touches are relevant. This can increase the cost of development of software for the device, because software components that have been traditionally easy to program in a mouse interface environment (i.e., various buttons, etc.) may be much more complex in a multi-touch environment.

In order to reduce the complexity in recognizing complex touch-based gestures, delegates can be used to control the behavior of event recognizers in accordance with some embodiments. As described below, delegates can determine, for example, whether a corresponding event recognizer (or gesture recognizer) can receive the event (e.g., touch) information; whether the corresponding event recognizer (or gesture recognizer) can transition from an initial state (e.g., event possible state) of a state machine to another state; and/or whether the corresponding event recognizer (or gesture recognizer) can simultaneously recognize the event (e.g., touch) as a corresponding gesture without blocking other event recognizer(s) (or gesture recognizer(s)) from recognizing the event or getting blocked by other event recognizer(s) (or gesture recognizer(s)) recognizing the event.

It shall be understood, however, that the foregoing discussion regarding the complexity of evaluating and processing user touches on touch-sensitive surfaces also applies to all forms of user inputs to operate electronic device 102 with input devices 128, not all of which are initiated on touch screens, e.g., coordinating mouse movement and mouse button presses with or without single or multiple keyboard presses or holds, device rotations or other movements, user movements such as taps, drags, scrolls, etc., on touch-pads, pen stylus inputs, oral instructions, detected eye movements, biometric inputs, detected physiological change in a user, and/or any combination thereof, which may be utilized as inputs corresponding to events and/or sub-events which define an event to be recognized.

Turning to the flow of event information, FIG. 3D is a block diagram illustrating the flow of event information in accordance with some embodiments.

In FIG. 3D, event dispatcher module 315 (e.g., in operating system 118 or application software 124) receives event information (e.g., for a touch event in view 378), and sends the event information to one or more applications (e.g., to application 133-1 in this example, but not to application 133-2). In some embodiments, application 133-1 includes a plurality of views (e.g., 374, 376, and 378 corresponding to views 317, FIG. 3B) in view hierarchy 372 and a plurality of gesture recognizers (379-1 through 379-3) in the plurality of views. Application 133-1 also includes one or more gesture handlers 319-i, which correspond to the targets 383 in target-action pairs 354 (e.g., targets 383-1 and 383-2). In some embodiments, event dispatcher module 315 receives hit view information from hit view determination module 314 and sends event information to the hit view (e.g., 378) or event recognizer(s) attached to the hit view (e.g., 379-1 and 379-2). Additionally, or alternatively, event dispatcher module 315 receives hit level information from hit level determination module 352 and sends event information to applications in the hit level (e.g., 133-1 and 133-2) or one or more event recognizers (e.g., 379-4) in the hit level applications. It is noted that in the example shown in FIG. 3D, application 133-2 does not have a view that is the hit view for the received event information, and the event information is not sent to any of the gesture recognizers (e.g., gesture recognizer 379-4) of application 133-2.

In some embodiments, one of the applications receiving the event information is a default application (e.g., 133-2 may be a default application). In some embodiments, only a subset of gesture recognizers in each receiving application is allowed to (or configured to) receive the event information. For instance, gesture recognizer 379-3 in application 133-1 does not receive the event information in this example. The gesture recognizers that receive the event information are called herein receiving gesture recognizers. In FIG. 3D, receiving gesture recognizers 379-1 and 379-2 receive the event information, and compare the received event information with a respective gesture definition 337 (FIG. 3B) in the receiving gesture recognizers. In FIG. 3D, gesture recognizers 379-1 and 379-4 have respective gesture definitions, and when those definitions match the received event information, the gesture recognizer with the matching gesture definition sends respective action messages (e.g., 381) to corresponding gesture handlers (e.g., 319-i). In this example, gesture handlers 319-j of application 133-2 do not receive action messages corresponding to the event information dispatched by event dispatcher module 315, since that event information is sent to gesture recognizers in hit view 378, which is not part of application 133-2. In some embodiments, the gesture handlers are part of an application-independent module that is available for use by a plurality of different applications as an application development framework, and the gesture handlers are included in the code of the application when the application is compiled using the application development framework (e.g., the gesture handlers are not part of an application core that is application-specific but rather are part of the application that is application-independent in the sense that it is available for use by multiple different applications). In other circumstances, such as a touch input in a view of application 133-2, event information would be delivered to one or more gesture recognizers of application 133-2.

Attention is now directed towards embodiments of user interfaces ("UI") that are, optionally, implemented on portable multifunction device 100.

Figure 4A:
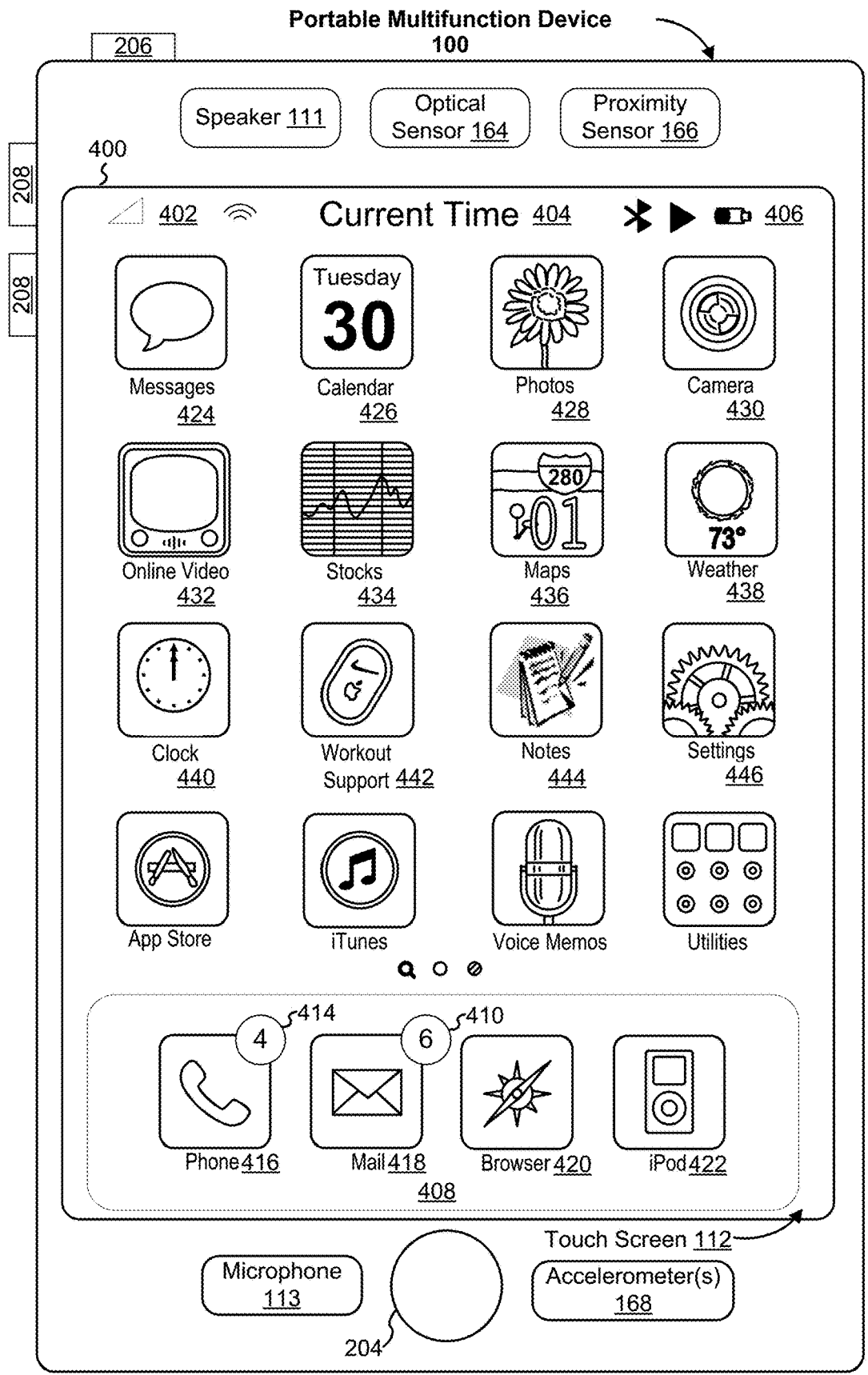
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Map;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
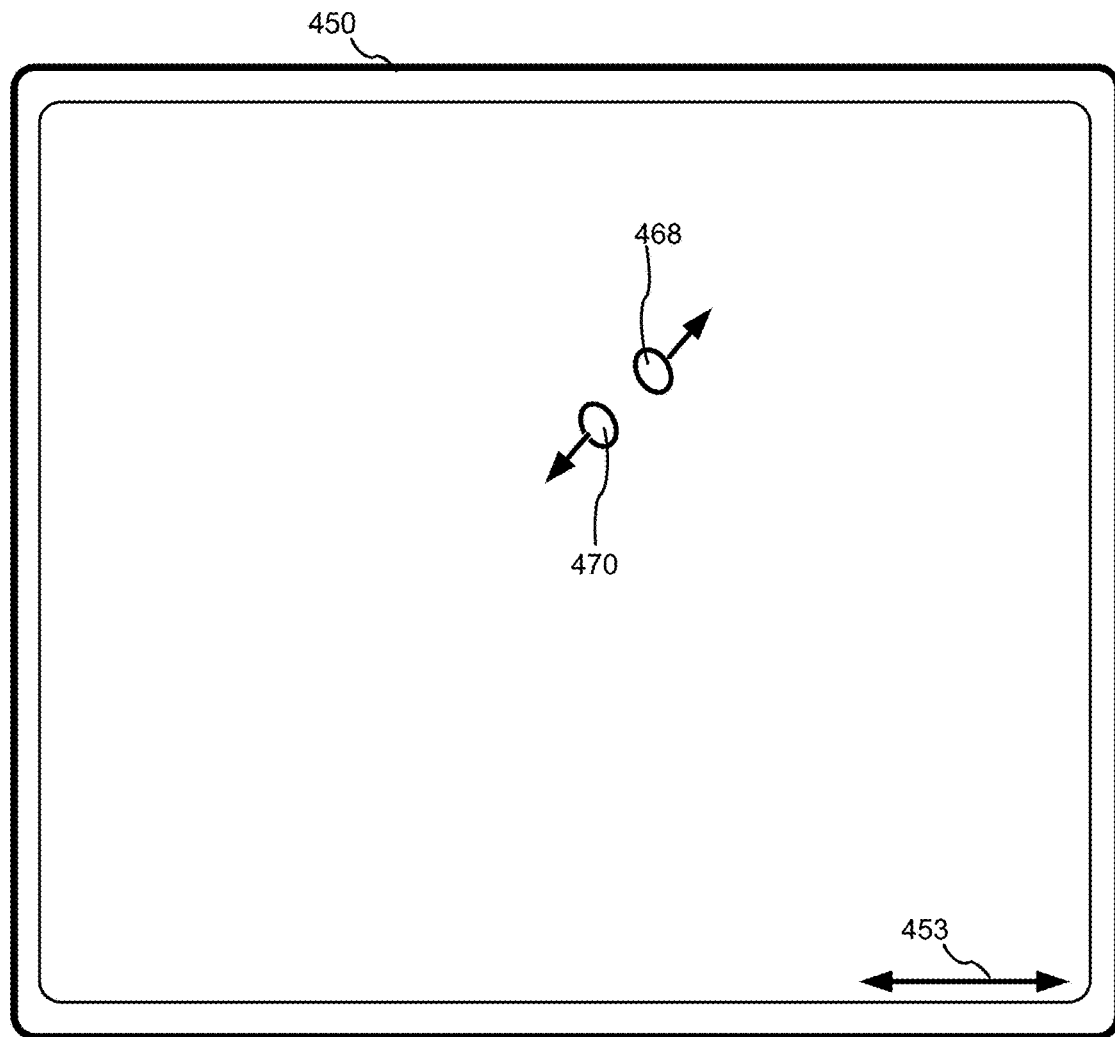
FIG. 4B illustrates an example user interface for a multifunction device with a touch-sensitive surface that is separate from the display in accordance with some embodiments.
Figure 4B:
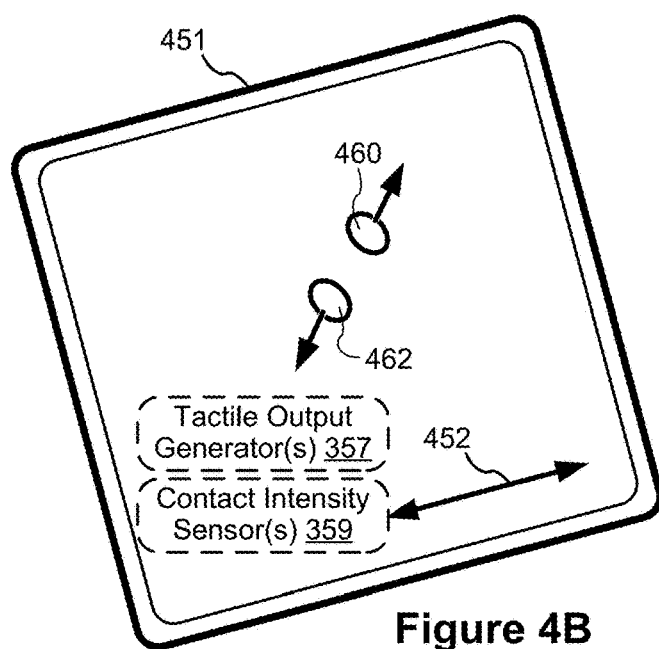

FIG. 4B illustrates an example user interface on a device (e.g., device 300, FIG. 3) with a touch-sensitive surface 451 (e.g., a tablet or touchpad 355, FIG. 3A) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1 or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold.

Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
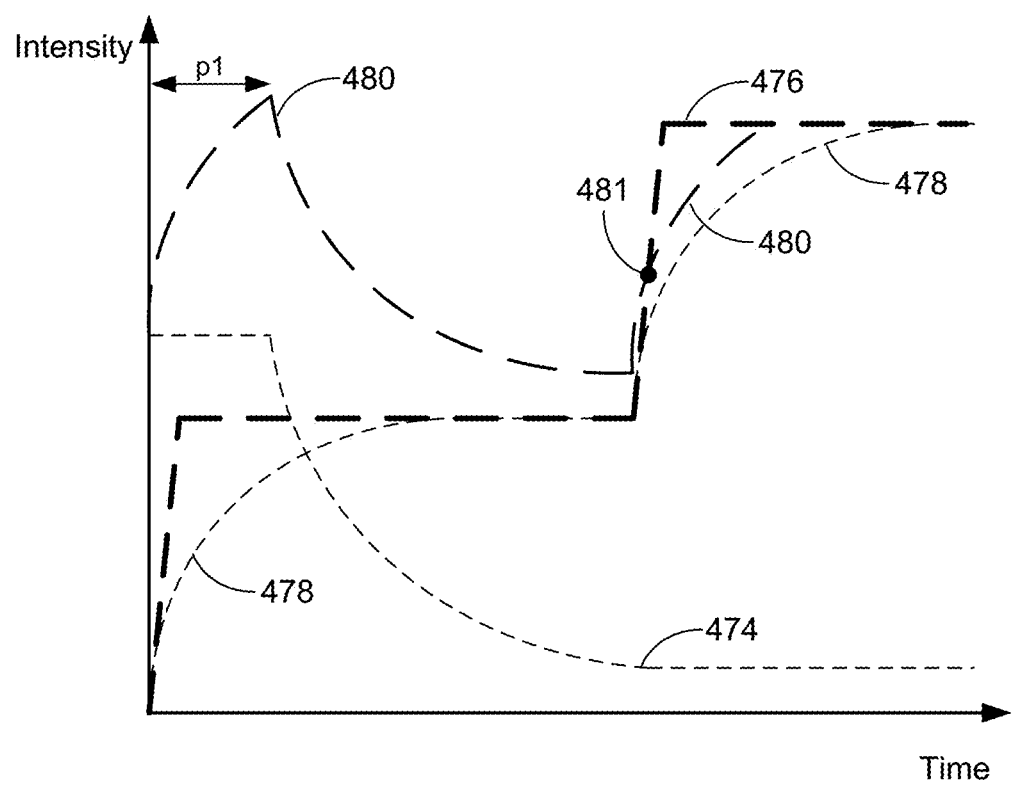
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
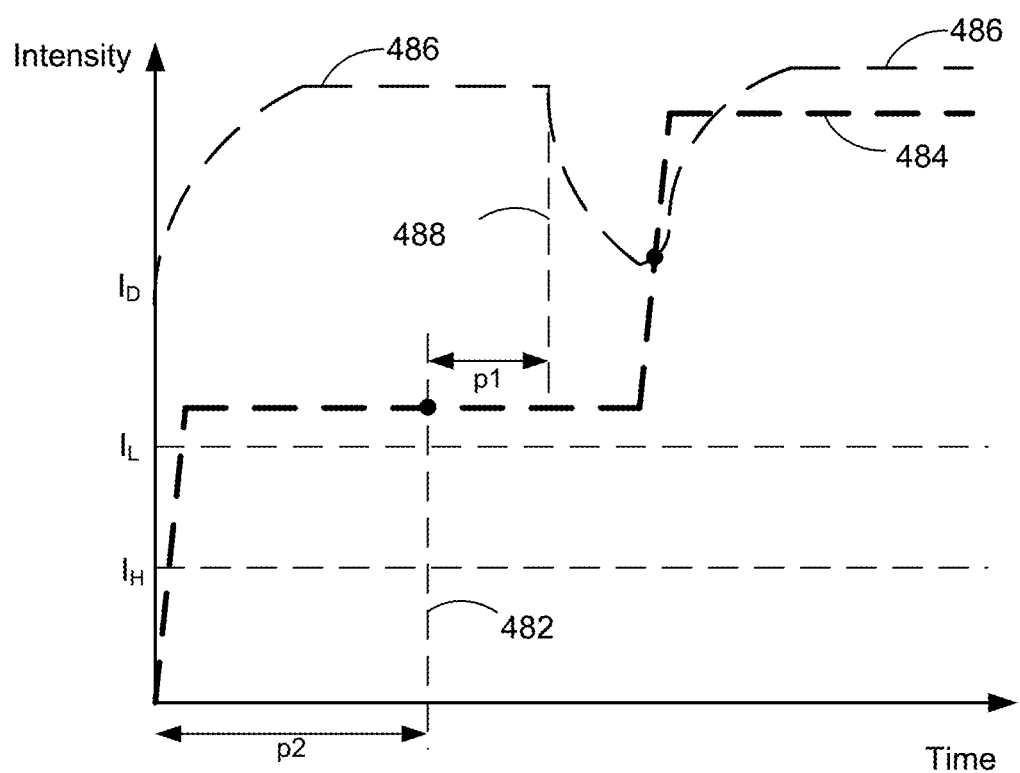

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
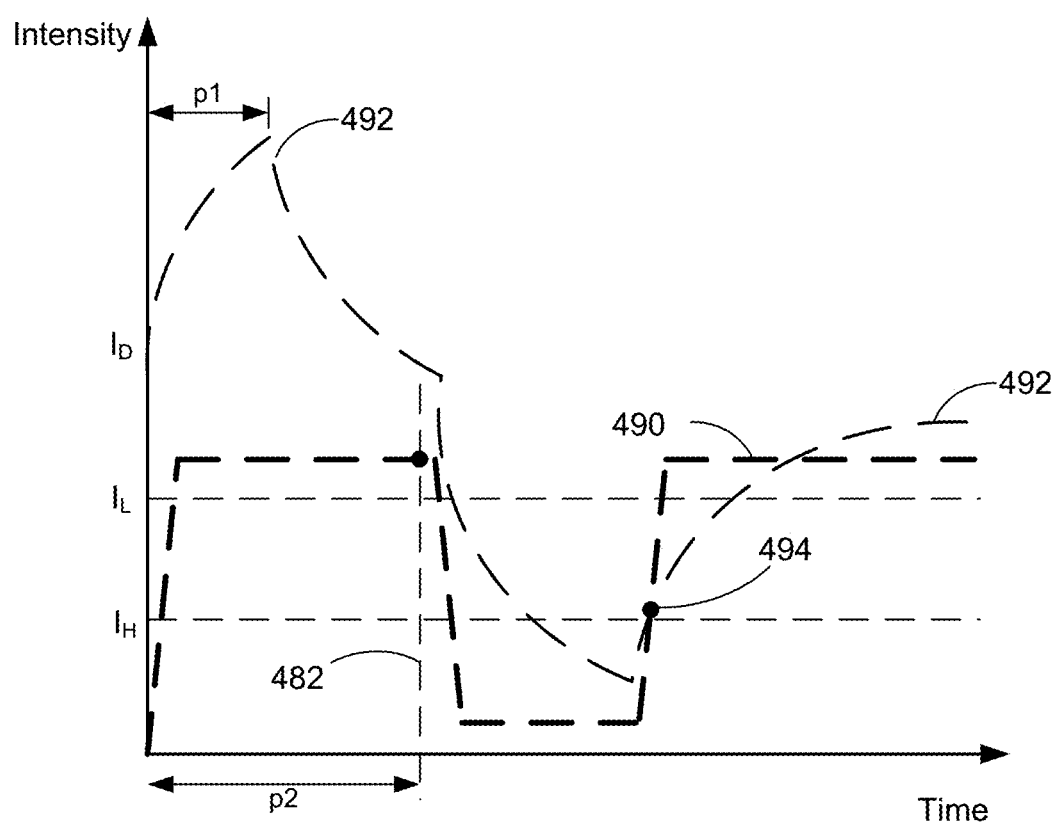

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold ITS is sometimes referred to as a "light press" input. An increase of characteristic intensity of the contact from an intensity below the deep press intensity threshold ITS to an intensity above the deep press intensity threshold ITS is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter,"

where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

Figure 5A:
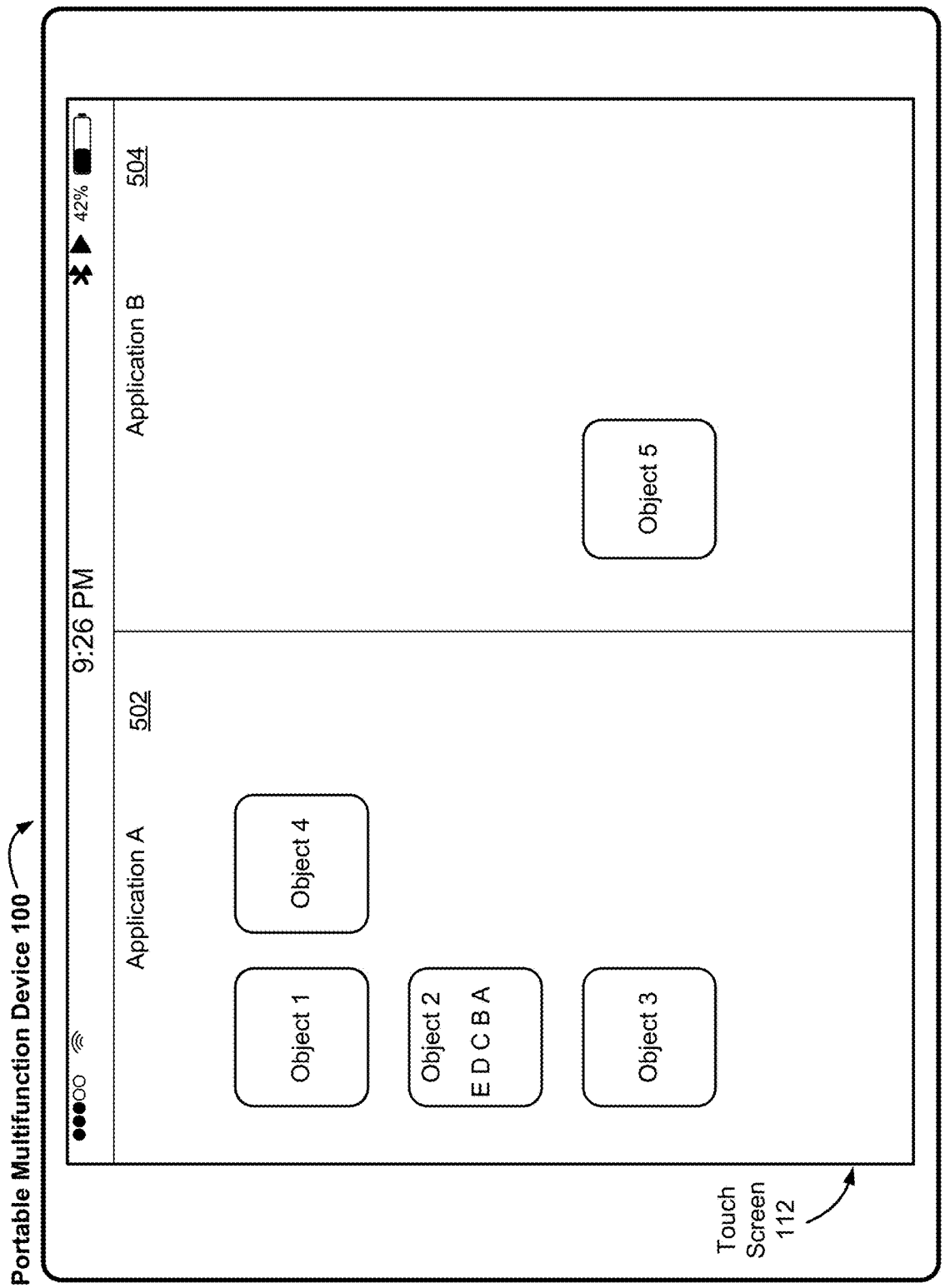
FIGS. 5A-5R illustrate example user interfaces for drag and drop gestures and operations, and springloading gestures and operations, in accordance with some embodiments.
Figure 5B:
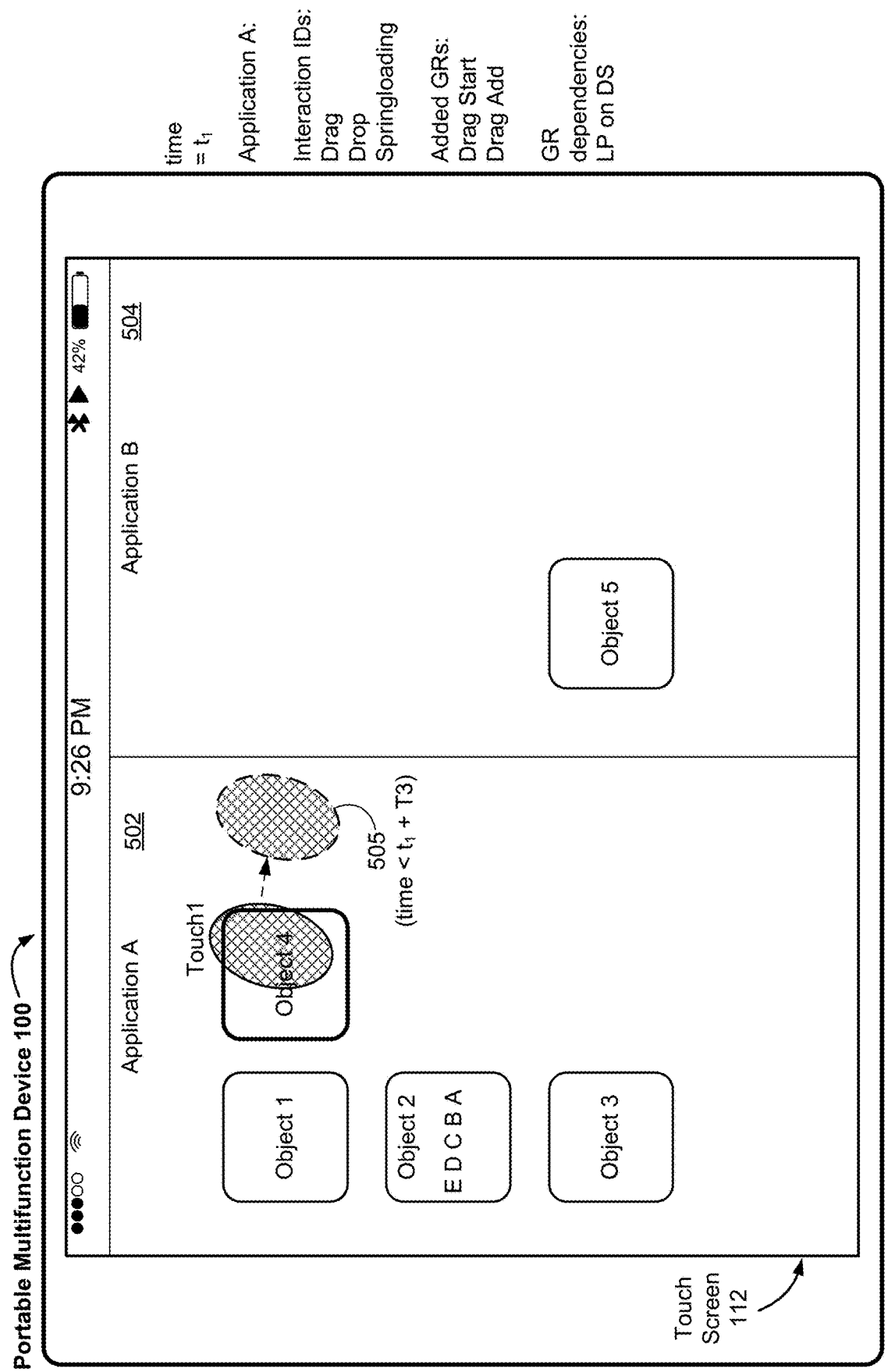
Figure 5C:
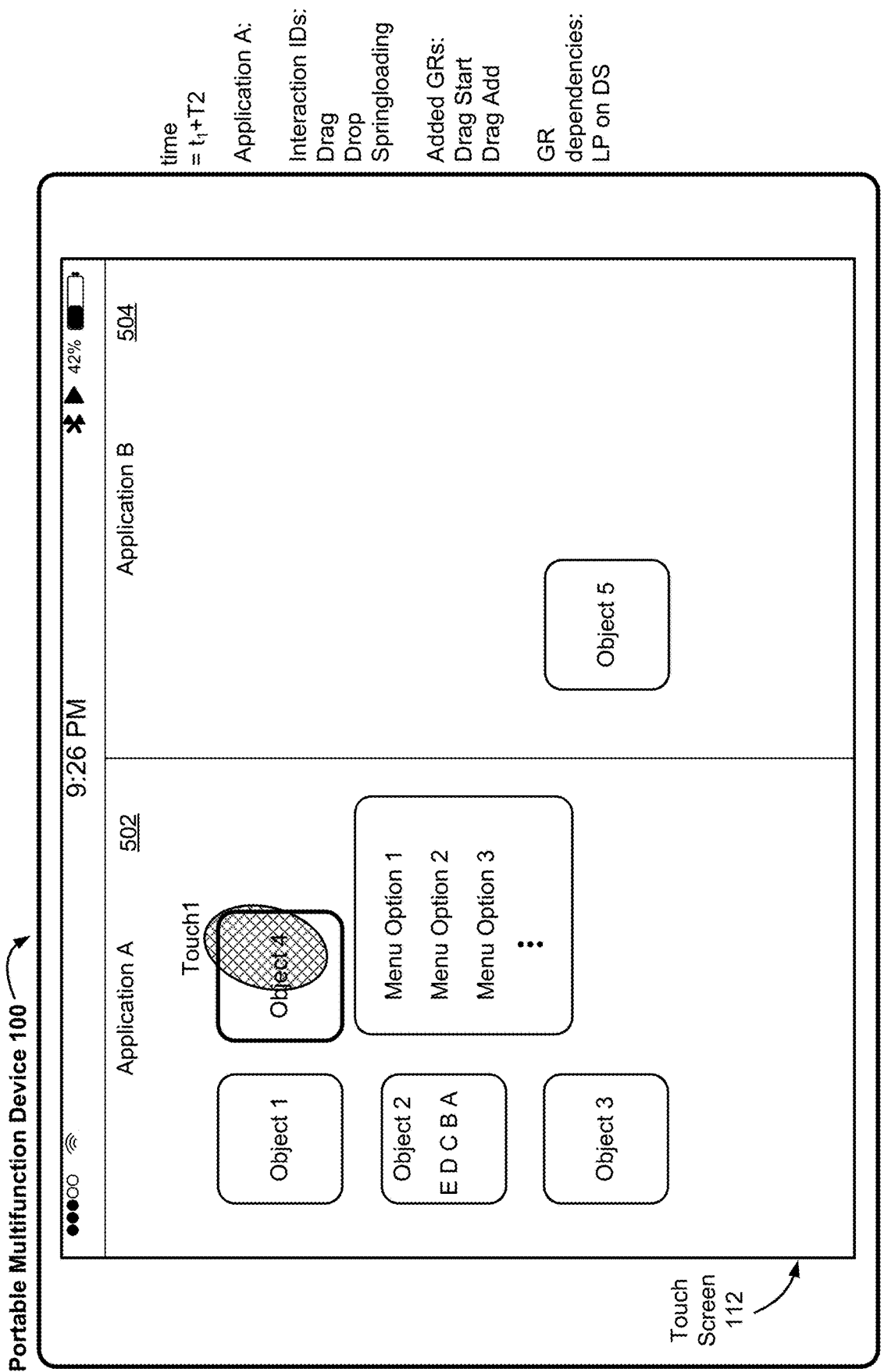
Figure 5D:
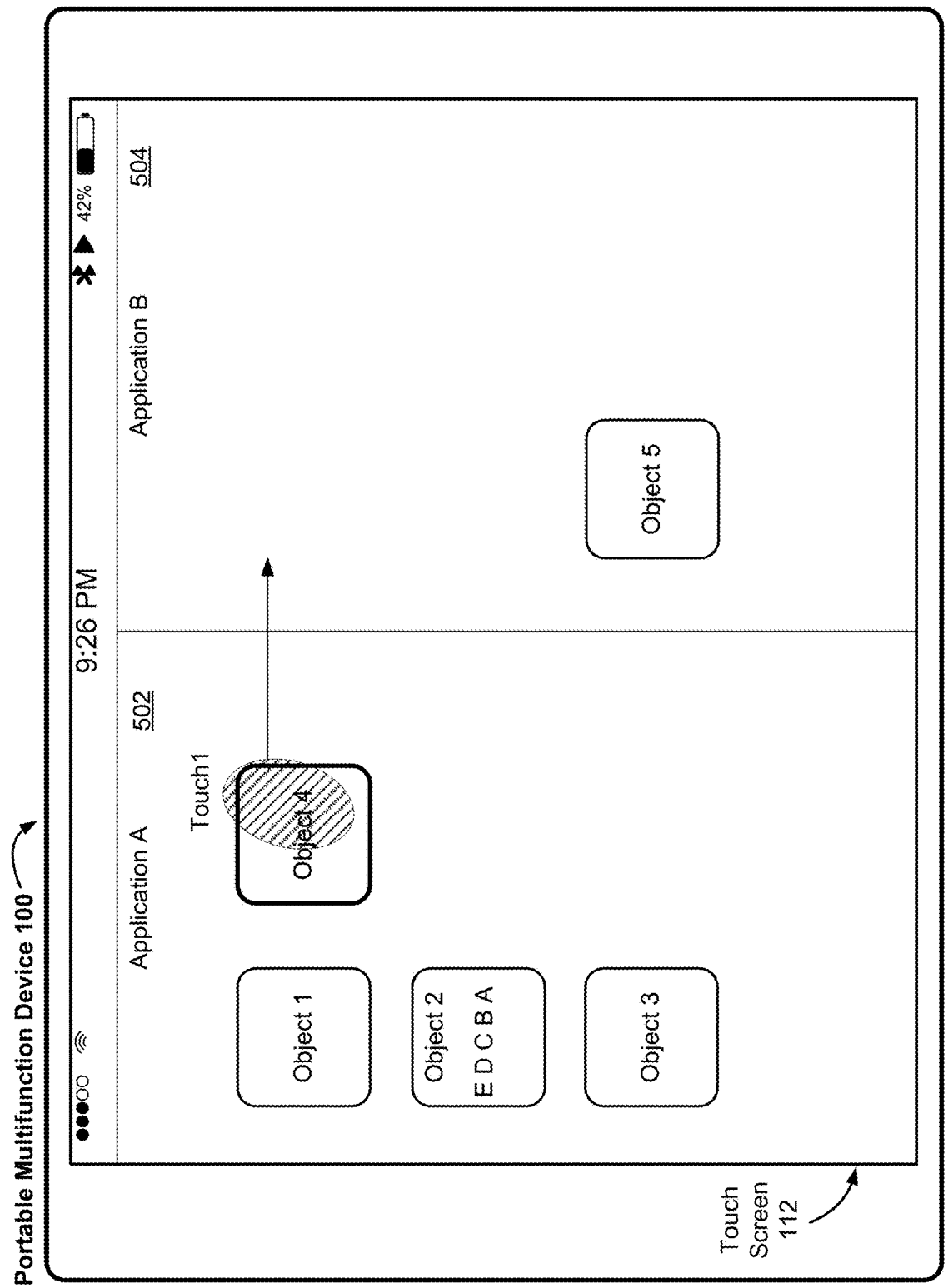
Figure 5E:
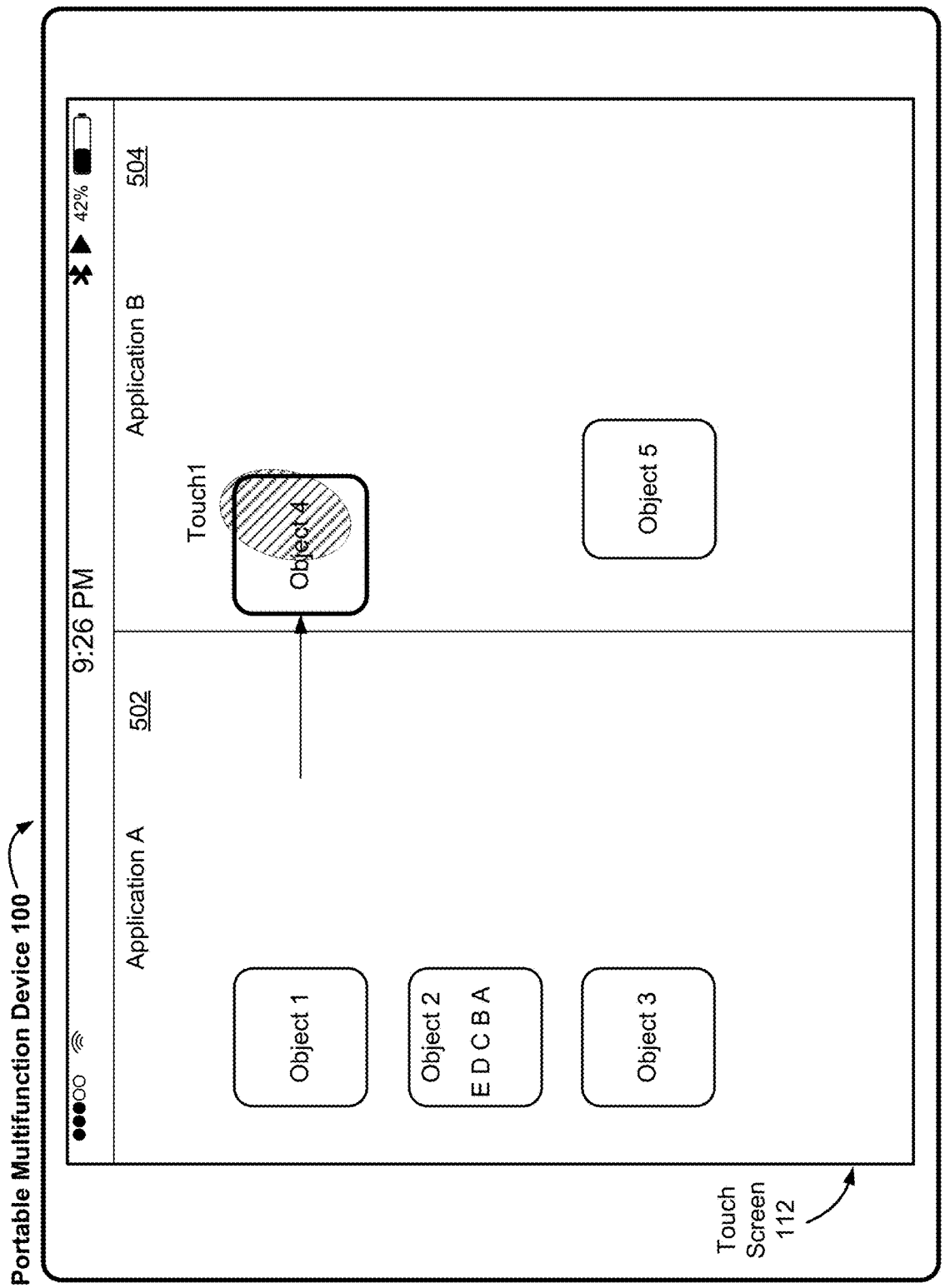
Figure 5F:
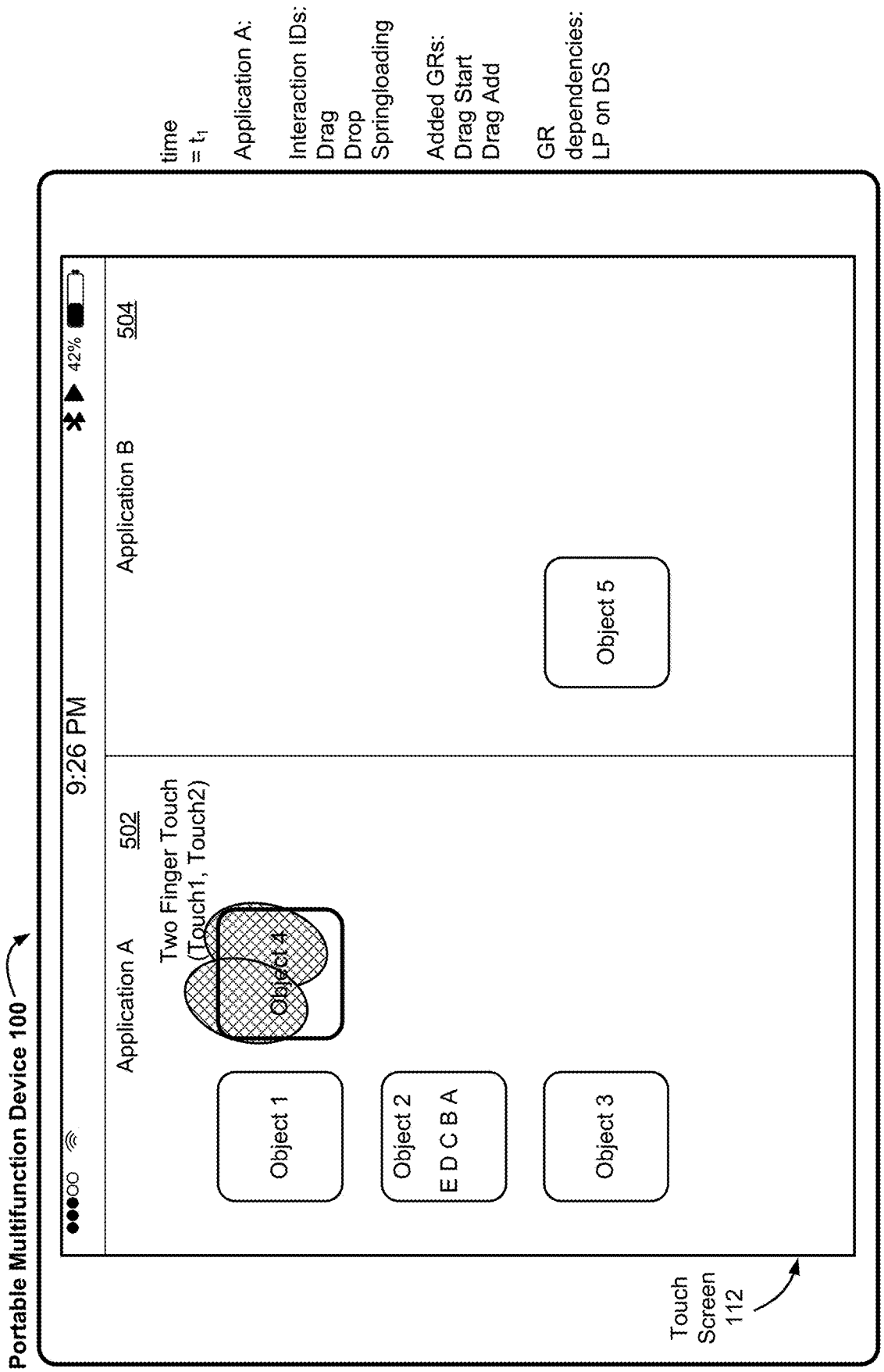
Figure 5G:
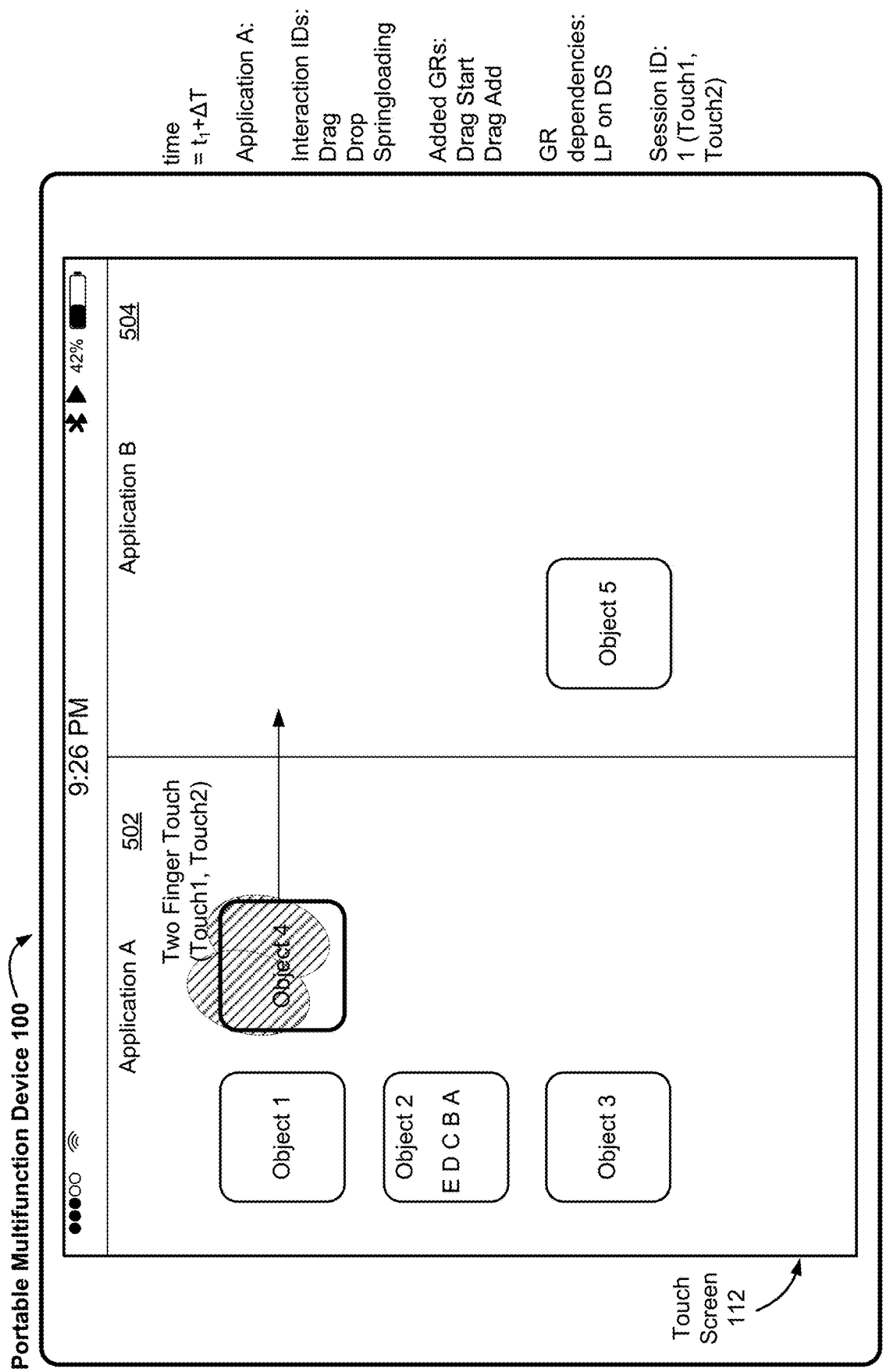
Figure 5H:
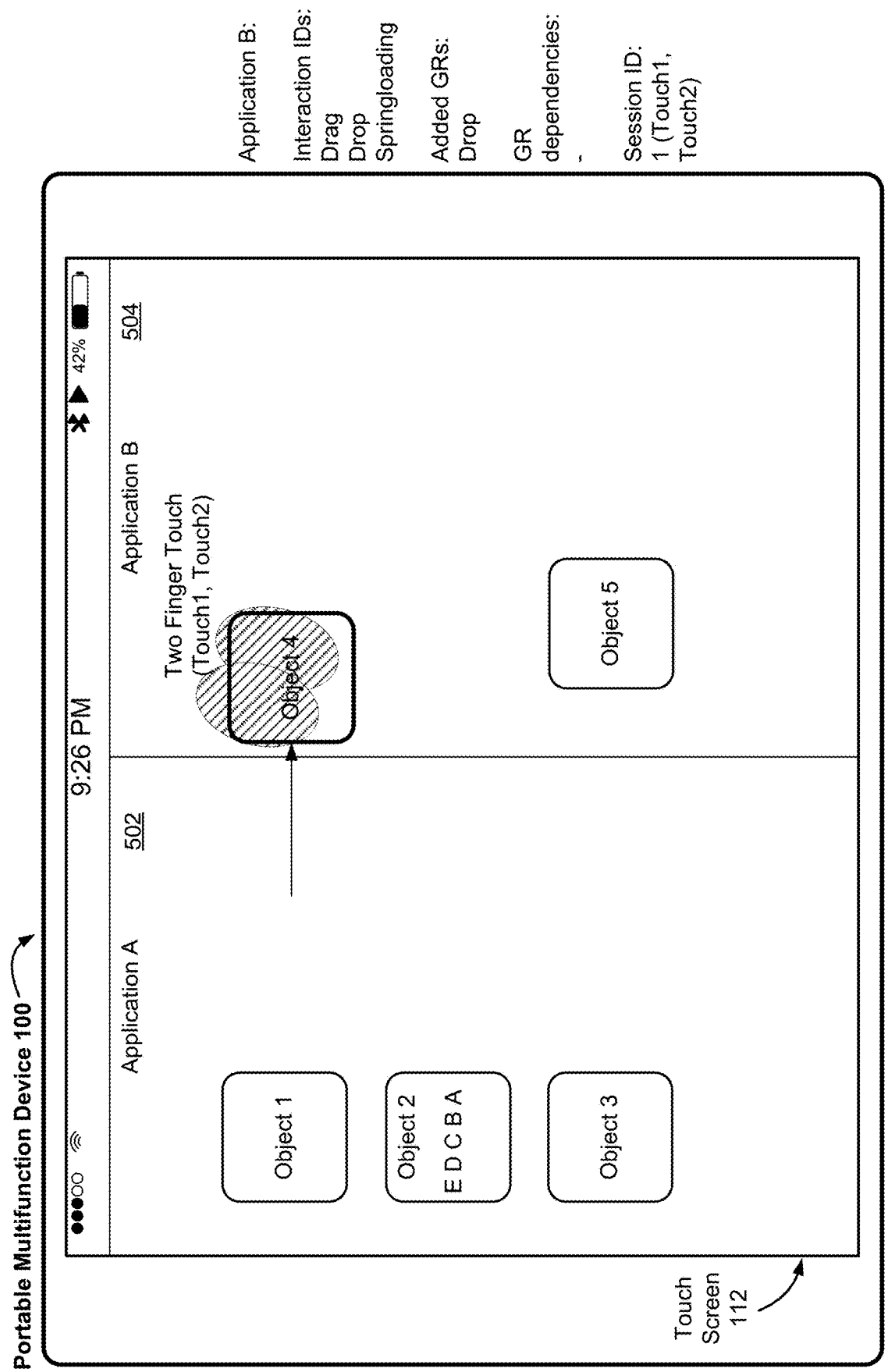
Figure 5I:
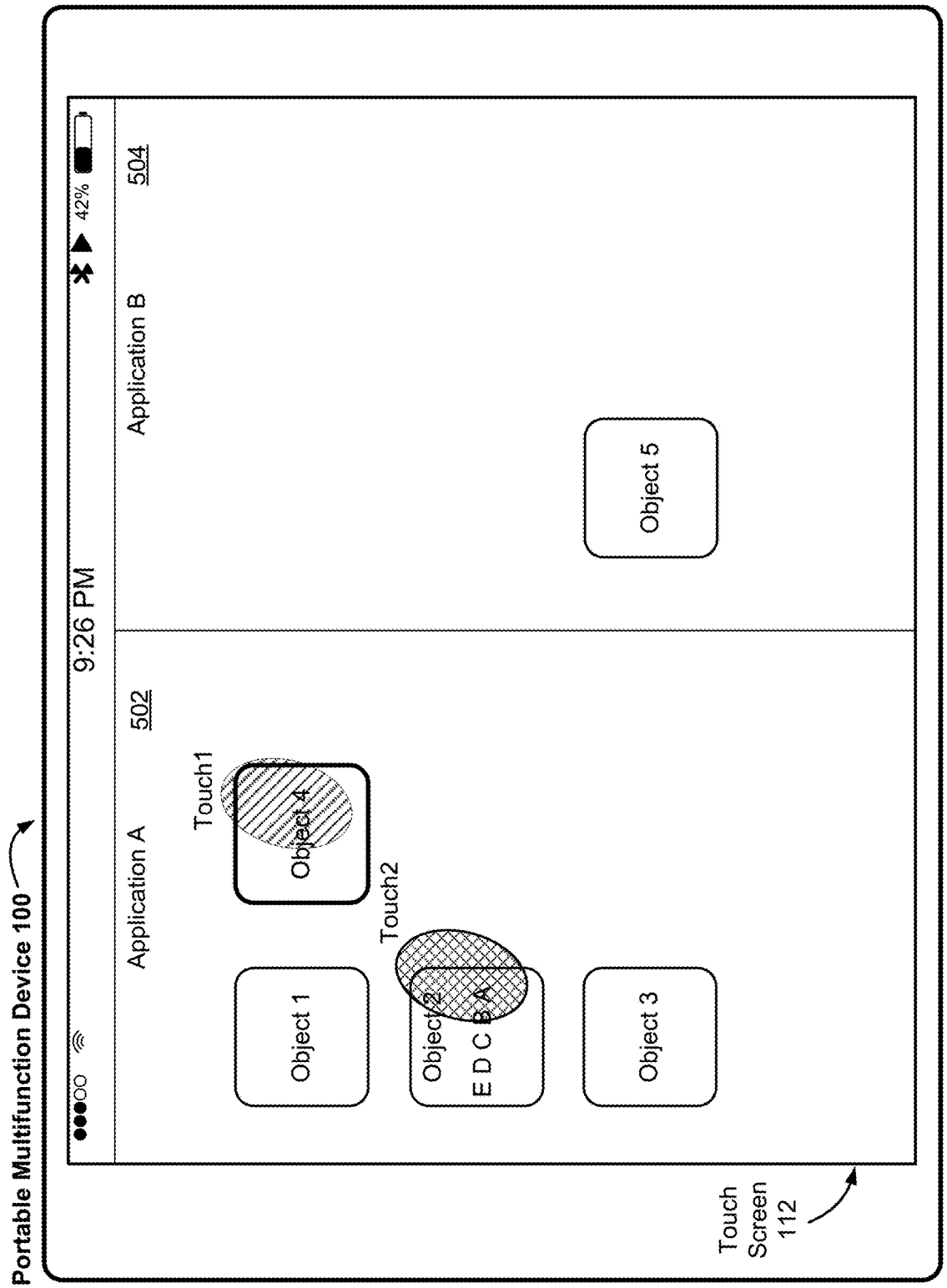
Figure 5J:
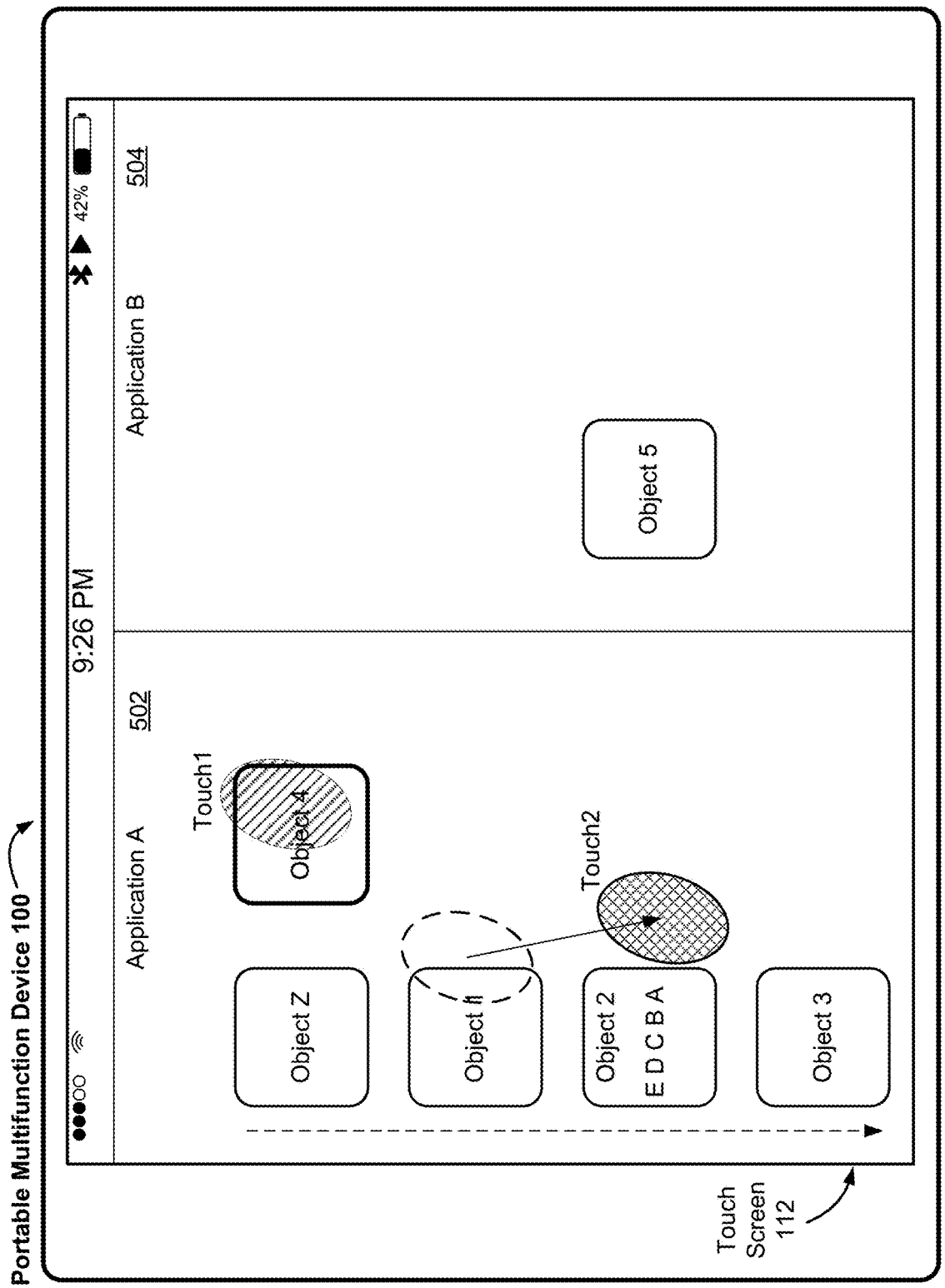
Figure 5K:
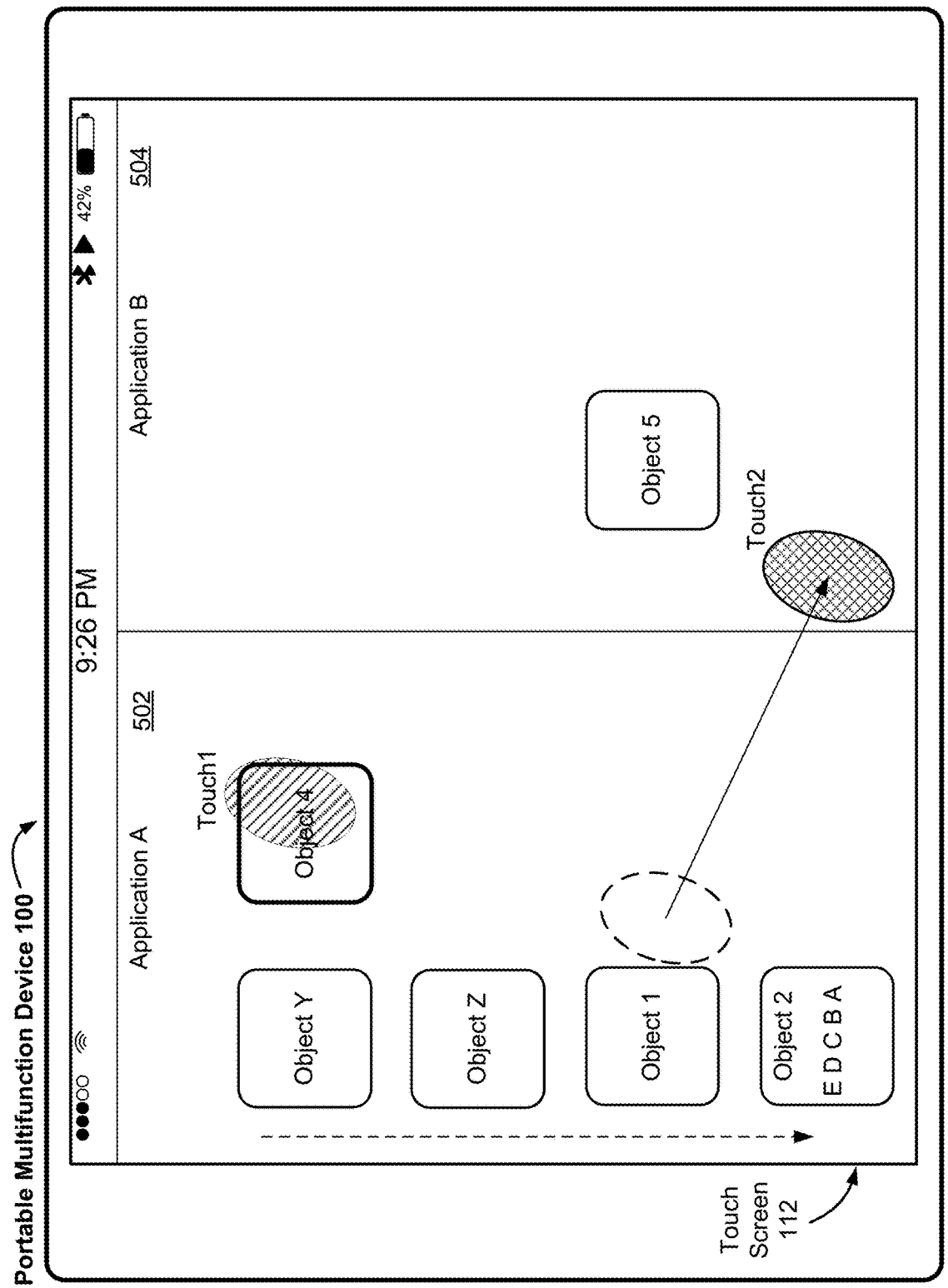
Figure 5L:
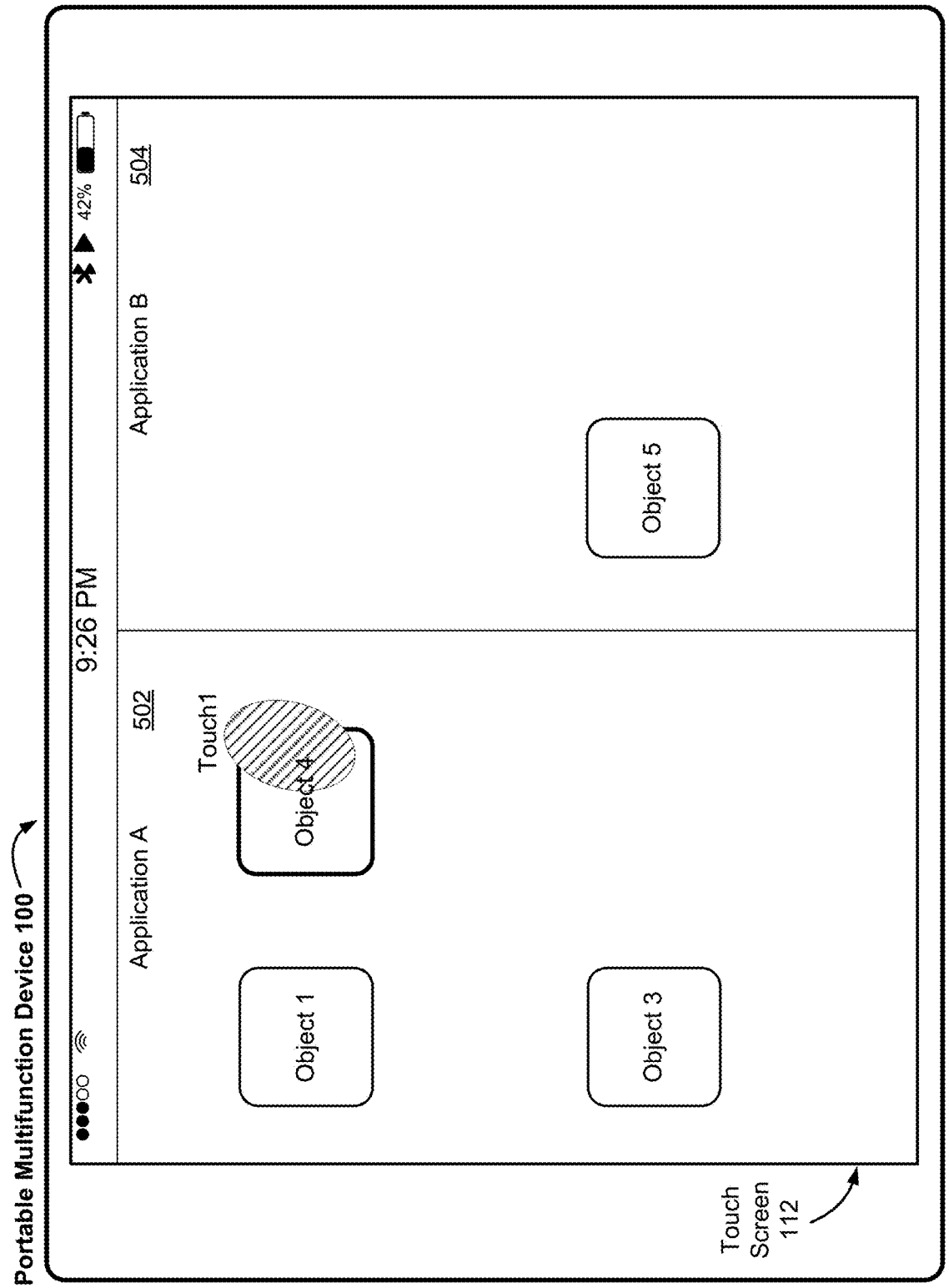
Figure 5M:
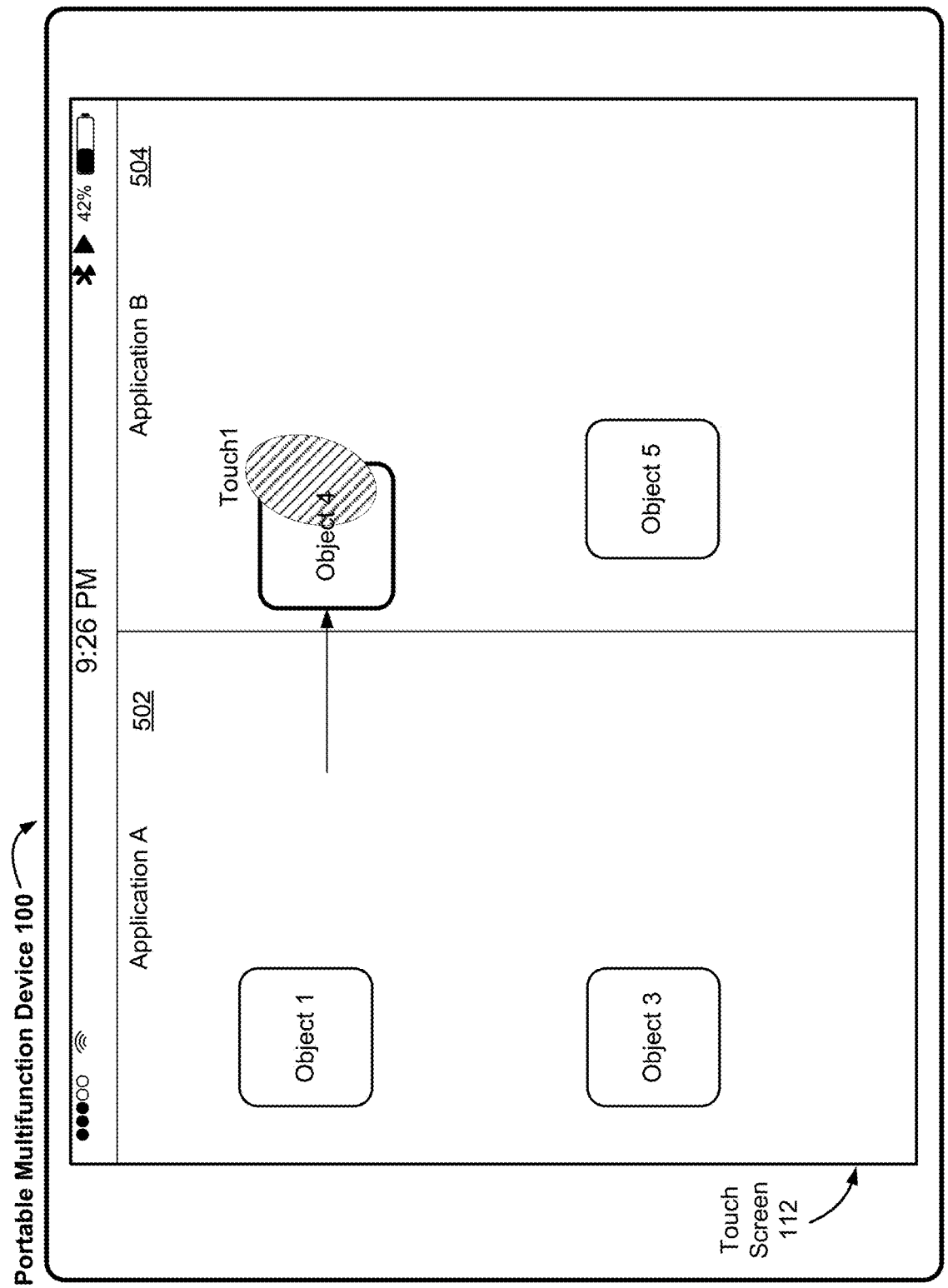
Figure 5N:
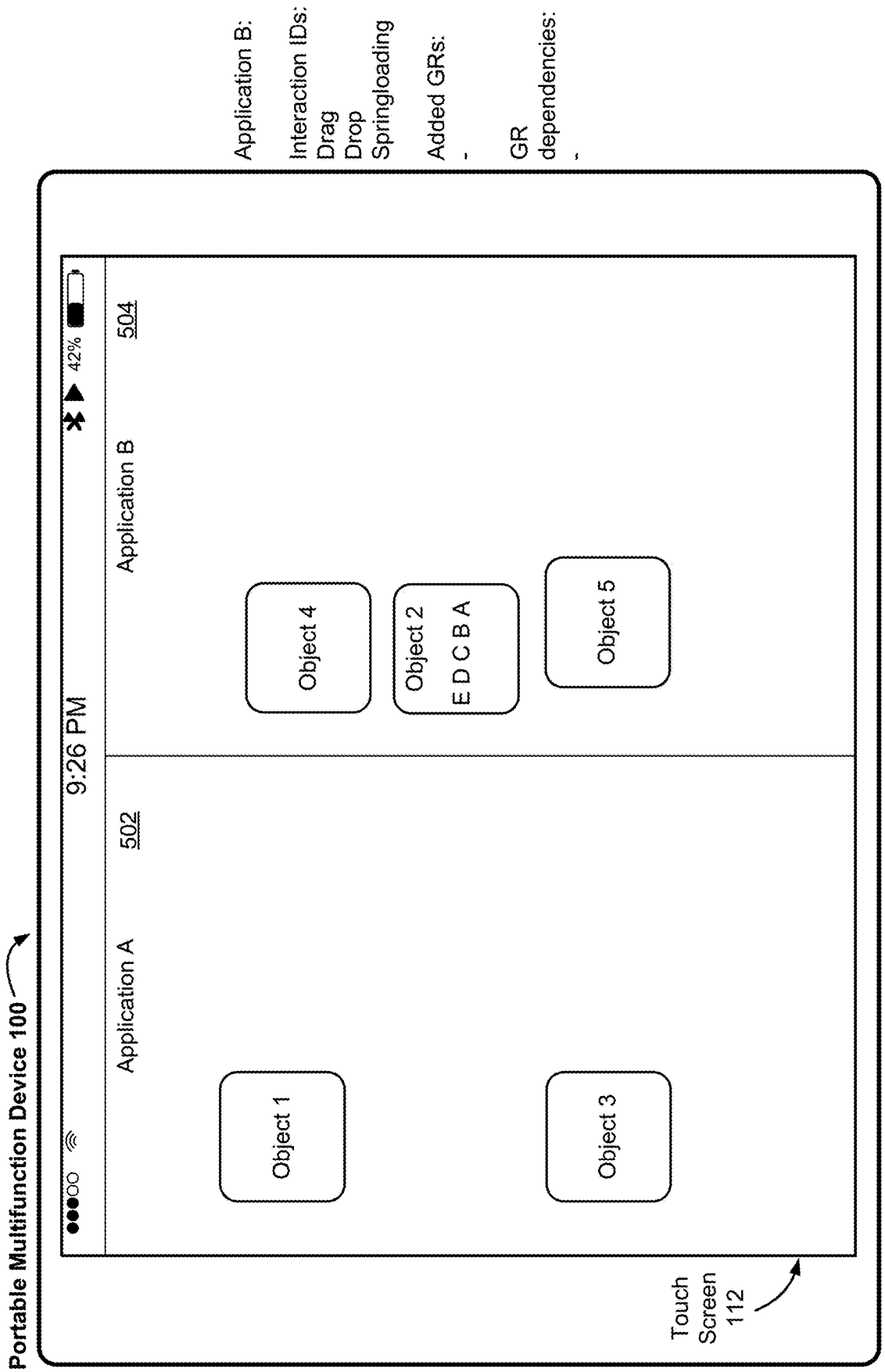
Figure 5O:
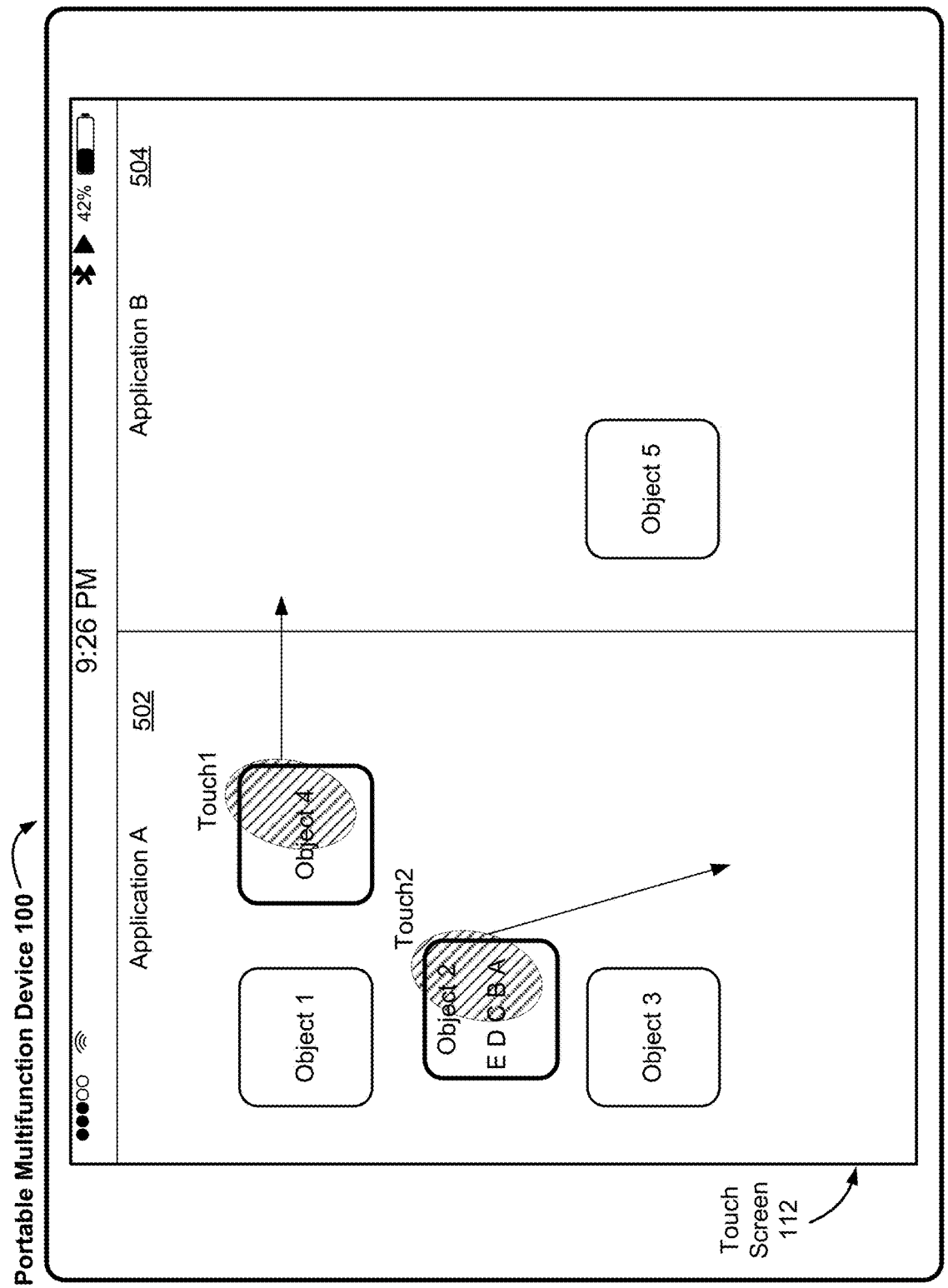
Figure 5P:
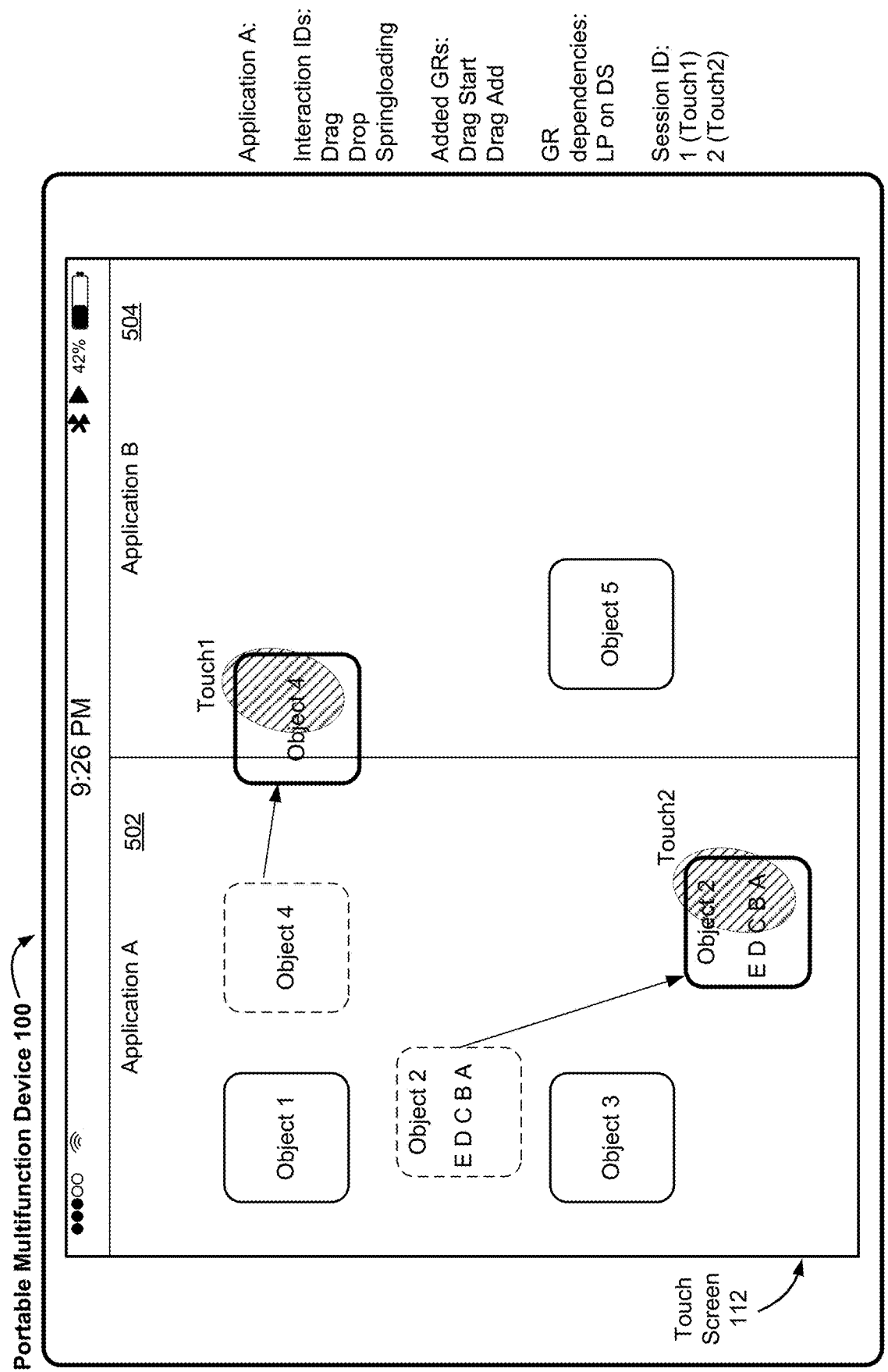
Figure 5Q:
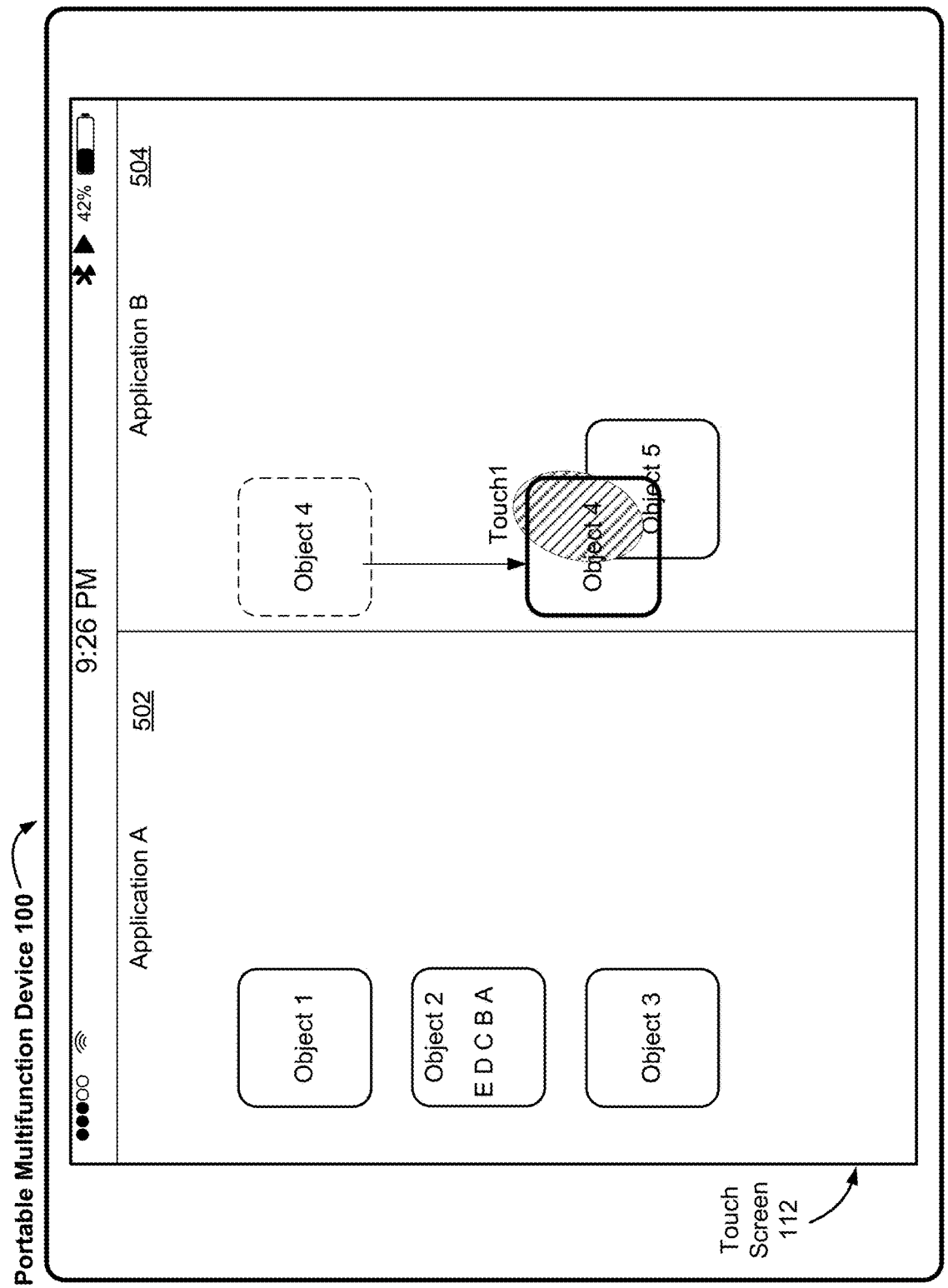
Figure 5R:
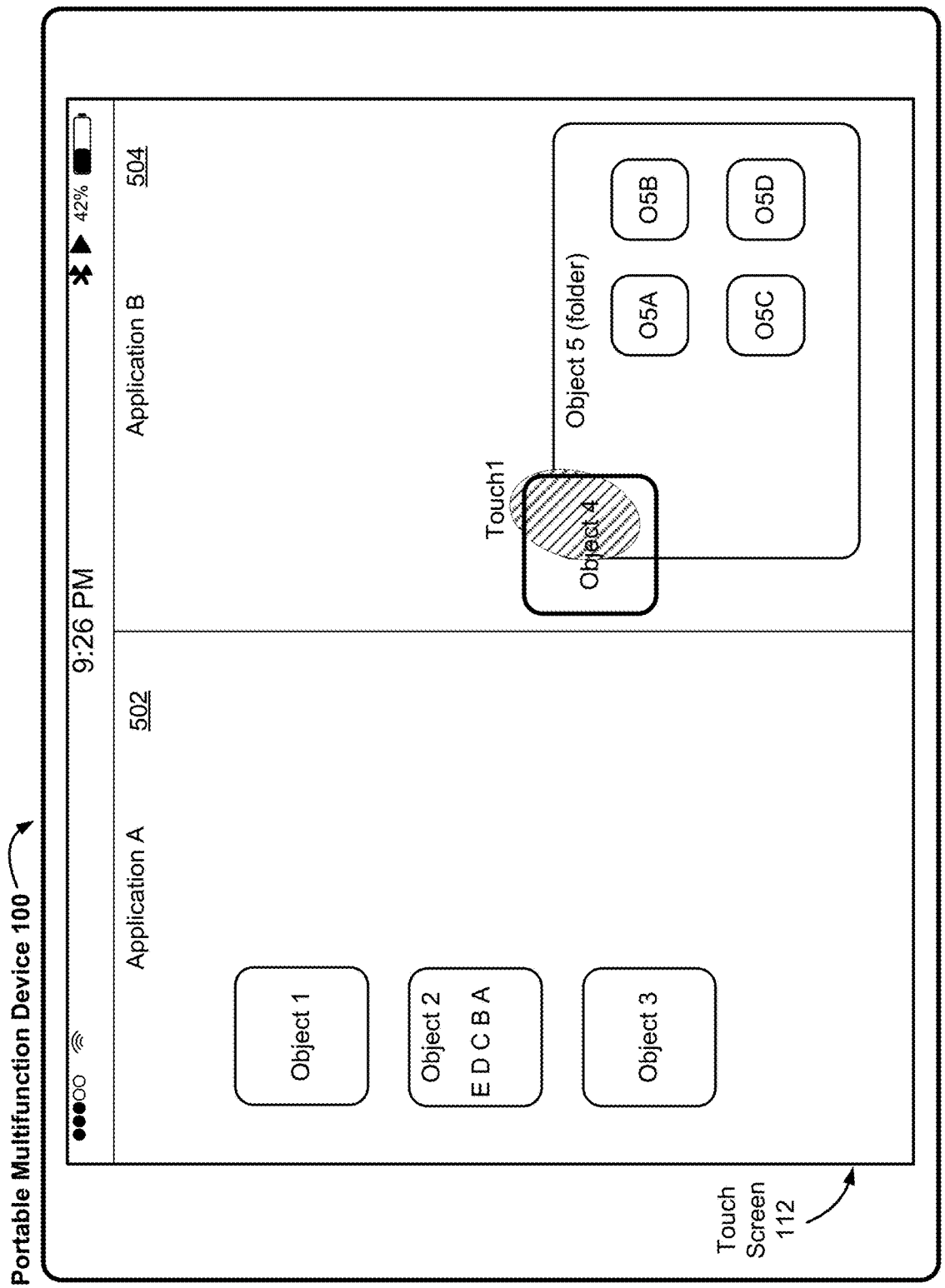
Figure 6A:
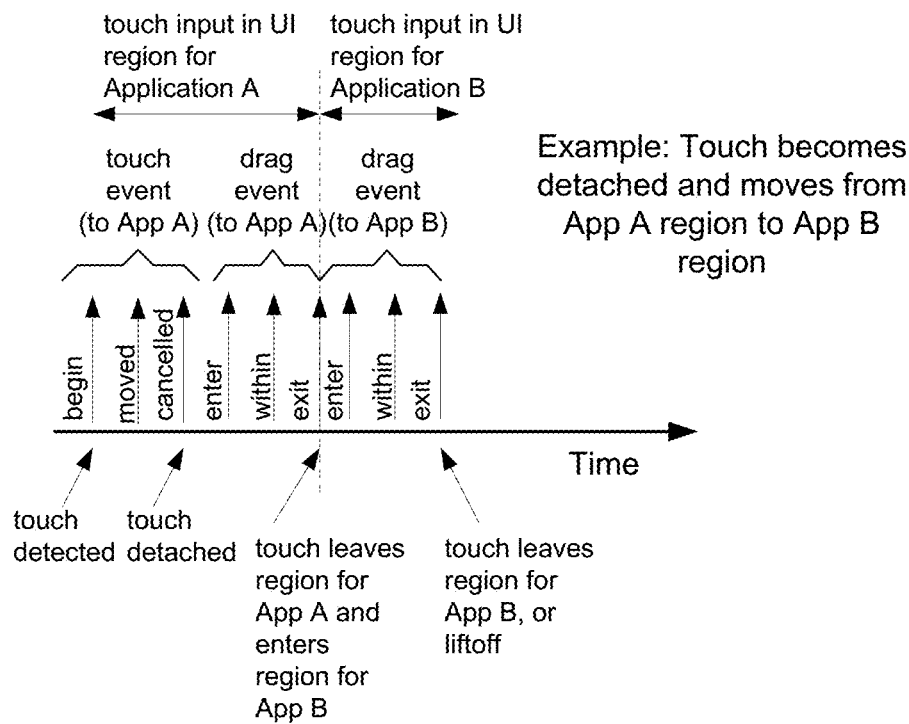
FIG. 6A illustrates touch event generation, phases and cancellation, and drag event generation and phases, during performance of a drag gesture that crosses from the user interface region of a first application or application view to the user interface region of a second application or application view, in accordance with some embodiments.
Figure 6B:
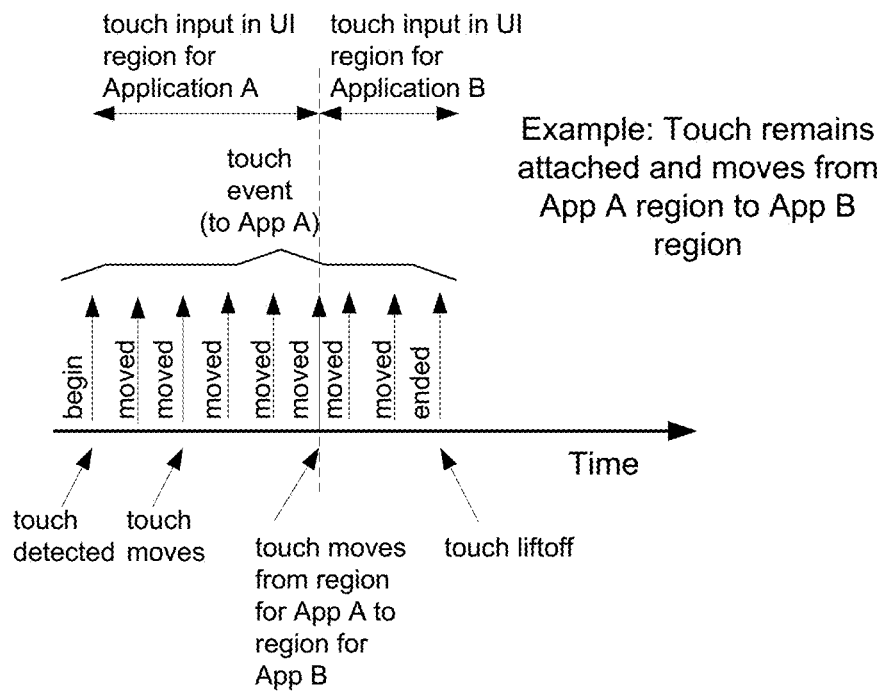
FIG. 6B illustrates touch event generation and phases while a touch is moved across the user interface region of a first application or application view to the user interface region of a second application or application view, without detaching the touch, in accordance with some embodiments.
Figure 6C:
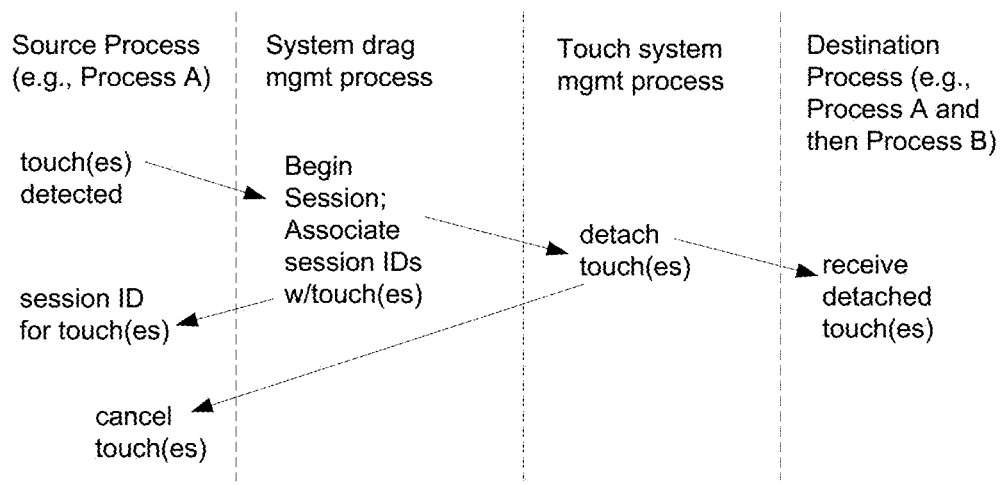
FIG. 6C depicts mechanisms for detecting a touch, detecting the start of a drag gesture in a source process, detaching the touch, associating a session ID with the touch, and providing the touch to a destination process, in accordance with some embodiments.

FIGS. 5A-5R illustrate example user interfaces for drag and drop operations in accordance with some embodiments. The user interfaces in these figures are used to illustrate the processes described below, including the processes described below with respect to FIGS. 7A-7F, 8A-8E, and 9A-9D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

In FIGS. 5A-5R and the descriptions of methods 700, 800 and 900, below, touches or touch inputs, and movements of touches or touch inputs, are under the control of a respective user, via placement and/or movement on, or in close proximity to, a touch screen (e.g., touch screen 112) or touchpad (e.g., touchpad 355, sometimes called a track pad) or other touch-sensitive surface of A) one or more fingers of a user of an electronic device, or B) a stylus of similar implement.

FIG. 5A illustrates the user interface of a portable multifunction device 100, displayed on a touch screen 112, with a user interface region 502 for a first application, Application A, and another user interface region 504 for a second application, Application B. The user interface region 502 for application A includes four objects, Object 1, Object 2, Object 3 and Object 4, and the user interface region 504 for application B includes a fifth object, Object 5. In some embodiments, region 502 of Application A may be a view of Application A. In some embodiments, the displayed representations of objects 1-4 in region 502 may also be views of Application A. Similarly, region 504 of Application B may be a view of Application B, and the displayed representation of Object 5 in region 504 may also be a view of Application B.

As shown on the right side of FIG. 5A, Application A or one or more of the views of Application A have interaction identifiers for drag operations, drop operations and spring-loading operations, indicating that supplemental gesture recognizers for drag gestures, drop gestures and springloading gestures can (or will be) added to one or more of the views of Application A when applicable supplemental-gesture-recognizer addition criteria are satisfied. In some embodiments, interaction identifiers are stored or included in view metadata 341 (FIG. 3B) of each application view having such interaction identifiers. Also, in the example shown in FIG. 5A, no supplemental gesture recognizers have been added to any of the views of Application A, nor have any gesture recognizer failure dependencies been established.

FIG. 5B illustrates a first touch (Touch1) on Object 4 in the user interface shown in FIG. 5A. As a result, the appearance of Object 4 in user interface region 502 of Application A is updated. In addition, a focus selector 506 is now overlapping Object4, indicating the position of the first touch input.

In the event that the first touch is moved laterally (e.g., to position 505 in the user interface region 502) without satisfying predefined drag start recognition criteria (discussed in more detail below), the focus selector associated with first touch moves (e.g., to position 505) without dragging the object, Object 4, on which it was initially placed. As discussed below with reference to FIG. 5D, this outcome may occur when the first touch is moved laterally prior to remaining at an initial touch position for at least the minimum amount of time that a touch input must remain in contact with the touch-sensitive surface of the electronic device, without substantial lateral movement, before beginning lateral movement, in order to satisfy predefined drag start recognition criteria.

As shown on the right side of FIG. 5B, the time at which the first touch (Touch1) on Object 4 is detected is time=$t_1$. Application A or its views continue to have interaction identifiers for drag operations, drop operations and springloading operations. Also, in the example shown in FIG. 5B, supplemental gesture recognizers for recognizing a drag start, the beginning of a drag gesture, and a drag add, which is gesture for adding an object to an existing drag operation, have been added to either the application view corresponding to Object 4, or to the view for user interface region 504. Furthermore, a gesture recognizer failure dependency been established, making the long press (LP) gesture recognizer for the application view corresponding to Object 4, or to the view for user interface region 504, dependent on the failure of the drag start (DS) gesture recognizer. In some embodiments, this failure dependency is indicated by listing the drag gesture recognizer in the wait-for-list 327 (FIG. 3B) of the long press gesture recognizer.

Further discussion regarding interaction identifiers, supplemental gesture recognizers and the automatic or dynamic addition of supplemental gesture recognizers to an application or application view, and the automatic establishment of failure dependencies between standard gesture recognizers and supplemental gesture recognizers is provided below with respect to FIGS. 6D, 6E, 7A-7F, 8A-8E and 9A-9D.

FIG. 5C illustrates the user interface generated when the first touch, Touch1, is recognized by a deep press (e.g., intensity based) or long press (e.g., time based) gesture recognizer. In this example, a set of menu options associated with Object 4 is displayed in response to recognition of the first touch as a long press gesture.

As shown on the right side of FIG. 5C, the time at which the first touch (Touch1) on Object 4 is recognized as a long press gesture is time=$t_1$+T2, where $t_1$ is the time at which the first touch was first detected. In some embodiments, T2 is a threshold amount of time that a touch input must remain in contact with the touch-sensitive surface of the electronic device, without substantial lateral movement, in order to satisfy predefined long press recognition criteria.

FIG. 5D illustrates the beginning of a drag gesture by the first touch, Touch1. As a result, Object 4 has moved or dragged along with the first touch. At this point, the first touch and Object 4 remain in user interface region 502 of Application A.

As shown on the right side of FIG. 5D, the time at which the first touch (Touch1) on Object 4 is recognized as a drag start gesture is time=$t_1$+T3, where $t_1$ is the time at which the first touch was first detected. In some embodiments, T3 is at least the minimum amount of time that a touch input must remain in contact with the touch-sensitive surface of the electronic device, without substantial lateral movement, before beginning lateral movement, in order to satisfy predefined drag start recognition criteria. In contrast, if the movement of Touch 1 were to be detected before the time threshold (T3) had elapsed, Touch 1 would have moved on the display (e.g., to position 505, shown in FIG. 5B) without initiating a drag gesture and thus without dragging Object 4.

In some embodiments, after initially recognizing a touch input, using a standard gesture recognizer, for example as a long touch, as shown in FIG. 5C, an electronic device subsequently recognizes the touch input, using a supplemental gesture recognizer, as a second gesture, such as a drag start gesture, as shown in FIG. 5D. In such embodiments, T3 (FIG. 5D) is a larger or longer time interval than T2 (FIG. 5C).

As also shown on the right side of FIG. 5D, a session ID (equal to 1 in this example) has been assigned to the first touch, or to the objects being dragged by the first touch. As described in more below, a session ID is assigned to a touch when the touch is recognized as a drag gesture, becomes a detached touch. The session ID corresponds to a set of supplemental gesture recognizers, added to Application A or one or more of its views, that govern the processing of the first touch, once it has been recognized as a drag gesture. Other drag gestures (e.g., concurrent or subsequent drag gestures) would get their own session ID different from the session ID for drag including the first touch.

In these figures (e.g., FIGS. 5A-5R), detached touches are depicted using a distinct graphic (an oval with a striped fill pattern) from regular touches (an oval with a cross-hatched fill pattern and a darker perimeter than detached touches), also called attached touches or view-attached touches. In some embodiments, a detached touch is detached from the standard gesture recognizers of the application views or user interface regions it traverses, and as a result, touch events (sometimes herein called drag events) associated with placement and/or movement of the detached touch are processed by supplemental gesture recognizers associated with those views or user interface regions, but not standard gesture recognizers associated with those views or user interface regions. Supplemental gesture recognizers are dynamically added (e.g., by a system process) to an application or view when predefined criteria are satisfied. Touch events associated with placement and/or movement of regular touches (sometimes herein called attached touches or view-attached touches) are processed by the standard gesture recognizers associated with those views or user interface regions. Standard gesture recognizers are typically associated with or assigned to the application views or user interface regions of an application by the application.

In FIG. 5E, the first touch has moved to user interface region 504 of Application B, dragging Object 4 with it. The right side of FIG. 5E shows that Application B or one or more of the views of Application B have interaction identifiers for drop operations and springloading operations, indicating that supplemental gesture recognizers for drop gestures and springloading gestures can (or will be) added to one or more of the views of Application B when applicable supplemental-gesture-recognizer addition criteria are satisfied. Also, in the example shown in FIG. 5E, one or more supplemental gesture recognizers for drop gestures have been added to one or more views of Application B, no gesture recognizer failure dependencies have been established, and a session ID has been assigned (or continues to be assigned) to the drag operation that includes the first touch. Other examples of supplemental gesture recognizers added to a view, and other examples of gesture recognizer failure dependencies, are discussed below with respect to later figures in this sequence, such as FIG. 5M.

In FIG. 5F, a two-finger touch input (e.g., two concurrently detected touches, both on the same object or view in an application) is detected on Object 4. In some embodiments, a two-finger touch is used to initiate a drag operation without having to wait for a timeout period before beginning lateral movement (e.g., dragging) of the touch input.

In FIG. 5G, the two-finger touch begins to move, dragging Object 4 with it. The time in this figure is time=$t_1$+ΔT, where $t_1$ is the time at which the first touch was first detected and ΔT is a time period shorter than the T2 and T3 time periods discussed above. In some embodiments or circumstances, ΔT is close to but greater than zero. Movement of the two finger touch results in the touches being detached, and assignment of a session ID to both touch inputs (e.g., Touch1 and Touch2). As described in more detail below, both touches are detached upon determination that the touches meet predefined drag start criteria. The interaction identifiers, added gesture recognizers and failure dependencies are the same as in FIG. 5D. Recognition of the drag gesture is indicated in FIG. 5G by the change in appearance of the dragged object (e.g., the perimeter is drawn with a thicker perimeter) and detachment of the two touches is indicated in FIG. 5G by the changed appearance of the two touches.

In FIG. 5H, the two-finger touch moves from user interface region 502 of Application A into user interface region 504 of Application B. Upon the entry of the two-finger touch into user interface region 504 of Application B, the drop gesture recognizer is added to user interface region 504. As also indicated by FIG. 5H, user interface region 504 has interaction identifiers for drag, drop and springloading interactions.

FIG. 5I represents a transition that occurs from the user interface shown in FIG. 5D when a second touch, Touch2, is detected. In this example, the second touch is on an object, Object 2, in the user interface region 502 for Application A. Since the first touch has already been detached, the second touch is processed independently of the first touch, unless the second input is recognized as a drag add gesture. Thus, if the second touch is not recognized as a drag add gesture, the second touch is processed using the standard gesture recognizers for user interface region 502 of Application A. In this example, Object 1, Object 2 and Object 3 are elements of a vertically scrollable list in Application A. When the second touch, Touch2, moves vertically downward, as shown in FIG. 5J, the scrollable list is scrolled downward by an amount corresponding to the amount of vertical movement of the second touch. As shown, the movement of the second touch need not be entirely vertical to cause scrolling. The scrolling of the scrollable list results in an additional element, Object Z, being scrolled into view, at the top of the displayed scrollable list.

In FIG. 5K, the second touch, Touch2, continues to be moved (e.g., by a user of the device 100). In this example, the movement of the second touch is both downward and horizontally over into the user interface region 504 of Application B. Since the second touch has not been recognized as a drag start gesture, it remains attached to Application A or one or move views of Application A, even as the second touch moves into user interface region 504, and as a result, touch events corresponding to the second touch continue to be delivered to Application A, and in response to those touch events, the scrollable list in user interface region 502 of Application A continues to be scrolled in accordance with the amount of vertical movement of the second touch. The continued scrolling of the scrollable list results in yet another additional element, Object Y, being scrolled into view at the top of the displayed scrollable list.

Referring once again to FIG. 5I, in some embodiments, a drag add gesture is a tap or other distinctive touch gesture performed on an object that is available for adding to the drag operation (e.g., an object that is within a predefined distance from an object already participating in a drag operation or an object that has been specified as available for adding to a drag gesture (e.g., by the application in which the object is displayed). If the second touch shown in FIG. 5I is recognized as a drag add gesture, Object 2 is added to the drag operation associated with the first touch, as shown in FIG. 5L. In FIGS. 5I and 5L, time $t_2$ corresponds to the time the second touch, Touch2, is first detected, and T4 is or corresponds to the maximum duration of a drag add gesture.

In FIG. 5L, Object 2 is stacked behind Object 4, and both objects (Object 2 and Object 4) are dragged as the first touch moves laterally on touch screen 112. In some embodiments, the drag add gesture is required to be a two-finger tap gesture, instead of the one finger tap gesture shown in FIGS. 5I and 5L, while in some other embodiments, both one finger tap gestures and two finger tap gestures are can be drag add gestures, so long as they satisfy predefined drag criteria (e.g., a requirement that the user input include a contact at a location that corresponds to a user interface object that can be dragged, and a requirement that a distance between the first touch, for which a drag operation has been recognized, and the second touch be no greater than a predefined distance or proximity threshold).

In FIG. 5M, Object 4 and Object 2, shown only as a shadow as it is stacked under Object 4, have both been dragged into user interface region 504 of Application B. In this example, drop and springloading supplemental gesture recognizers are added to the user interface 504 of Application B in response to a detached touch, Touch1, being dragged into the user interface 504 of Application B, and further more a failure dependency is created or added, making the long press gesture recognizer dependent on failure of the springloading gesture recognizer in order for the long press gesture to be recognized.

FIG. 5N shows an update of the user interface shown in FIG. 5K that occurs upon liftoff of the first touch, after Object 4 and Object 2 have been dragged into user interface region 504 of Application B. In FIG. 5N, after liftoff of the first touch, Object 4 and Object 2 are unstacked and positioned in user interface region 504 of Application B. In some embodiments, once a drag operation (or drop operation) has completed and the corresponding touch has been lifted off, the supplemental gesture recognizers used to process the touch are automatically removed, and some (or all) gesture recognizer dependencies corresponding to the removed supplemental gesture recognizers are also removed. Thus, in this example, FIG. 5N shows a set of interaction identifiers, but the supplemental gesture recognizers listed in FIG. 5M are no longer listed in FIG. 5N, and similarly, the dependency of the long press (LP) gesture recognizer on the (supplemental) springloading gesture recognizer shown in FIG. 5M is no longer present in FIG. 5N.

FIG. 5O represents a transition from the user interface shown in FIG. 5I, after the second touch, Touch2, is recognized as drag gesture. This is a second drag gesture that is independent of the first drag gesture by the first touch, and the corresponding touch, Touch2, is assigned a different session ID, for example session ID 2, then the first touch, which was assigned session ID 1 in this example. In addition, the second touch is detached upon being recognized as a touch gesture, freeing the standard gesture recognizers for user interface region 502 from having to process touch events produced by (or for) the second touch.

FIG. 5P represents a transition from the user interface shown in FIG. 5O, with the first touch, Touch1, and the second touch, Touch2, being moved in different directions, and thereby dragging Object 4 along with the movement of the first touch and dragging Object 2 along with the movement of the second touch. The first touch and second touch are independent detached touches, and each is used to drag a different object or set of objects than the other.

FIG. 5Q represents a transition from the user interface shown in FIG. 5E, after the first touch, Touch1, moves downward toward Object 5 in user interface region 504. As a result of this movement, Object 4 is now positioned at least partially over Object 5. In this example, a supplemental springloading gesture recognizer has been added to the set of gesture recognizers associated with one or more views of Application B. In some embodiments, supplemental springloading gesture recognizer is added to one or more views of Application B upon detection of a triggering event or condition, such as movement of a dragged object (e.g., Object4) over another object (e.g., Object5) that is capable of responding to a springloading gesture.

FIG. 5R represents a transition from the user interface shown in FIG. 5Q, after the placement of the first touch, Touch1, or the placement of the object (Object4) being dragged by the first touch, over Object 5 is recognized as a springloading gesture. As described in more detail below, the recognition of the springloading gesture is accomplished by one of the supplemental gesture recognizers added to user interface region 504 (e.g., a view of Application B) in accordance with a springloading interaction ID and the presence of a touch in interface region 504 that triggers the addition of one or more supplemental gesture recognizers. In response to the springloading gesture, Object 5, which is a folder object (sometimes called a container or container object), is opened, while Object 4 continues to be dragged by the first touch, Touch1, as shown in FIG. 5R. Optionally, the user could continue to move the first touch so as to drag Object 4 into the now-opened folder corresponding to Object 5, and then drop Object 4 into that folder by liftoff of the first touch from touch screen 112 after Object 4 has been dragged by the first touch into the interior of the opened folder corresponding to Object 5.

It is noted that unlike the scenario shown in FIG. 5N, in FIG. 5R the first touch continues to be in contact with touch screen 112, and thus a drop operation or even a further springloading operation could still occur, and as a result the drop and springloading supplemental gesture recognizers continue to be associated with one or more views of Application B.

Touch events for a touch are generated to represent the touch over time. Touches have phases selected from a predetermined set of phases: Touch Begin for a respective touch indicates the respective touch that has just been detected on the touch-sensitive surface, Touch Move for a respective touch indicates that the respective touch has moved on the touch-sensitive surface, Touch End for a respective touch indicates that the respective touch that has ceased to be detected on the touch-sensitive surface as part of ending a gesture, and Touch Cancel for a respective touch indicates that the respective touch has been determined to be an accidental touch or has been otherwise identified as a touch that should be ignored. In some embodiments, touch events are processed by one or more gesture recognizers to identify gestures that are being performed by touches detected on the touch-sensitive surface (e.g., taps, swipes, drags, pinches, etc.). In some embodiments, when a touch cancel event (i.e., a touch event for (or that includes) a touch having a phase equal to Touch Cancel) is sent out for a respective touch, applications performing an operation based on the respective touch cancel the operation and revert to a state before the touch was detected. In some embodiments, when a touch cancel operation is detected for a respective touch, one or more gesture recognizers that are evaluating the touch as part of a gesture are cancelled (e.g., provided that cancellation of the touch would make it impossible for the gesture definition used by the gesture recognizer to be met). In some embodiments, an application responds to a touch cancel event for a respective touch differently than it would respond to a touch end event. For example, a tap input that ends with a touch cancel event (e.g., a touch event for a touch, corresponding to the tap input, with a touch cancel phase) is ignored, while a tap input that ends with a touch end event (e.g., a touch event for a touch, corresponding to the tap input, with a touch end phase) is processed as a tap. As another example, when a moving contact is detected that moves an object across the display, if a touch event with a touch end phase is detected after the object has moved across the display the object remains where it was moved to or, optionally, continues to advance with some inertia, in contrast, if a touch event with a touch cancel phase is detected after the object has moved across the display the movement of the object is reversed to the location where it was displayed prior to detecting the moving contact. An example of a touch that is processed without detaching the touch is described below with reference to FIG. 6B.

FIG. 6A illustrates touch events and drag events generated over a period of time while a touch (sometimes called a touch input) moves from a user interface region for a first application, Application A, to a user interface region for a second application, Application B. In some embodiments, the detected touch corresponds to contact of a user's finger, or stylus or the like, on a touch-sensitive surface of an electronic device. An example of such a movement of a touch is shown in FIGS. 5B, 5D and 5E. As represented by a sequence of "touch events" in FIG. 6A, a touch event is generated when a touch is initially detected, prior to recognizing the touch input as a drag gesture. The sequence of touch events represents the touch evolving through a sequence of phases, such as begin, moved and cancelled. As the touch is initially detected in FIG. 5B, the touch is represented in a touch event with a touch began phase; as movement of the touch is detected in FIG. 5D the touch is represented in a touch event with a touch move phase; and then in FIG. 5D as the touch is recognized as a drag gesture, the touch is represented in a touch event with a touch cancel phase. Instances of the touch event, with touch phase values corresponding to the phase or state of the touch, are delivered to Application A for processing, for example to update a user interface of Application A. In some embodiments, multiple instances of the touch event with a touch phase equal to "moved" may be generated while the touch input moves.

When the touch input is recognized as a drag gesture, the touch event is canceled and a drag event is generated. Canceling the touch input for Application A enables Application A to reverse any operations that were performed in response to detecting the touch (e.g., the menu in FIG. 5C, which was displayed in response to detecting the touch on Object 4 for a threshold amount of time ceases to be displayed when Touch 1 is canceled in FIG. 5D due to the recognition of Touch 1 as part of the drag gesture) and ignore the touch for the purpose of identifying gestures performed by attached touches. In some embodiments, the drag event is a touch event that is marked or processed as a detached touch. In some embodiments, a touch event delivered to an application, such as Application A, includes a list of touches associated with Application A or views of Application A, and the list of touches indicates for each listed touch whether the listed touch is an attached touch (sometimes called a view-attached touch) or detached touch.

Attached touches delivered to Application A are processed by both the standard gesture recognizers associated with Application A or views of Application A as well as any supplemental gesture recognizers associated with Application A or views of Application A (e.g., gesture recognizers added to a respective view of Application A as a result of interaction identifiers associated with the respective view of Application A). On the other hand, detached touches delivered to Application A are processed by only the supplemental gesture recognizers associated with Application A or views of Application A, and are not processed by, and thus are ignored by the standard gesture recognizers associated with Application A or views of Application A.

The touch associated with a drag event also has a sequence of phases, such as "enter," "within" and "exit." Instances of the drag event are generated over time as the touch moves, with the touch in a first instance of the drag event having a phase (sometimes called a touch phase) equal to "enter," and the touch in subsequent instances of the drag event having a phase equal to "within" (e.g., corresponding to movement within a view or application view, sometimes called a user interface region), and the touch in a final instance of the drag event having a phase equal to "exit" that is generated either in response to liftoff of the touch, or the touch leaving a respective view.

As also noted in FIG. 6A, when the touch is detached the touch event identifies the touch as being canceled and the touch is included in a corresponding drag event that identifies the touch as having a "enter" phase, all of which occur in response to recognition of the corresponding touch as a drag gesture. It is noted that the initial recognition of a touch as a drag gesture is sometimes called recognition of a drag start gesture.

FIG. 6B is similar to FIG. 6A, but corresponds to movement of an attached touch from a starting location in the user interface region of Application A to an ending location in the user interface region of Application B. Since the touch is not detached, for example because it is not recognized as a drag gesture, only touch event instances are generated, and all are delivered to Application A, since attached touches are delivered to the application or application view associated with the initial touch location of the attached touch even if the touch moves outside of the application or application view associated with the initial touch location, in accordance with some embodiments. The phases of the touch in touch events generated in this example are "begin," when the touch is initially detected, "moved" as movement of the touch is detected, and then "ended" when liftoff of the touch is detected.

FIG. 6C schematically shows processing of detected touches by a set of processes: a source process (Process A), corresponding to a first application, such as Application A; a system drag management process, which in some embodiments executes contact/motion module 130 (FIG. 1 and FIG. 3A) or a portion of contact/motion module; a system touch management process, which corresponds to hit view determination module 314 (FIG. 3B); and a destination process, corresponding to a second application, such as Application B. As shown in FIG. 6C, when one or more touches are detected and determined to be performing a drag gesture, the system drag management process begins a session for the one or more touches, and sends to the source process a session ID that it assigned to the one or more touches. The system drag management process also passes along information about the one or more touches to the system touch management, which detaches the one or more touches, and sends a touch cancel event or instruction to the source process. The touch cancel event or instruction causes the standard gesture recognizers of the source process to transition to a terminal state and stop processing the one or more detached touches. In addition, when the one or more touches move into the user interface region for the second application, system touch management passes information about the detached one or more touches to the destination process.

Figure 6D:
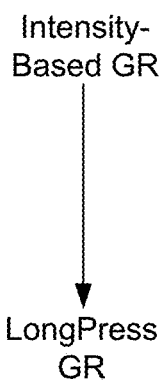
FIGS. 6D and 6E depicts a gesture recognition hierarchy before and after the addition of one or more supplemental gesture recognizers to an application view, in accordance with some embodiments.
Figure 6E:
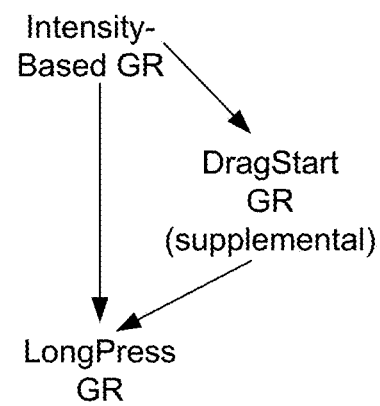
Figure 7B:
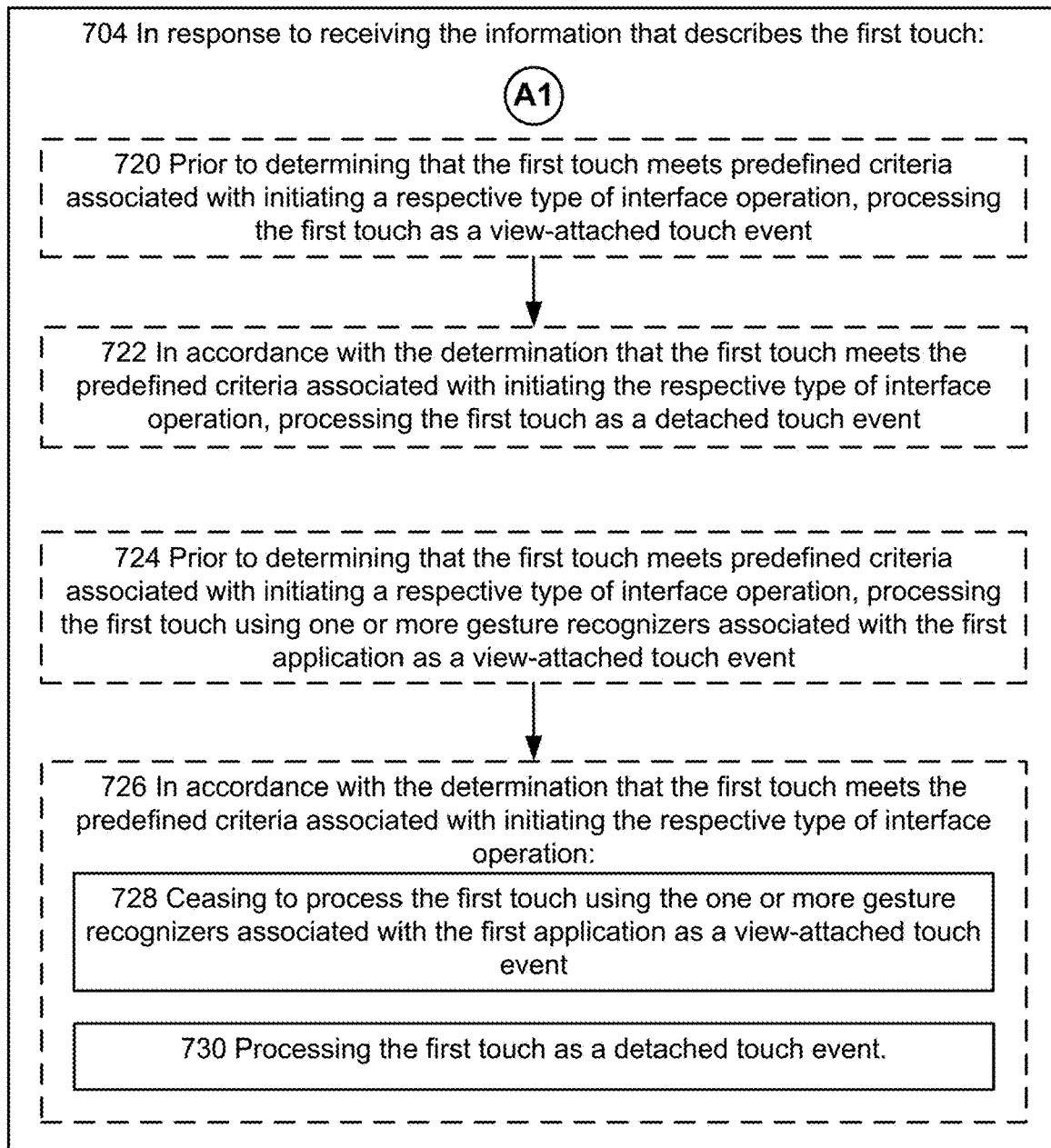
Figure 7C:
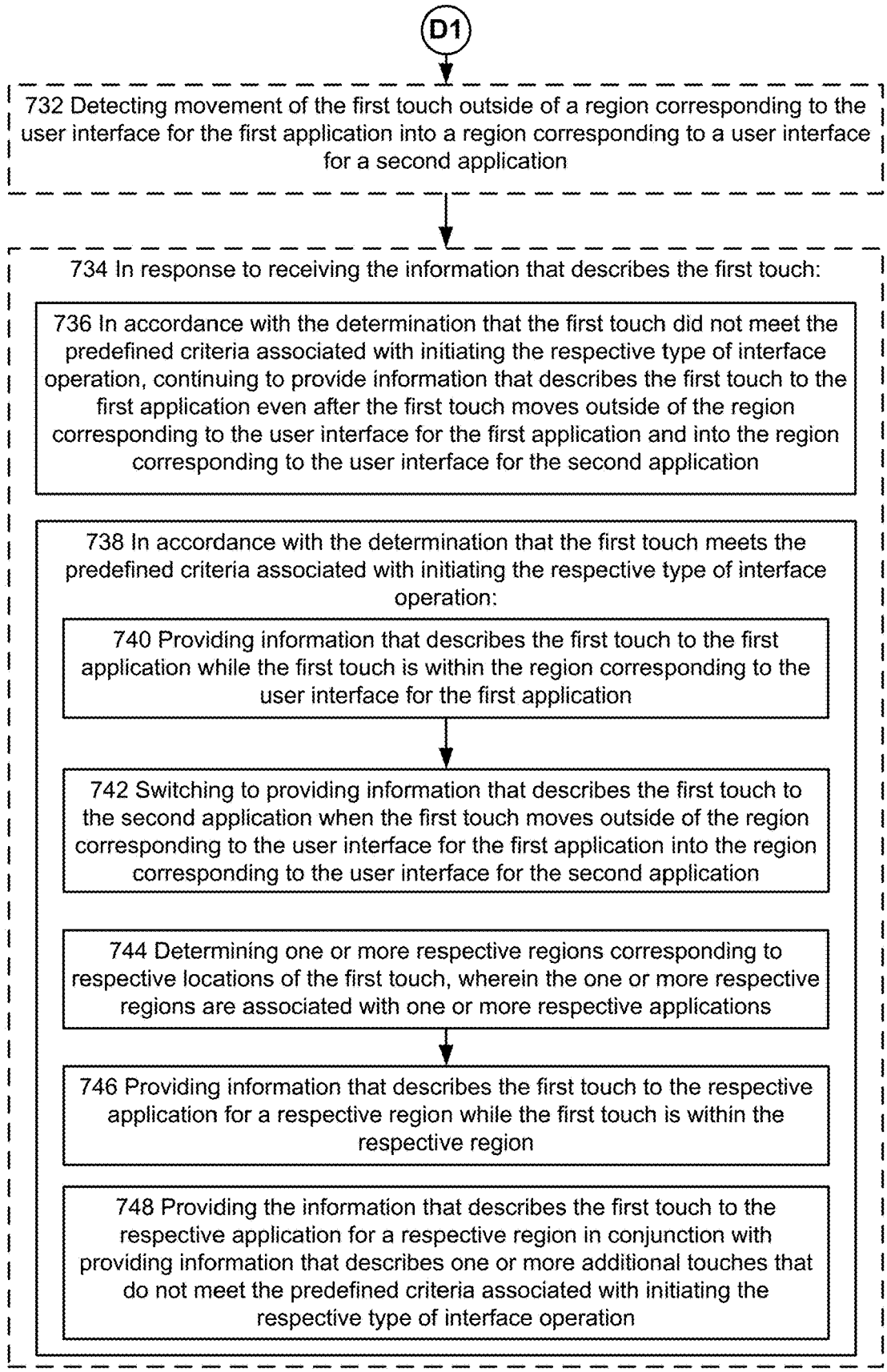
Figure 7E:
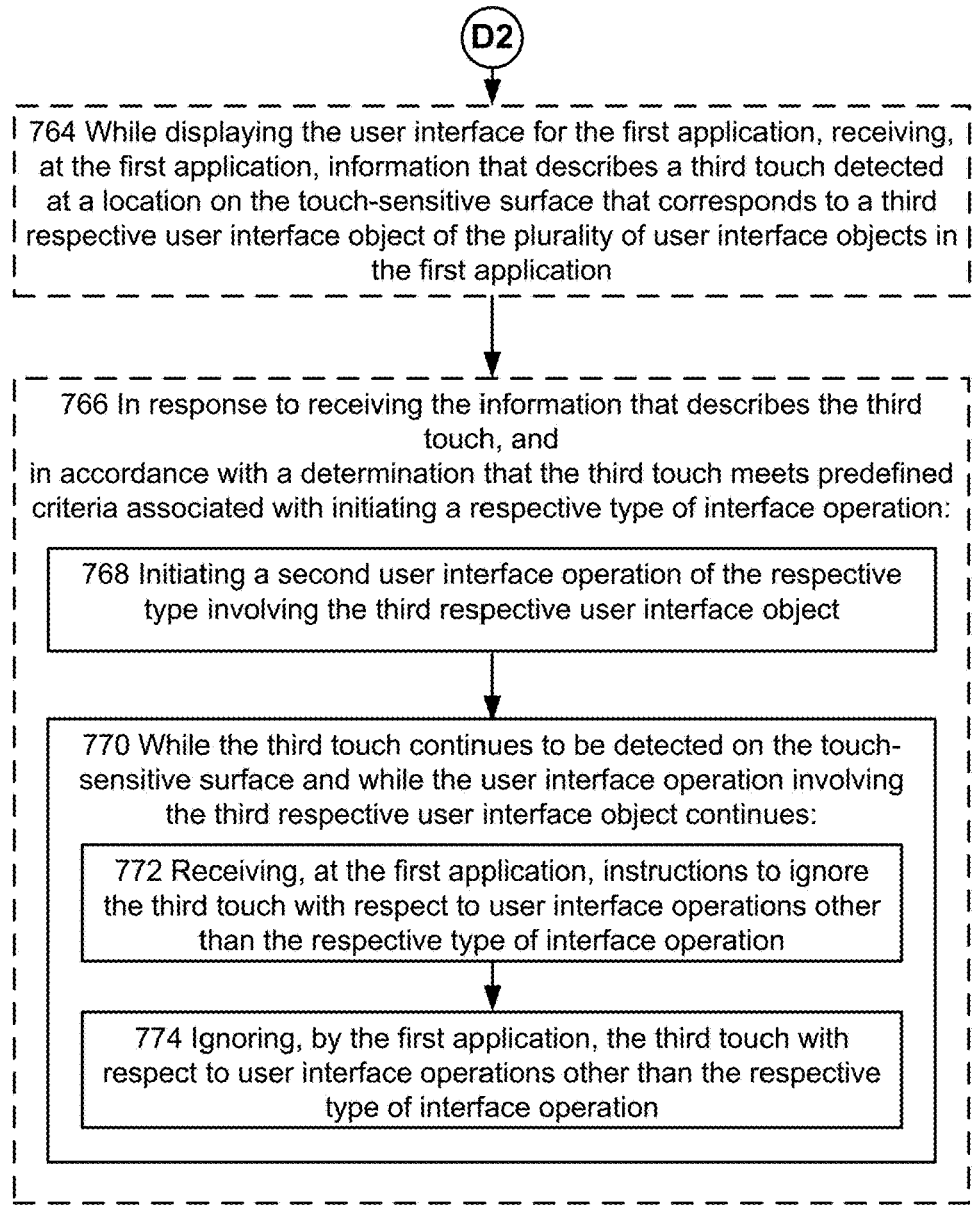
Figure 7E:
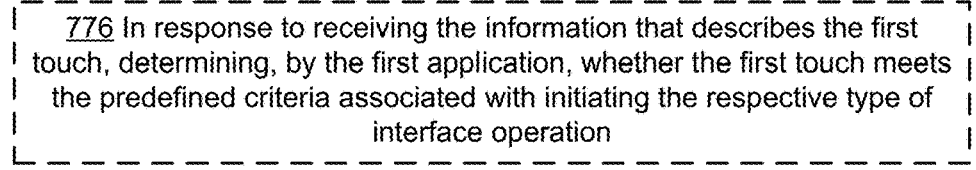
Figure 8B:
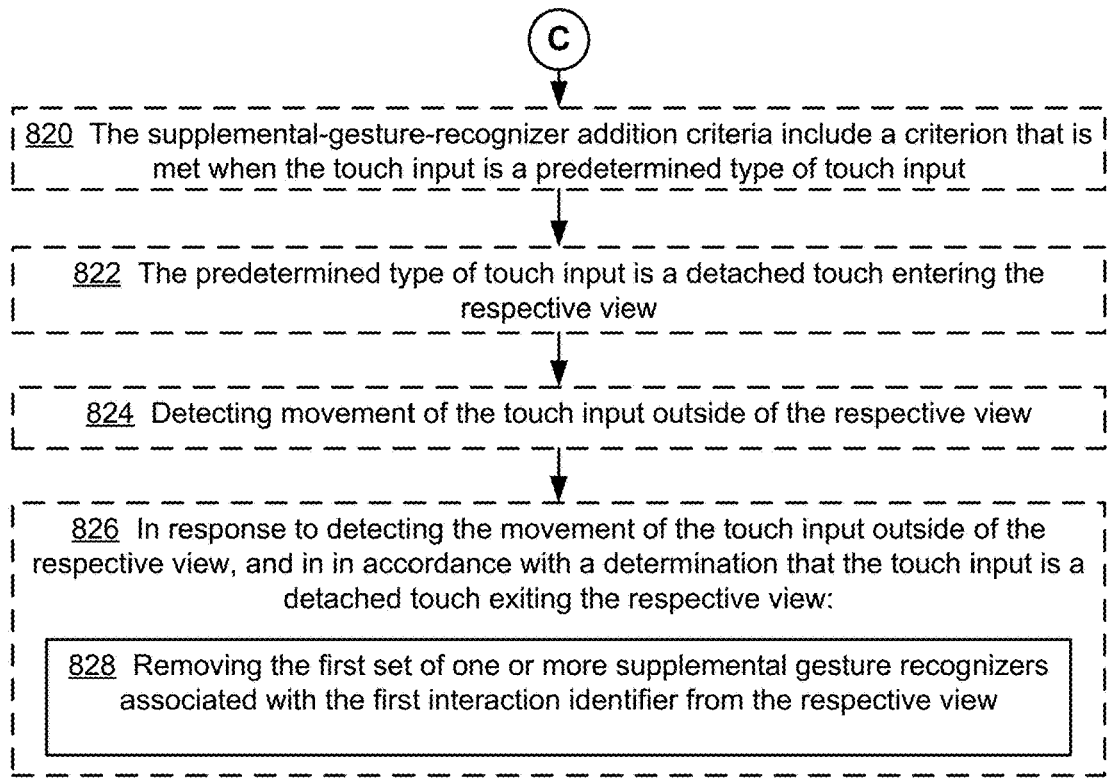
Figure 8B:
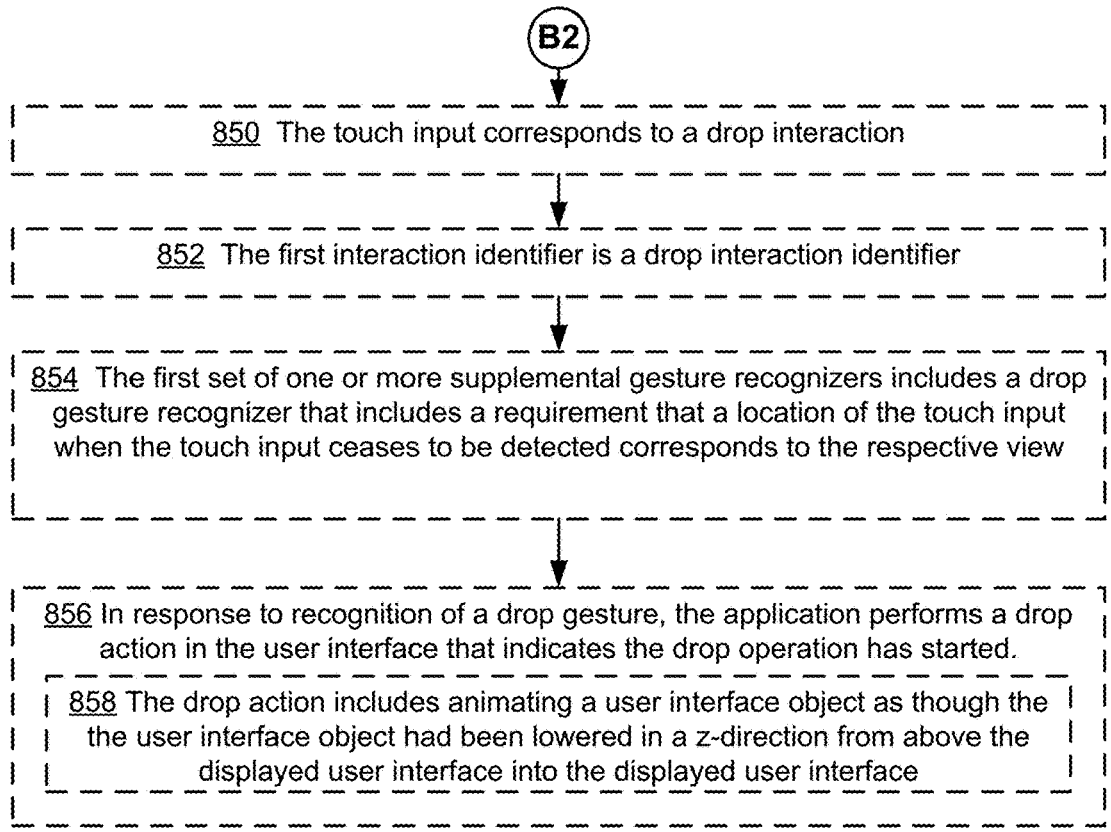
Figure 8C:
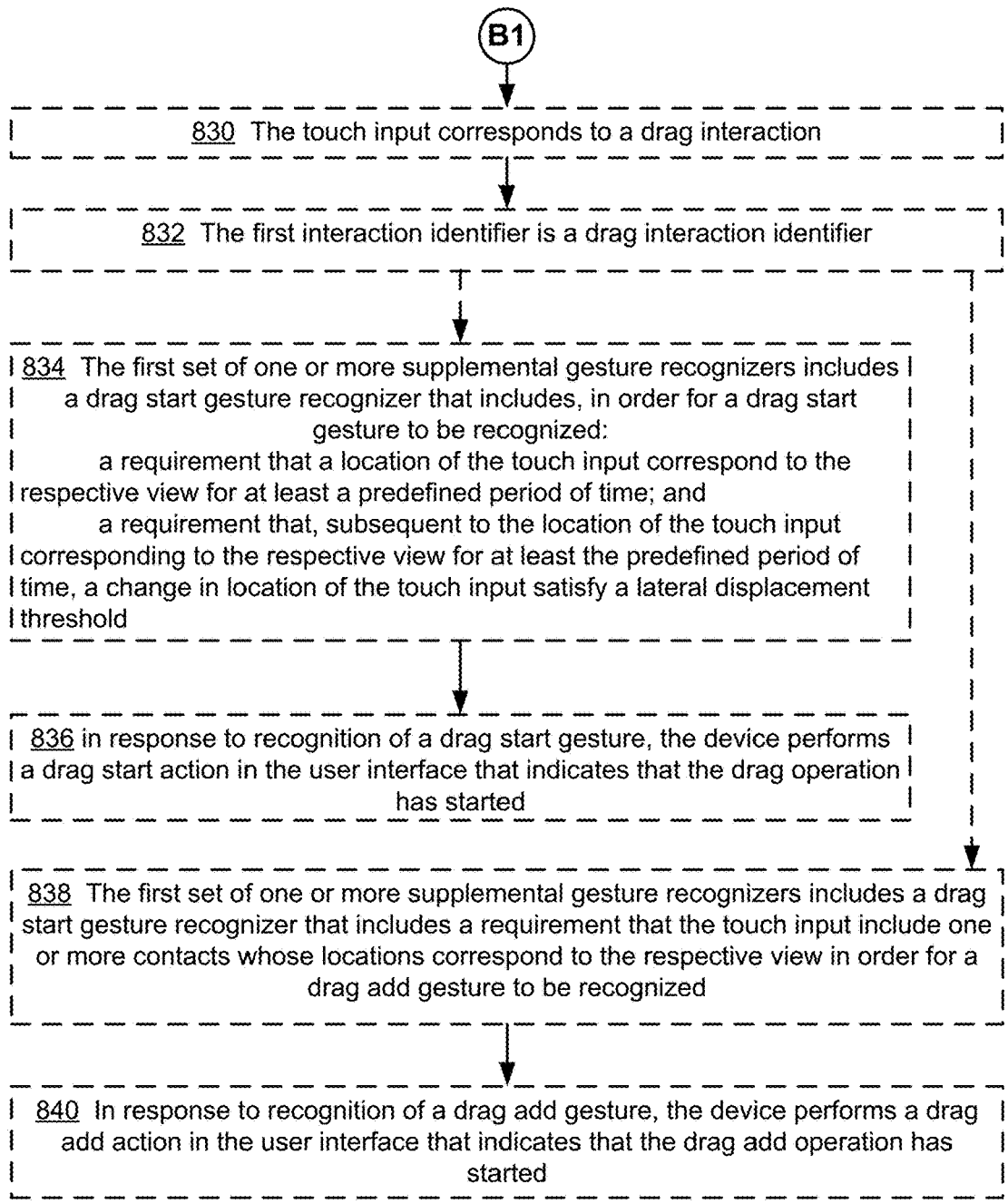
Figure 8D:
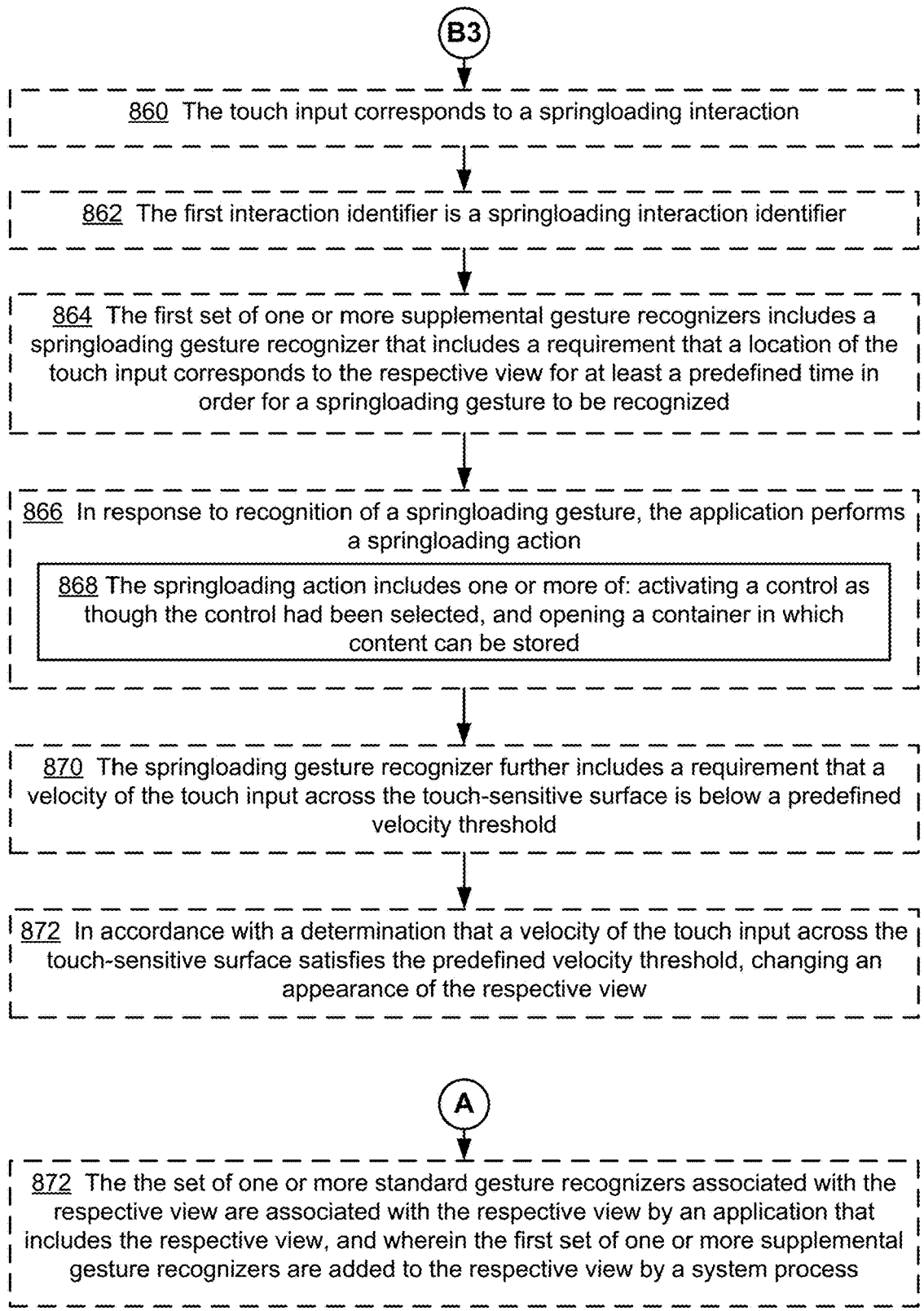
Figure 8E:
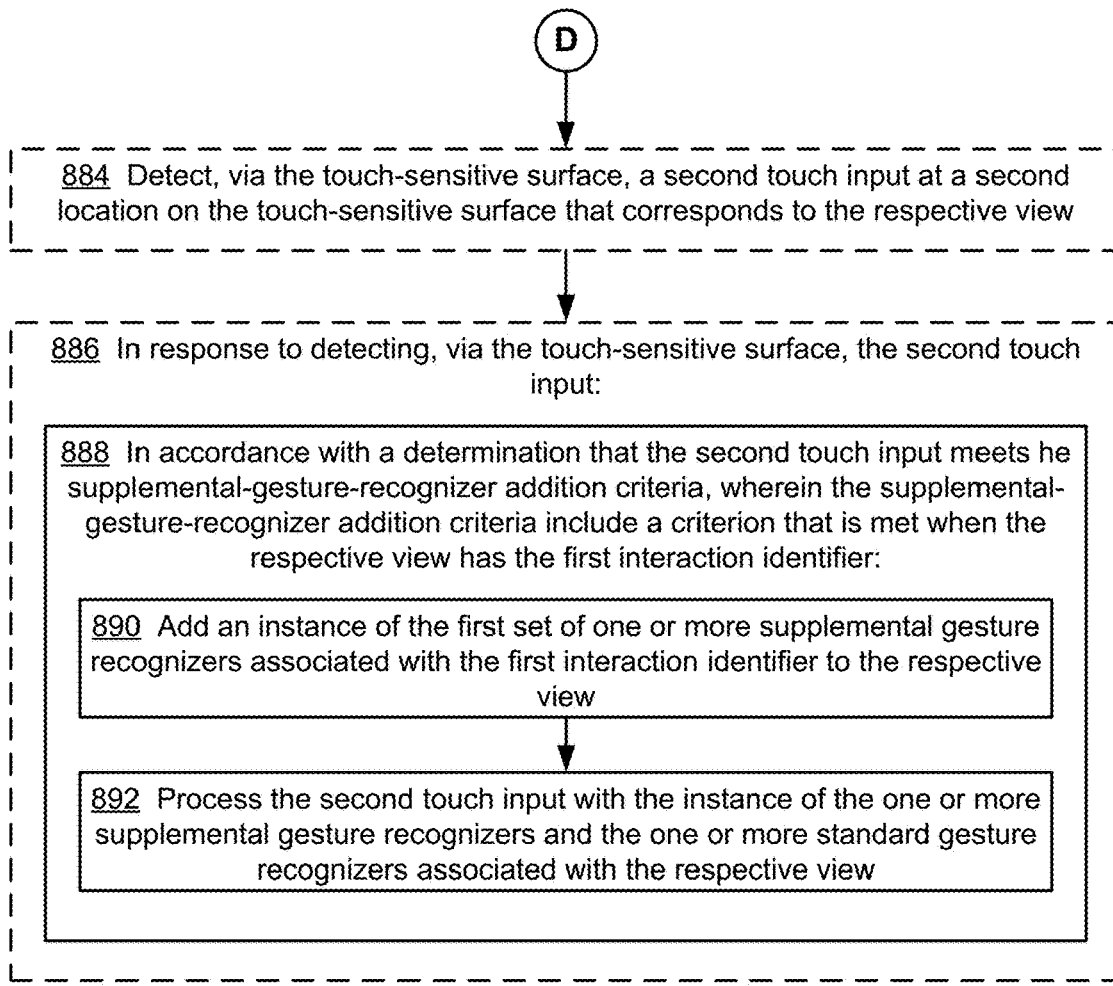
Figure 9B:
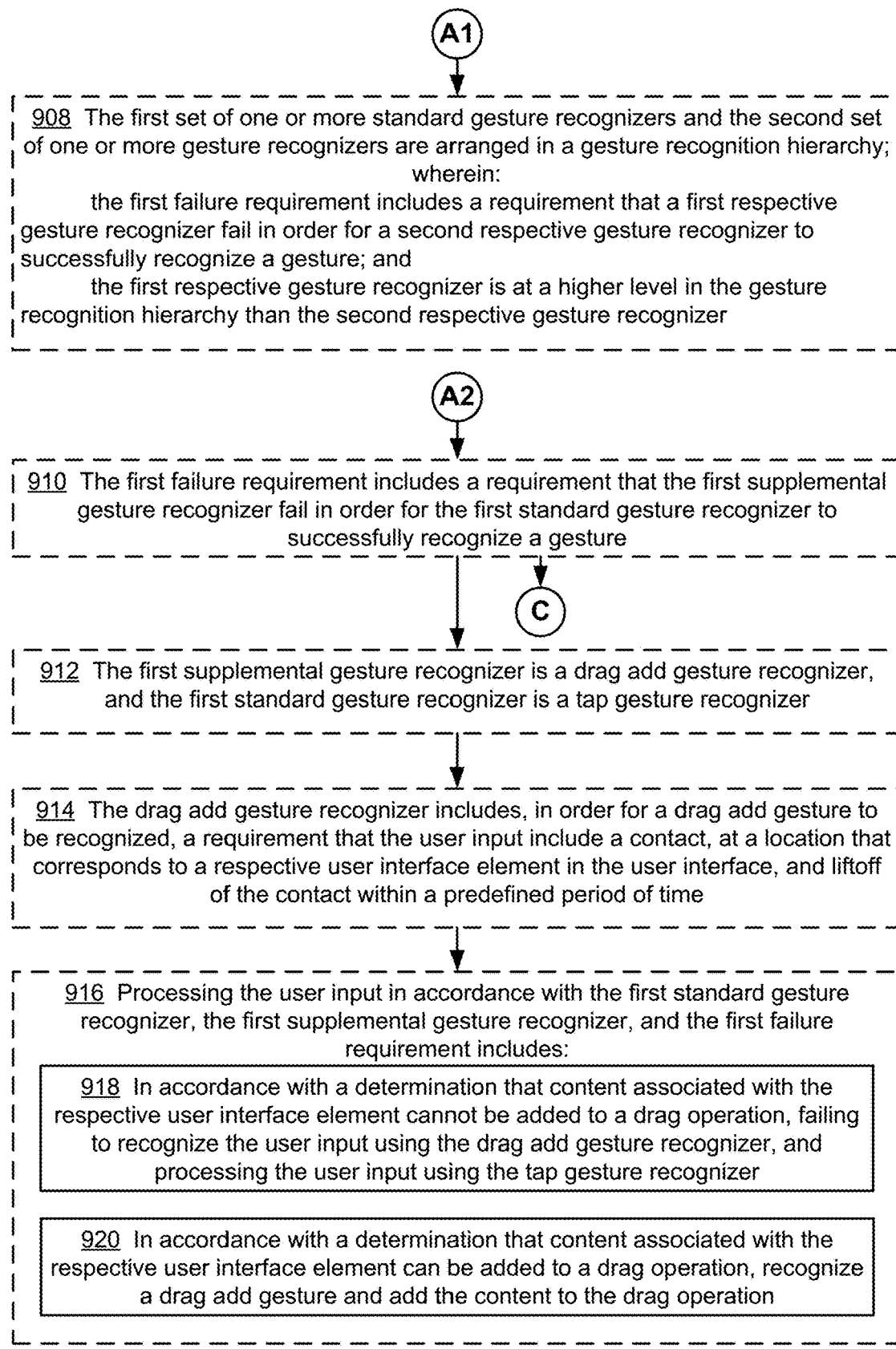
Figure 9C:
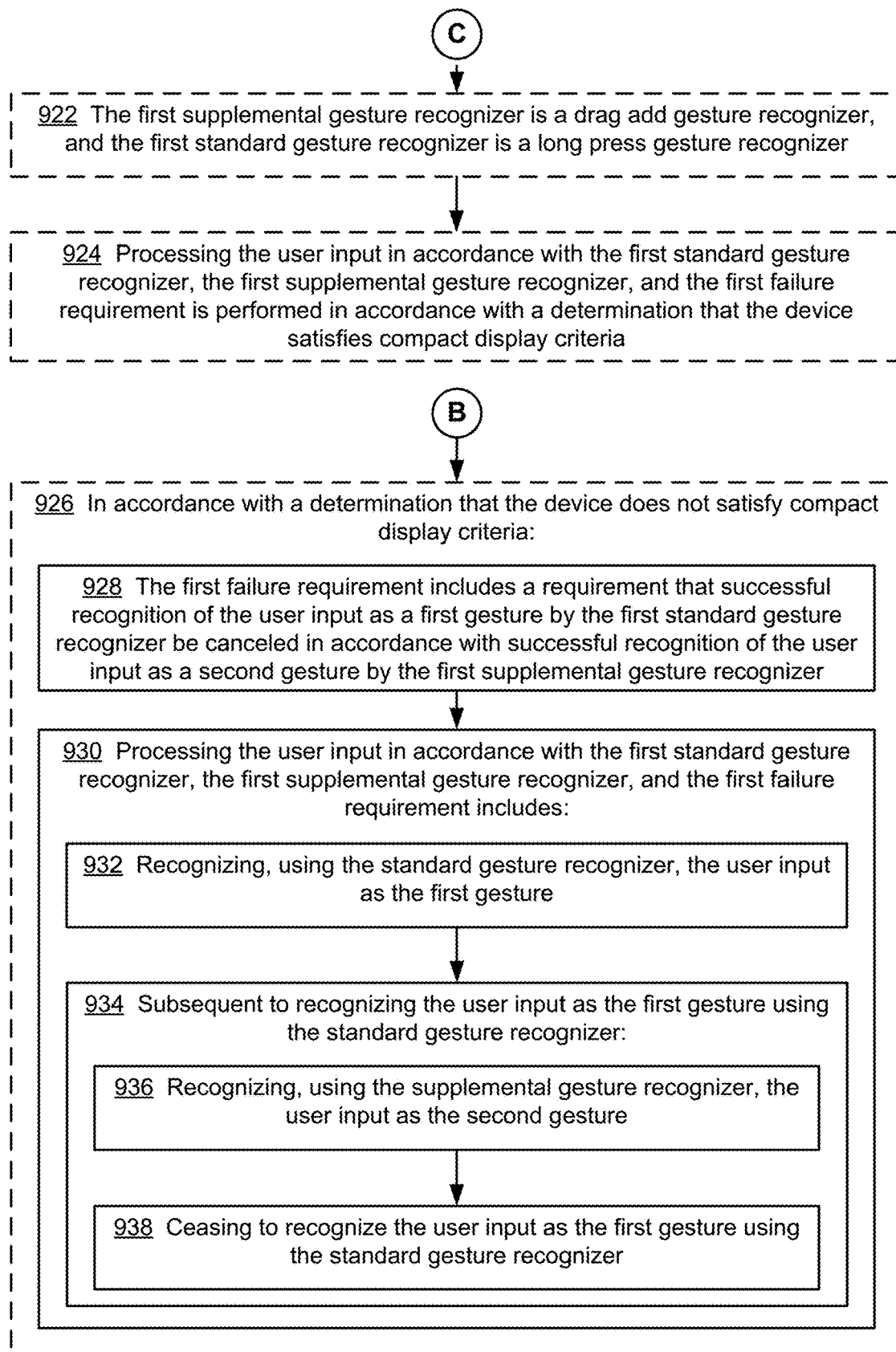

FIG. 6D shows an example of a gesture recognition hierarchy 600-A prior to any supplemental gesture recognizers being added to the set of gesture recognizers for an application, or one or more views of the application, and FIG. 6E shows an example of a corresponding gesture recognition hierarchy 600-B after to one or more supplemental gesture recognizers have been added to the set of gesture recognizers for the application, or one or more views of the application. In these examples, the standard gesture recognizers for the application, or application view, which are the gesture recognizers for the application or application view prior to any supplemental gesture recognizers being added (e.g., gesture recognizers added to the view by the application itself to support various interactions with the application), include a long press gesture recognizer (LongPress GR), for recognizing a touch gesture based on the duration of touch without substantial lateral movement (e.g., for triggering display of a menu such as the menu displayed in FIG. 5C when a long press gesture is detected on Object 4), and an intensity-based gesture recognizer (Intensity-Based GR) for recognizing a touch gesture based on the intensity of the touch gesture satisfying a predefined intensity threshold (e.g., for triggering display of an expanded view of content corresponding to Object 4 when a deep press gesture that satisfies the predefined intensity threshold is detected on Object 4). In the example shown in FIG. 6E, the supplemental gesture recognizers added to the set of gesture recognizers for the application include a drag start gesture recognizer (DragStart GR), for recognizing a draft start gesture (e.g., for detecting a drag gesture as shown in FIG. 5D where Object 4 is dragged in response to movement of Touch 1).

As shown in FIG. 6D, gesture recognition hierarchy 600-A indicates that, prior to any supplemental gesture recognizers being added to the set of gesture recognizers for an application or application view, the long press gesture recognizer is failure dependent on the intensity-based gesture recognizer. In some embodiments the fact that the long press gesture recognizer is failure dependent on the intensity-based gesture recognizer means that, unless the intensity-based gesture recognizer fails to recognize an intensity-based a touch input (e.g., a deep press), the long press gesture recognizer is unable to recognize that touch input. In some embodiments, the fact that the long press gesture recognizer is failure dependent on the intensity-based gesture recognizer means that, when the intensity-based gesture recognizer recognizes an intensity-based a touch input (e.g., a deep press), the long press gesture recognizer is unable to recognize that touch input. Upon failure of the intensity-based gesture recognizer to recognize a touch input, the long press gesture recognizer is enabled to allowed to try to recognize the touch input. In some embodiments, this dependency is implemented by listing the intensity-based gesture recognizer in the wait-for list 127 (FIG. 3C) of the long press gesture recognizer.

As shown in FIG. 6E, gesture recognition hierarchy 600-B indicates that, after supplemental gesture recognizers have been added to the set of gesture recognizers for the application, the long press gesture recognizer is failure dependent on both the intensity-based gesture recognizer and the drag start gesture recognizer, where the drag start gesture recognizer is a supplemental gesture recognizer added to the set of gesture recognizers for the application or application view. In addition, the drag start gesture recognizer is failure dependent on the intensity-based gesture recognizer. As a result, the long press gesture recognizer is unable to recognize a touch input as a long press gesture until the intensity-based gesture recognizer has failed to recognize the touch input (e.g., as a deep press) and the drag start gesture recognizer has failed to recognize the touch input (e.g., as a drag gesture). In addition, the drag start gesture recognizer is unable to recognize a touch input as a drag start gesture until the intensity-based gesture recognizer has failed to recognize the touch input (e.g., as a deep press). In some embodiments, these failure dependencies are implemented by listing the intensity-based gesture recognizer and the drag start gesture recognizer in the wait-for list 127 (FIG. 3C) of the long press gesture recognizer, and by listing the intensity-based gesture recognizer in the wait-for list 127 (FIG. 3C) of the drag start gesture recognizer.

Drag and Drop Gesture Recognition

FIGS. 7A-7F are flow diagrams illustrating a method 700 of processing a touch detected by an electronic device, including determining if the touch corresponds to a drag gesture (sometimes called a drag and drop gesture), and processing the touch in accordance with that determination, in accordance with some embodiments. The method 700 is performed at an electronic device (e.g., device 300, FIG. 3, or portable multifunction device 100, FIG. 1) with a display, a touch-sensitive surface, and optionally one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to process a touch, detected by a device, that may or may not be a drag gesture. The method reduces the number, extent, and/or nature of the inputs from a user when the user intends to drag one or more objects from a first application view or region to another application view or region, thereby creating a more efficient human-machine interface. For battery-operated electronic devices, enabling a user to perform drag and drop operations faster and more efficiently conserves power and increases the time between battery charges.

The device displays (702), on its display, a user interface for a first application that includes a plurality of user interface objects. While displaying the user interface for the first application, the device receives (704), at the first application, information (e.g., one or more touch events) that describes a first touch detected at a location on the touch-sensitive surface that corresponds to a respective user interface object of the plurality of user interface objects in the first application. For example, the first touch may be Touch1 shown in FIG. 5B.

In response (706) to receiving the information that describes the first touch, and in accordance with a determination (e.g., by the first application) that the first touch meets predefined criteria associated with initiating a respective type of interface operation (e.g., a drag and drop operation, also sometimes called a drag operation): the device initiates (708) a user interface operation (e.g., a first user interface operation) of the respective type involving the respective user interface object.

In some embodiments, the predefined criteria associated with initiating a respective type of interface operation are criteria associated with initiating a drag operation, sometimes referred to as drag criteria. In some embodiments, the drag criteria include a timing criterion (e.g., a first criterion) that is met when the user input remains on the touch-sensitive surface for at least a predefined time period, and a detected intensity of the user input remains below an intensity threshold during the predefined time period (e.g., long press criteria). In some embodiments, the drag criteria include a lateral displacement criterion (e.g., a second criterion) that is met when a detected lateral displacement of the user input satisfies (e.g., meets, or exceeds) a lateral displacement threshold. In some embodiments, the drag criteria require that the timing criterion be met before the lateral displacement criterion is met (e.g., for an input to satisfy the drag criteria, the input must first satisfy the timing criterion, and then satisfy the lateral displacement criterion).

Method 700 further includes, while the first touch continues to be detected on the touch-sensitive surface and while the user interface operation involving the respective user interface object continues (710), receiving (712), at the first application, instructions to ignore the first touch with respect to user interface operations other than the respective type of interface operation (e.g., a drag, drop or springloading operation); and ignoring (714), by the first application, the first touch with respect to user interface operations other than the respective type of interface operation. For example, ignoring, by the first application, the first touch is implemented by ceasing processing of the first touch, optionally in response to a touch cancel event. Thus, the first touch is treated as a cancelled touch even though the user interface operation involving the user interface object continues. In some embodiments, the first application ceases to process (e.g., stops receiving information about) the first touch with respect to user interface operations other than the respective type of interface operation.

In some embodiments, while detecting the first touch and prior to determining that the first touch meets the predefined criteria associated with initiating the respective type of interface operation, the method includes processing the touch using one or more gesture recognizers associated with user interface operations other than the respective type of interface operation. In some embodiments, initiating the user interface operation of the respective type involving the respective user interface object includes processing the touch using a gesture recognizer associated with the respective type of interface operation (e.g., a drag gesture recognizer that is used for processing drag inputs on the touch-sensitive surface). In some embodiments, there are multiple instances of a gesture recognizer. For example, the first touch is processed using an instance of the drag gesture recognizer.

In some embodiments, method 700 includes, prior to determining (e.g., by the system drag management process) that the first touch meets the predefined criteria associated with initiating the respective type of interface operation, processing (720) the first touch as a view-attached touch event, and in accordance with the determination that the first touch meets the predefined criteria associated with initiating the respective type of interface operation, processing (722) the first touch as a detached touch event (e.g., by initiating the user interface operation of the respective type). Initially processing touch inputs as view-attached touch events provides consistency in the processing of touch inputs, and enabling the user to control views to which touch inputs are directed provides a more intuitive interface for controlling the user interface. Processing touch inputs as detached touch events after determining that the touch inputs meet predefined criteria associated with particular operations provides flexibility in processing touch inputs for performing the particular operations while enabling the device to continue receiving and processing additional touch inputs as normal touches to perform additional operations in the meantime. Providing more consistent and intuitive control options, while providing the flexibility to receive and process multiple touch inputs at a time reduces the number of inputs needed to perform an operation, enhances the operability of the device, and makes the user-device interface more efficient (e.g., by helping the user to provide inputs that more quickly achieve intended results and reducing user mistakes when operating/interacting with the device), which, additionally, reduces power usage and improves battery life of the device by enabling the user to use the device more quickly and efficiently.

In some embodiments, method 700 further includes, prior to determining (e.g., by the system drag management process) that the first touch meets the predefined criteria associated with initiating the respective type of interface operation, processing (724) the first touch using one or more gesture recognizers associated with the first application (e.g., "standard gesture recognizers," discussed above with reference to FIGS. 5D, 5I, 5O and 6D-6E) as a view-attached touch event; and, in accordance with the determination that the first user input satisfies the predefined criteria associated with initiating the respective type of interface operation (726): ceasing (728) to process the first touch using the one or more gesture recognizers associated with the first application as a view-attached touch event; and processing (730) the first touch as a detached touch event. For example, in some embodiments, detached touches are processed using a drag gesture recognizer. Processing view-attached touch inputs using gesture recognizers associated with an application, and ceasing to process touch inputs using those gesture recognizers after determining that the touch inputs meet predefined criteria associated with particular operations makes the gesture recognizers available to process additional touch inputs. Providing additional capability to process touch inputs enhances the operability of the device, and makes the user-device interface more efficient (e.g., by helping the user to provide inputs that more quickly achieve intended results and reducing user mistakes when operating/interacting with the device), which, additionally, reduces power usage and improves battery life of the device by enabling the user to use the device more quickly and efficiently.

In some embodiments, method 700 includes detecting (732) movement of the first touch outside of a region corresponding to the user interface for the first application. For example, as shown in FIGS. 5D and 5E, a first touch moves from a user interface region of Application A to a user interface region of Application B. In such embodiments, method 700 also includes, in response to receiving (734) the information that describes the first touch, in accordance with a determination (e.g., by the first application) that the first touch did not meet the predefined criteria associated with initiating the respective type of interface operation (e.g., the first touch was not identified as part of a drag operation during the initial portion of the gesture), continuing (736) to provide (e.g., by a system process distinct from the first application) information that describes the first touch to the first application even after the first touch moves outside of the region corresponding to the user interface for the first application and into the region corresponding to the user interface for the second application. For example, in the example shown in FIGS. 5I, 5J and 5K, information regarding Touch2 would continue to be provided to Application A, even after Touch2 moves outside the region corresponding to the user interface for Application A and into the region corresponding to the user interface for Application B.

In some embodiments, the first touch is processed using a hit view determined based on an initial contact location of the first touch, independent of movement of the first touch (e.g., even if the first touch moves to a location on the touch-sensitive surface that corresponds to a location in the user interface that is outside of the hit view).

In such embodiments, method 700 further includes, in response to receiving (734) the information that describes the first touch, in accordance with the determination that the first touch meets (738) the predefined criteria associated with initiating the respective type of interface operation (e.g., the first touch is identified as part of a drag operation during the initial portion of the gesture): providing (740) (e.g., by a system process distinct from the first application) information that describes the first touch to the first application while the first touch is within the region corresponding to the user interface for the first application; and switching (742) to providing information that describes the first touch to the second application (e.g., instead of the first application) when the first touch moves outside of the region corresponding to the user interface for the first application into the region corresponding to the user interface for the second application. Thus, operations 740 and 742 correspond to the processing of detached touches.

In some embodiments that perform operations 734-742, method 700 includes, while detecting movement of the first touch, and in accordance with the determination that the first touch meets (738) the predefined criteria associated with initiating the respective type of interface operation: determining (744) one or more respective regions corresponding to respective locations of the first touch, wherein the one or more respective regions are associated with one or more respective applications, and providing (746) information that describes the first touch to the respective application for a respective region while the first touch is within the respective region. For example, as the touch input moves along the touch-sensitive surface, the device performs repeated hit region testing to determine the respective hit views for respective locations of the touch input. In some embodiments, the respective hit views are determined at predefined time intervals (sampling intervals for the touch input). In some embodiments, the predefined time intervals occur in sequence at a rate of 10 or more time intervals per second. In some embodiments, the respective hit views correspond to different applications in a plurality of applications, such as Application A and Application B in FIGS. 5A-5R. For example, a first hit view corresponding to a first location of the first user input is in a first application (e.g., Application A, FIGS. 5A-5R), and a second hit view corresponding to a second location of the first user input is in the second application (e.g., Application B, FIGS. 5A-5R) distinct from the first application.

In some embodiments that perform operations 734-742, method 700 includes, in accordance with the determination that the first touch meets (738) the predefined criteria associated with initiating the respective type of interface operation, providing (748) the information that describes the first touch to the respective application for a respective region in conjunction with providing information that describes one or more additional touches that do not meet the predefined criteria associated with initiating the respective type of interface operation. For example, in some embodiments, information about detached touches (e.g., the first touch) and information about normal, view-attached touches (e.g., the one or more additional touches) are provided to the respective application in a same data structure (e.g., a data structure having one or more lists of touches, which is received and processed (e.g., by the first application) in the same processing frame).

In some embodiments, method 700 further includes, while the user interface operation involving the respective user interface object continues (e.g., while a drag operation continues, for example as shown in FIGS. 5I and 5J), receiving (750) information (e.g., information regarding one or more touch events) that describes a change in a second touch on the touch-sensitive surface at a location that corresponds to the first application (e.g., Touch2 in FIGS. 5I and 5J); and in response to detecting the change in the second touch, processing (752) the information that describes the change in the second touch using one or more gesture recognizers associated with the first application without regard to the first touch. It is noted that the second touch may be detected prior to, concurrently with, or subsequent to detecting the first touch. In such embodiments, the second touch is not affected by first touch so long as it does not satisfy special-case criteria, such as drag-add criteria.

In some embodiments, while the user interface operation involving the respective user interface object continues, the first application receives information (e.g., one or more touch events) that describes a second touch (e.g., a second touch detected prior to, concurrently with, or subsequent to detecting the first touch) on the touch-sensitive surface at a location that corresponds to the first application; and in response to detecting the second touch, process the information that describes the second touch without regard to whether the first touch meets the predefined criteria associated with initiating the respective type of interface operation. For example, the first application processes current and/or future touches while continuing to detect the first touch as a drag operation.

In some embodiments, while the first touch continues to be detected on the touch-sensitive surface and while the user interface operation involving the respective user interface object continues (e.g., while a drag operation continues), method 700 includes receiving (754), at the first application, information that describes a second touch distinct from the first touch (e.g., the second touch is detected at a location on the touch-sensitive surface that corresponds to a second respective user interface object of the plurality of user interface objects in the first application, for instance as shown in FIGS. 5I and 5J; furthermore, the second touch is detected while the first touch continues to be detected). In these embodiments of method 700, in response (756) to receiving the information that describes the second touch, and in accordance with a determination (e.g., by the first application) that the second touch meets predefined add criteria (sometimes herein called drag add criteria) associated with the user interface operation (e.g., criteria for adding a user interface object to a drag operation), method 700 includes receiving (758), at the first application, instructions to ignore (e.g., cease processing of) the second touch with respect to user interface operations other than the respective type of interface operation (e.g., drag, drop, or springloading operations); and ignoring (760), by the first application, the second touch with respect to user interface operations other than the respective type of interface operation (e.g., treating the second touch as a cancelled touch with respect to user interface operations other than drag and drop operations, even though the user interface operation involving the user interface object, such as a drag operation, continues). In some embodiments, method 700 includes processing the second touch in accordance with the user interface operation involving the respective user interface object.

In some embodiments in which method 700 includes operation 760, the predefined add criteria include (762) a criterion that is met when a distance between the first touch (e.g., corresponding to a drag operation) and the second touch (e.g., for adding an object to the drag operation) is less than a predefined proximity threshold. Optionally, the predefined add criteria require, when liftoff of the second touch is detected, that the distance between the first touch and the second touch is less than the predefined proximity threshold.

As briefly explained above with reference to FIGS. 5O and 5P, two separate drag operations can be performed at the same time. In some embodiments, method 700 includes, while displaying the user interface for the first application, receiving (764), at the first application, information (e.g., one or more touch events) that describes a third touch (e.g., distinct from the first touch) detected at a location on the touch-sensitive surface that corresponds to a third respective user interface object of the plurality of user interface objects in the first application. In such embodiments, method 700 further includes, in response to receiving the information that describes the third touch, and in accordance with a determination (e.g., by the first application) that the third touch meets the predefined criteria associated with initiating the respective type of interface operation (e.g., drag, drop or springloading): initiating (768) a second user interface operation (e.g., distinct from the (first) user interface operation) of the respective type involving the third respective user interface object.

Furthermore, such embodiments of method 700 include, while the third touch continues to be detected on the touch-sensitive surface and while the second user interface operation involving the third respective user interface object continues (770): receiving (772), at the first application, instructions to ignore (e.g., cease processing of, optionally in response to a touch cancel event) the third touch with respect to user interface operations other than the respective type of interface operation (e.g., drag, drop or springloading); and ignoring (774), by the first application, the third touch with respect to user interface operations other than the respective type of interface operation. For example, the third touch is treated as a cancelled touch even though the user interface operation involving the third user interface object continues. In some embodiments, the third touch is detected while detecting the first touch. In some embodiments, the second user interface operation (e.g., a second drag operation) is distinct from the first user interface operation (e.g., a first drag operation), as shown in FIGS. 5O and 5P, in which two separate drag operations are performed at the same time.

In some embodiments, method 700 includes, in response to receiving the information that describes the first touch, determining (776), by the first application, whether the first touch meets the predefined criteria associated with initiating the respective type of interface operation. For example, method 700 optionally includes determining whether gesture recognition criteria associated with a respective gesture recognizer are met. In some embodiments, either a system process or the first application determines whether a touch should be detached. For example, with reference to FIGS. 5B, 5C and 5D, a touch (e.g., Touch1, initially received in FIG. 5B) can be determined to satisfy drag start criteria, in which case the touch is detached, as shown in FIG. 5D, or not satisfy the drag start criteria, in which case the touch is processed as an attached touch, as shown in FIG. 5C. As shown in FIG. 6C, in some embodiments, the determination of whether to detach a touch is made by a system process, such as a system touch management process, which corresponds to hit view determination module 314 (FIG. 3B). Alternatively, the determination of whether to detach a touch is made by an application having a user interface region corresponding to the initial location of the touch.

In some embodiments, the instructions received at the first application to ignore the first touch with respect to user interface operations other than the respective type of interface operation include a touch cancel event (778). For example, see the touch cancel event shown in FIG. 6A, and the associated discussion, above. In some embodiments, method 700 includes sending instructions to ignore the first touch with respect to user interface operations other than the respective type of user interface operation to a plurality of applications, including the first application, that are receiving, or have received, information describing the first touch (e.g., any applications that are then-currently monitoring ("listening" to) the first touch. In some embodiments, the plurality of applications includes a home screen application (sometimes called "SpringBoard") that monitors touches even while the home screen application is not actively displayed.

In some embodiments, method 700 includes, in response to receiving the touch cancel event, forgoing (780) performance of user interface operations (e.g., use interface operations that involve the respective user interface object) other than the respective type of interface operation, and failing to recognize (e.g., ceasing to attempt to recognize or cancelling attempted recognition of) the first touch as a gesture other than one of a predefined set of gestures associated with the respective type of interface operation. For example, method 700 optionally cancels, or reverses, user interface behaviors, such as object transformations and/or animations, associated with operations other than drag and drop operations, and optionally sets gesture recognizers for gestures other than drag-and-drop-related gestures to a canceled state (or other terminal state) instead of a "gesture possible" state.

In some embodiments of method 700, initiating (708) a user interface operation of the respective type involving the respective user interface object (e.g., a drag operation for dragging the respective user interface object) includes providing (782), to the first application, a unique session identifier identifying the user interface operation of the respective type and the respective user interface object. For example, in FIG. 5D a session identifier has been assigned to the touch, Touch 1, that is initiating a drag operation involving Object4, which is a user interface object in the user interface 502 for Application A. In some embodiments, the session identifier (sometimes called a "session ID") identifies the drag operation and the content involved (being dragged) in the drag operation. In some embodiments, each drag operation has a unique session identifier (e.g., concurrent but distinct drag operations can be distinguished based on their respective session identifiers). For example, as shown in FIGS. 5O and 5P, two separate drag operations are being performed, and each has been assigned a distinct session ID.

In some embodiments of method 700, the unique session identifier is associated (784) with additional information about the drag operation, including one or more of: a total number of user interface objects, including the respective user interface object, involved in the user interface operation of the respective type, and one or more content types of user interface objects involved in the user interface operation of the respective type. For example, in some embodiments, the unique session identifier includes the additional information or the unique session identifier can be used to retrieve the information from the system drag management process or the application from which the drag operation originated. In some embodiments, if multiple drag operations are ongoing concurrently, the different drag operations have different identifiers, so that the drag operations can be tracked independently.

In some embodiments of method 700, the user interface operation of the respective type has (786) an associated operation phase value that describes a current phase of the user interface operation, and the phase value is selected from the group consisting of: exit, enter, and within. Phase values of the touches in drag events are discussed above with reference to FIG. 6A.

It should be understood that the particular order in which the operations in FIGS. 7A-7F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 700 described above with respect to FIGS. 7A-7F. For example, the association of interaction identifiers with different views to determine which supplemental gesture recognizers to add to a respective view, described below with reference to method 800, and the use of gesture recognition failure dependencies, described below with reference to method 900, are also applicable in an analogous manner to method 700. For brevity, these details are not repeated here.

The operations in the information processing methods described above are optionally implemented by running one or more functional modules in information processing apparatus such as general purpose processors (e.g., as described above with respect to FIGS. 1A and 3) or application specific chips.

The operations described above with reference to FIGS. 7A-7F are, optionally, implemented by components depicted in FIG. 1 or FIG. 3A. For example, initiating user interface operations, such as drag operations or springloading operations, and many of the other operations of method 700, is, optionally, implemented by contact/motion module 130 or it event recognizer modules 312.

Adding Supplemental Gesture Recognizers

FIGS. 8A-8E are flow diagrams illustrating a method 800 of processing a touch detected by an electronic device, including adding supplemental gesture recognizers to the view of an application so as to provide specialized processing for operations such as drag operations. Method 800 is performed at an electronic device (e.g., device 300, FIG. 3, or portable multifunction device 100, FIG. 1) with a display, a touch-sensitive surface, and optionally one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to process a touch, detected by a device, that may or may not be a drag gesture. The method reduces the computational load imposed on an electronic device by touch gestures and other user inputs, improves device responsiveness and thereby reduces latency. Reducing latency in responding to touch inputs also reduces mistaken inputs by users, such as duplicative or modified touch inputs made by the user while waiting for the device to respond to the user's earlier input(s). For example, such improvements reduce the number, extent, and/or nature of the inputs from a user when the user intends to drag one or more objects from a first application view or region to another application view or region, thereby creating a more efficient human-machine interface. For battery-operated electronic devices, enabling a user to perform drag and drop operations faster and more efficiently conserves power and increases the time between battery charges.

The device displays (802), on its display, a user interface including a plurality of views, including a first view that is associated with a first set of one or more standard gesture recognizers used to process touch inputs that are directed to the first view, and a second view that is associated with a second set of one or more standard gesture recognizers used to process touch inputs that are directed to the second view. One or more of the plurality of views (e.g., the first view and/or second view) are associated with a first interaction identifier (e.g., a drag, drop, or springloading interaction identifier) that indicates that a first set of one or more supplemental gesture recognizers can be added to the corresponding view (e.g., by an application independent-module).

As shown in FIGS. 5A-5R, the plurality of views may include user interface region 502 for Application A and user interface region 504 for Application B. Many of FIGS. 5A-5R indicate an example of the set of interaction identifiers associated with a view (e.g., interface region 502) of Application A or a view (e.g., interface region 504) of Application B. While these examples show both views being associated with drag, drop and springloading interaction identifiers, in some embodiments or circumstances, some views may be associated with fewer interaction identifiers (e.g., just the drag and drop interaction identifiers, or none of these interaction identifiers) than the examples shown in FIGS. 5A-5R, and furthermore some views may be associated with additional interaction identifiers (e.g., interaction identifiers for additional types of operations associated with particular multitouch gestures).

FIG. 3B shows that the view metadata 341 for a respective application view 317-2 includes interaction identifiers 347. Furthermore, the view metadata 341 for each view of a plurality of views 317 has its own set of interaction identifiers. In some embodiments, interaction identifiers associated with a particular view are flag values indicating which interaction identifiers of a predefined set of interaction identifiers are associated with (e.g., assigned to) that particular view. In some other embodiments, the interaction identifiers associated with a particular view are identifier values (e.g., alphanumeric or multi-bit values), and the set of interaction identifiers stored for that particular view indicate which interaction identifiers are associated with (e.g., assigned to) that particular view. When an application has multiple views, as is commonly the case, each view can be associated with a corresponding set of interaction identifiers, and some of the views can have different sets of associated interaction identifiers than other ones of the views.

In some embodiments, possible interactions (e.g., types of interactions) include a drag interaction (e.g., an object from a view may be picked up and dragged across the user interface), a drop interaction (e.g., an object being dragged across the user interface may be dropped onto a view), and a springloading interaction (e.g., while dragging an object across the user interface, hovering over the icon for a view may cause that view to open; in another example, hovering over an application icon on the home screen may cause the application itself to open, if the application icon view supports the springloading interaction; in another example, hovering over a folder icon may cause the folder to open; and in yet another example, hovering over an object may cause a control of the object, or a control associated with the object, to be activating or deactivated (e.g., by toggling a state of the control when predefined springloading criteria have been satisfied).

Continuing with the explanation of method 800, method 800 further includes detecting (804), via the touch-sensitive surface, a touch input at a location on the touch-sensitive surface that corresponds to a respective view of the plurality of views; and in response to detecting, via the touch-sensitive surface, the touch input (806): and (while continuing to detect the touch input) in accordance with a determination (808) that the touch input meets supplemental-gesture-recognizer addition criteria, wherein the supplemental-gesture-recognizer addition criteria include a criterion that is met when the respective view has the first interaction identifier: adding (810) the first set of one or more supplemental gesture recognizers associated with the first interaction identifier to the respective view; and processing (812) the touch input with the one or more supplemental gesture recognizers and the one or more standard gesture recognizers associated with the respective view. In some embodiments, the one or more supplemental gesture recognizers are attached to or associated with the respective view on the fly by the system, based on a determination of whether an object in the view supports a particular interaction, as determined by a drag, drop, or springloading interaction identifier for the respective view.

Method 800 further includes, in response to detecting the touch input (806), in accordance with a determination (814) that the touch input does not meet the supplemental-gesture-recognizer addition criteria, processing the touch input at the respective view (e.g., with the one or more standard gesture recognizers associated with the respective view or with one or more supplemental gesture recognizers associated with other interaction identifiers) without adding the first set of one or more supplemental gesture recognizers associated with the first interaction identifier to the respective view.

In some embodiments, method 800 includes detecting a sequence of touch inputs, including a first touch input that meets the supplemental-gesture-recognizer addition criteria, and including a second touch input, received after the first touch input, that does not meet the supplemental-gesture-recognizer addition criteria. The first touch input is processed in accordance with the aforementioned adding (a first set of one or more supplemental gesture recognizers) (810) and processing (with the first set of one or more supplemental gesture recognizers) (812) operations, while the second input is processed in accordance with the aforementioned processing (814) (without adding the first set of one or more supplemental gesture recognizers). In some embodiments, a view receives a touch event, and a determination is made as to whether the view supports the interaction associated with the touch event (e.g., a drag interaction, a drop interaction, or a springloading interaction). In some embodiments, a respective interaction identifier for a view specifies whether the view supports a respective interaction. For example, a view receives a touch event. If the view has a drag interaction identifier, indicating that the view allows for the addition of a drag gesture recognizer (e.g., by an application-independent module, such as the system drag management process) and that the view supports drag interactions, then a drag gesture recognizer is initiated and added to the view (e.g., in conjunction with the view receiving the touch event). In another example, a view receives a drag enter event. If the view has a drop interaction identifier, then a drop gesture recognizer is initiated and added to the view. In some embodiments, if the view has a springloading interaction identifier, then a springloading gesture recognizer is initiated and added to the view. In some embodiments, a single interaction identifier may be used to specify multiple interactions supported by the view (e.g., a single interaction identifier may specify that a view supports drop interactions and springloading interactions).

In some embodiments of method 800, the supplemental-gesture-recognizer addition criteria include (820) a criterion that is met when the touch input is a predetermined type of touch input (e.g., a touch begin for a drag interaction, or a detached touch enter for a springloading interaction or a drop interaction).

In some embodiments of method 800, the predetermined type of touch input is a detached touch entering the respective view (822). For example, FIGS. 5D and 5E show a touch input, Touch1, entering a view, interface region 504, of Application B; FIG. 6A shows the corresponding event is a drag event with the touch (or touch input) in the drag event having a phase value of "enter"; and FIG. 6C shows that the touch input entering the view of Application B results in the system touch management process detaching the touch, and thus when the touch input, Touch1, enters the view of Application B, the view receives a detached touch.

In some embodiments, method 800 further includes detecting (824) movement of the touch input outside of the respective view, and in response (826) to detecting the movement of the touch input outside of the respective view, and in accordance with a determination that the touch input is a detached touch exiting the respective view: removing (828) the first set of one or more supplemental gesture recognizers associated with the first interaction identifier from the respective view. For example, the removing of the one or more supplemental gesture recognizers is performed when the touch input meets supplemental-gesture-recognizer removal criteria, where the supplemental-gesture recognizer removal criteria include a criterion that is met when the touch input is a predetermined type of touch input, such as a detached touch, exiting the respective view. Removing the one or more supplemental gesture recognizers when supplemental-gesture-recognizer removal criteria are satisfied makes the electronic device more efficient, by avoiding processing touch inputs with gesture recognizers no longer needed to process such inputs, and thereby reduces latency in responding to touch inputs. In addition, reducing latency in responding to touch inputs reduces mistaken inputs by users, such as duplicative or modified touch inputs made by the user while waiting for the device to respond to the user's earlier input(s).

In some embodiments of method 800, or in some circumstances, the touch input corresponds to a drag interaction (830). For example, a drag interaction is an interaction in which an object from a view is picked up and dragged across the user interface(s) for one or more applications.

In some embodiments of method 800, the first interaction identifier is a drag interaction identifier (832). Furthermore, the first set of one or more supplemental gesture recognizers includes (834) a drag start gesture recognizer that includes, in order for a drag start gesture to be recognized: a requirement that a location of the touch input correspond to the respective view for at least a predefined period of time; and a requirement that, subsequent to the location of the touch input corresponding to the respective view for at least the predefined period of time, a change in location of the touch input satisfy a lateral displacement threshold (e.g., while continuing to detect the touch input).

In some such embodiments (as described above with respect to 832 and 834), method 800 further includes, in response to recognition of a drag start gesture, the device (e.g., the system drag management process or the application) performing (836) a drag start action in the user interface that indicates that the drag operation has started. For example, performance of the drag start action (836) may include moving the user interface object in accordance with movement of the contact, and/or animating a change in appearance of the user interface object, for example to give the appearance that the user interface object had been lifted in a z-direction from the displayed user interface.

In some embodiments, the drag start gesture recognizer includes one or more of the following requirements in order for a touch input to satisfy predefined drag start criteria:

1) a timing criterion that is met when the touch input is maintained on the touch-sensitive surface for at least a predefined time period;

2) an intensity requirement that is met when a detected intensity of the user input remains below an intensity threshold during the predefined time period (sometimes called long press criteria);

3) a lateral displacement criterion that is met when a detected lateral displacement of the user input satisfies (e.g., meets or exceeds) a lateral displacement threshold;

4) a requirement that the timing criterion be met before the lateral displacement criterion (e.g., for an input to satisfy the drag criteria, the input must first satisfy the timing criterion, and then satisfy the displacement criterion); and/or 5) a requirement that the touch input include a single contact, or a requirement that the touch input include two concurrent contacts (e.g., two distinct contacts detected concurrently) on the touch-sensitive surface.

Those of ordinary skill in the art will readily appreciate that the drag gesture recognizer may include other combinations of the aforementioned requirements (e.g., a single contact with a timing requirement and a lateral displacement requirement, or two contacts with a lateral displacement requirement but without a timing requirement, or various other such combinations).

In some embodiments of method 800, the first interaction identifier is a drag interaction identifier (832). Furthermore, the first set of one or more supplemental gesture recognizers includes (838) a drag add gesture recognizer that includes a requirement that the touch input include one or more contacts (e.g., a single contact, or two distinct contacts detected concurrently) whose locations correspond to the respective view in order for a drag add gesture to be recognized; and in response to the recognition of the drag add gesture, the device performs (840) a drag add start action in the user interface that indicates that the drag add operation has started.

In some embodiments, the drag add gesture recognizer includes a requirement that the touch input include two concurrent contacts and a requirement that the two concurrent contacts cease to be detected within a predefined period of time (e.g., a two-finger tap gesture). In some embodiments, the drag add gesture recognizer includes a requirement that the location of the touch input correspond to the respective view for at least the predefined period of time. In some other embodiments, the drag add gesture recognizer includes a requirement that the touch input include one or two concurrent contacts, cease to be detected within a predefined period of time (e.g., a one or two-finger tap gesture), and a requirement that the one or two concurrent contacts occur within a predefined distance of a prior touch input that has been recognized as a drag gesture, or within a predefined distance of an object being dragged by the prior touch input in a drag operation. In some embodiments, the drag start action includes animating a user interface object (e.g., corresponding to the touch input) as though the user interface object had been lifted in a z-direction from the displayed user interface.

In some embodiments of method 800, the touch input corresponds to a drop interaction (850). In some embodiments, a drop interaction occurs when an object, which has been dragged across the user interface(s) of one or more applications using a touch input recognized as a drag gesture, is dropped onto a view. An example of a drop interaction is discussed above with reference to FIGS. 5Q and 5R.

In some embodiments of method 800 in which the touch input corresponds to a drop interaction (850), the first interaction identifier is a drop interaction identifier (852), and the first set of one or more supplemental gesture recognizers includes (854) a drop gesture recognizer that includes a requirement that a location of the touch input when the touch input ceases to be detected corresponds to the respective view. In such embodiments, as described with respect to 852 and 854, method 800 includes, in response to the recognition (856) of the drop gesture, the device performing a drop action in the user interface that indicates that the drop operation has started. Optionally, the drop action includes animating (858) a user interface object (e.g., an object that was being dragged by the touch input) as though the user interface object had been lowered in a z-direction from above the displayed user interface into the displayed user interface.

In some embodiments of method 800, the touch input corresponds to a springloading interaction (860). In some embodiments, a springloading interaction occurs, after dragging an object across the user interface, hovering the dragged object over an icon for a view, which causes that view to open. In another example of a springloading interaction, hovering the dragged object over an application icon on the home screen causes the application itself to open, if the application icon view supports the springloading interaction. In another example of a springloading interaction, hovering the dragged object over a folder icon causes the folder to open and for a new view of the opened folder to be displayed. And in yet another example, hovering the dragged object over an object causes a control of the object, or a control associated with the object, to be activating or deactivated (e.g., by toggling a state of the control when predefined springloading criteria have been satisfied).

In some embodiments of method 800, in which the touch input corresponds to a springloading interaction (860), the first interaction identifier is a springloading interaction identifier (862), and the first set of one or more supplemental gesture recognizers includes (864) a springloading gesture recognizer that includes a requirement that a location of the touch input corresponds to the respective view for at least a predefined time period in order for a springloading gesture to be recognized. In such embodiments, method 800 further includes, in response to the recognition of the springloading gesture (866), the application performing (868) a springloading action that includes one or more of: activating a control (e.g., a control corresponding to the view) as though the control had been selected (e.g., tapped or clicked), and opening a container in which content can be stored (e.g., a folder or album). For example, FIGS. 5Q and 5R show an example of a springloading action (sometimes called a springloading operation), in which a first object, Object4, is moved over a container object (also called a folder), Object5, by a touch input, Touch 1, that is dragging the first object. Once the springloading gesture is recognized, the container object, Object5, is opened, and its contents are shown (FIG. 5R).

In some embodiments of method 800, the springloading gesture recognizer further includes a requirement that a velocity of the touch input across the touch-sensitive surface is below a predefined velocity threshold (870). For example, in the example shown in FIG. 5Q, the touch input (Touch 1) dragging the object, Object4, has a velocity at or close to zero, essentially hovering over Object5 while the user waits for Object5 to open in response to the springloading gesture.

In some embodiments of method 800 in which the input corresponds to a springloading interaction (e.g., where 860-870 are operative), method 800 includes, in accordance with a determination that a velocity of the touch input across the touch-sensitive surface satisfies the predefined velocity threshold, changing (872) an appearance of the respective view. For example, changing the appearance of the respective view includes displaying an indication (e.g., an animation of the object over which the touch input is hovering, or a change in color or thickness of an outer boundary or perimeter of the object, or a change in background color or blur or other displayed characteristic of the object) that the respective view supports the springloading interaction prior to recognizing the springloading gesture, or prior to performing the springloading operation. In some embodiments, as a result of the change in appearance, the respective view is displayed with a first transformation from its immediately prior visual appearance.

In some embodiments of method 800, the set of one or more standard gesture recognizers associated with the respective view are associated (872) with the respective view by an application that includes the respective view, and the first set of one or more supplemental gesture recognizers are added to the respective view by a system process (e.g., the system drag management process). For example, the application specifies the standard gesture recognizers associated with the respective view, while a system process specifies the supplemental gesture recognizers to be added to the respective view in accordance with the activity identifiers associated with the respective view and the satisfaction of respective triggering conditions associated with those activity identifiers, or alternatively, the satisfaction of triggering conditions associated with the set of the supplemental gesture recognizers corresponding to each of the activity identifiers for the respective view.

In some embodiments of method 800, method 800 includes detecting (884), via the touch sensitive surface, a second touch input at a second location on the touch-sensitive surface that corresponds to the respective view; and in response to detecting (886), via the touch-sensitive surface, the second touch input: in accordance with a determination that the second touch input meets (888) the supplemental-gesture-recognizer addition criteria, wherein the supplemental-gesture-recognizer addition criteria include a criterion that is met when the respective view has the first interaction identifier: adding (890) an instance of the first set of one or more supplemental gesture recognizers associated with the first interaction identifier to the respective view; and processing (892) the second touch input with the instance of the one or more supplemental gesture recognizers and the one or more standard gesture recognizers associated with the respective view. For example, the same set of operations performed on the first touch input when it meets the supplemental-gesture-recognizer addition criteria are performed with respect to a second touch input when it meets the supplemental-gesture-recognizer addition criteria. As discussed above, in some embodiments, separate session identifiers are associated with or assigned to each of the two touch inputs, for example as discussed above with respect to FIGS. 5O and 5P.

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 800 described above with respect to FIGS. 8A-8E. For example, the processing of touch inputs that meet predefined criteria as detached touches, using automatically added supplemental gesture recognizers to recognize drag, drop and springloading gestures, described above with reference to method 700, and the use of gesture recognition failure dependencies, described below with reference to method 900, are also applicable in an analogous manner to method 800. For brevity, these details are not repeated here.

The operations in the information processing methods described above are optionally implemented by running one or more functional modules in information processing apparatus such as general purpose processors (e.g., as described above with respect to FIGS. 1A and 3) or application specific chips.

The operations described above with reference to FIGS. 8A-8E are, optionally, implemented by components depicted in FIG. 1 or FIG. 3A. For example, initiating user interface operations, such as drag operations or springloading operations, and many of the other operations of method 800, is, optionally, implemented by contact/motion module 130 or it event recognizer modules 312.

Automatic Establishment of Failure Dependencies Between Gesture Recognizers

FIGS. 9A-9D are flow diagrams illustrating a method 900 of processing a touch detected by an electronic device, including establishing failure requirements between one or more supplemental gesture recognizers which provide specialized processing for operations such as drag operations, and one or more standard gesture recognizers, which are established by an application for handling touch inputs in one or more views of the application. Method 900 is performed at an electronic device (e.g., device 300, FIG. 3, or portable multifunction device 100, FIG. 1) with a display, a touch-sensitive surface, and optionally one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to process a touch, detected by a device, that may or may not be a drag gesture. The method reduces the computational load imposed on an electronic device by touch gestures and other user inputs, improves device responsiveness and thereby reduces latency and mistaken inputs by users. For example, such improvements reduce the number, extent, and/or nature of the inputs from a user when the user intends to drag one or more objects from a first application view or region to another application view or region, thereby creating a more efficient human-machine interface. For battery-operated electronic devices, enabling a user to perform drag and drop operations faster and more efficiently conserves power and increases the time between battery charges.

The device displays (902), on its display, a user interface of an application, and while displaying (904) the user interface of the application, detecting a user input (e.g., a touch input) that corresponds to a portion of the user interface of the application that is associated with a plurality of gesture recognizers, wherein: a first set of one or more standard gesture recognizers of the plurality of gesture recognizers were associated with (e.g., assigned to) the portion of the user interface by the application; a second set of one or more supplemental gesture recognizers in the plurality of gesture recognizers were associated with (e.g., assigned to) the portion of the user interface by a system process (e.g., an application independent process); and a first failure requirement involving a first standard gesture recognizer (e.g., in the first set of one or more standard gesture recognizers) and a first supplemental gesture recognizer (e.g., in the second set of one or more supplemental gesture recognizers) were associated with (e.g., assigned to) the portion of the user interface by the system process (e.g., the application independent process). Method 900 further includes, in response to detecting the user input, processing (906) the user input in accordance with the first standard gesture recognizer, the first supplemental gesture recognizer, and the first failure requirement. As discussed above with reference to FIGS. 6D and 6E, failure requirements between gesture recognizers can be represented by a gesture recognition hierarchy, such as hierarchy 600-A or 600-B.

In some embodiments of method 900, the first set of one or more (e.g., application-specified) standard gesture recognizers and the second set of one or more (e.g., system-process-specified) gesture recognizers are arranged in a gesture recognition hierarchy (908), and the first failure requirement includes a requirement that a first respective gesture recognizer fail in order for a second respective gesture recognizer to successfully recognize a gesture, wherein the first respective gesture recognizer is at a higher level in the gesture recognition hierarchy than the second respective gesture recognizer. For example, referring to the example shown in FIG. 6E, the first respective gesture recognizer (e.g., the intensity-based gesture recognizer) is a parent of the second respective gesture recognizer (e.g., the long press gesture recognizer) in a gesture recognition hierarchy 600-B, or stated another way, the second respective gesture recognizer (e.g., the long press gesture recognizer) is a child of the first respective gesture recognizer (the intensity-based gesture recognizer) in the gesture recognition hierarchy 600-B.

In some embodiments, one or more gesture recognizers (e.g., system-process-specified gesture recognizers) can be inserted into a gesture recognition hierarchy of an existing set of gesture recognizers (e.g., application-specified gesture recognizers). For example, the transition from the gesture recognition hierarchy 600-A of FIG. 6D to the gesture recognition hierarchy 60-B of FIG. 6E is caused by the insertion of the drag start gesture recognizer into the gesture recognition hierarchy 600-A of FIG. 6D. In some embodiments, a gesture recognizer can be added to the gesture recognition hierarchy at a level higher than an existing gesture recognizer in the hierarchy (e.g., the drag start gesture recognizer is inserted at a level higher than the long press gesture recognizer), such that processing a respective user input using the existing gesture recognizer requires that the added gesture recognizer fail to recognize the respective user input (e.g., in the scenario shown in FIG. 6E, the drag start gesture recognizer must fail in order for the long press gesture recognizer to recognize the respective user input).

In some embodiments, a gesture recognizer can be added to (e.g., inserted into) a gesture recognition hierarchy at a level between two existing gesture recognizers. For example, with respect to a gesture recognition hierarchy that does not include a drag start gesture recognizer (e.g., before adding a drag start gesture recognizer to the gesture recognition hierarchy), processing a long press gesture requires determining that an intensity-based gesture recognizer fail to recognize the gesture. In some embodiments, as shown in FIG. 6E, a drag start gesture recognizer is added to the hierarchy between the intensity-based gesture recognizer and the long press gesture recognizer (e.g., the long press gesture recognizer is lower than the drag start gesture recognizer, which in turn is lower than the intensity-based gesture recognizer). In some such embodiments (e.g., after adding the drag start gesture recognizer to the gesture recognition hierarchy), processing a long press gesture requires determining that the intensity-based gesture recognizer, and then the drag start gesture recognizer, both fail to recognize the user input (e.g., the user input corresponds to neither an intensity-based gesture nor a drag start gesture). In some embodiments, a gesture recognizer can be added to a gesture recognition hierarchy at a level lower than an existing gesture recognizer in the hierarchy, such that processing a respective user input using the added gesture recognizer requires that the existing gesture recognizer fail to recognize the respective user input (e.g., processing a drag start gesture requires the intensity-based gesture recognizer to fail to recognize the user input).

In some embodiments of method 900, the first failure requirement includes (910) a requirement that the first supplemental gesture recognizer fail to recognize a user input (e.g., a touch input) in order for the first standard gesture recognizer to successfully recognize a gesture. For example, in the example shown in FIG. 6E, the drag start gesture recognizer must fail for the long press gesture recognizer to succeed. In another example, not shown in FIG. 6E, the drag add gesture recognizer must fail in order for a tap gesture recognizer to succeed.

In some embodiments of method 900, the first supplemental gesture recognizer is a drag add gesture recognizer, and the first standard gesture recognizer is a tap gesture recognizer. See, for example, FIG. 6E.

In some embodiments of method 900, the drag add gesture recognizer includes (914), in order for a drag add gesture to be recognized, a requirement that the user input include a contact at a location that corresponds to a respective user interface element in the user interface, and liftoff of the contact within a predefined period of time (e.g., T4 in FIG. 5L). For example, in such embodiments, a user input recognized as a drag add gesture includes the same elements as a tap gesture. In some embodiments, the drag add gesture recognizer further includes a requirement that the user input include a second contact (e.g., a contact corresponding to a drag operation). In some embodiments, the drag add gesture recognizer further includes a requirement that a distance between the contact and the second contact be less than a predefined proximity threshold. For example, the respective user interface element is added, using a "tap" (e.g., a contact with liftoff), to an ongoing drag operation (e.g., the second contact). Optionally, the respective user interface element is added to a "nearby" ongoing drag operation (e.g., within the proximity threshold). For example, the sequence of FIGS. 5I, 5L shows a drag add gesture being performed by a second touch, Touch2, on Obect2, which results in Object2 being added to the drag operation corresponding to a first touch, Touch1. In FIGS. 5I and 5L, time $t_2$ corresponds to the time the second touch is first detected, and T4 corresponds to the aforementioned predefined time period, which is (or corresponds to) the maximum duration of the drag add gesture.

In some embodiments of method 900, processing (916) the user input in accordance with the first standard gesture recognizer, the first supplemental gesture recognizer, and the first failure requirement includes: in accordance with a determination (e.g., by the system process) that content associated with the respective user interface element (e.g., content of, or represented by, the respective user interface element) cannot be added to a drag operation, failing (918) to recognize the user input using the drag add gesture recognizer, and processing the user input using the tap gesture recognizer; and in accordance with a determination that the content associated with the respective user interface element can be added to the drag operation, recognizing (920) a drag add gesture and adding the content to the drag operation. In some embodiments, to make this determination, the system process queries the application to determine whether the application supports the addition of content (e.g., content associated with the respective user interface element) to drag operations (e.g., whether the application or application view that includes the respective user interface element supports drag interactions).

In some embodiments of method 900, the first supplemental gesture recognizer is a drag start gesture recognizer, and the first standard gesture recognizer is a long press gesture recognizer (922). Such embodiments are represented by, or at least consistent with the gesture recognizer hierarchy discussed above with reference to FIG. 6E.

In some embodiments of method 900, processing the user input in accordance with the first standard gesture recognizer, the first supplemental gesture recognizer, and the first failure requirement is performed in accordance with a determination that the device satisfies compact display criteria. For example, if the device (e.g., a smart phone) has a display size below a predefined threshold, the drag start gesture recognizer must fail before the long press gesture recognizer can recognize a gesture.

In some embodiments of method 900, in accordance with a determination that the device (e.g., a tablet computer) does not satisfy compact display criteria (926), the first failure requirement includes (928 (a requirement that successful recognition of the user input as a first gesture by the first standard gesture recognizer (e.g., long press) be canceled (e.g., subsequently ignored) in accordance with successful recognition of the user input as a second gesture by the first supplemental gesture recognizer (e.g., drag start). In such embodiments, processing (see 906) the user input in accordance with the first standard gesture recognizer, the first supplemental gesture recognizer, and the first failure requirement includes: recognizing (932), using the standard gesture recognizer, the user input as the first gesture (e.g., a long press gesture), and subsequent to recognizing the user input as the first gesture using the standard gesture recognizer (934): recognizing (936), using the supplemental gesture recognizer, the user input as the second gesture (e.g., a drag start gesture), and ceasing (938) to recognize the user input as the first gesture using the standard gesture recognizer (e.g., canceling the first (long press) gesture).

In some embodiments, recognizing (932), using the standard gesture recognizer, the user input as the first gesture (e.g., a long press gesture) includes, as shown in FIG. 5C, performing an operation in the user interface associated with the first gesture, such as displaying a menu of options in response to recognizing the long press gesture. In some embodiments, ceasing (938) to recognize the user input as the first gesture using the standard gesture recognizer optionally, but typically, includes ceasing to perform the operation associated with the first gesture. For example, in the example shown in FIG. 5C, ceasing to perform the operation associated with the first gesture includes ceasing to display the menu of options displayed (see FIG. 5C) in response to recognizing the long press gesture (e.g., the ceasing is shown in the transition from FIG. 5C to FIG. 5D). Furthermore, in some embodiments, recognizing (936), using the supplemental gesture recognizer, the user input as the second gesture (e.g., a drag start gesture) includes performing an operation in the user interface associated with the second gesture, such as displaying an animation of a user interface object being lifted in a z-direction from the user interface to indicate the start of a drag session, in response to recognizing a drag start gesture.

In some embodiments of method 900, the first failure requirement includes a requirement (940) that the first standard gesture recognizer fail in order for the first supplemental gesture recognizer to successfully recognize a gesture (e.g., an intensity-based gesture recognizer must fail for drag start gesture recognizer to succeed, as shown by the gesture recognizer hierarchy 600-B of FIG. 6E).

In some embodiments of method 900, such as embodiments consistent with requirement 940, the first standard gesture recognizer is (942) an intensity-based gesture recognizer (e.g., a gesture recognizer that requires a touch input to meet intensity criteria, such as a requirement that a characteristic intensity of the contact increase above an intensity threshold, in order for the gesture recognizer to successfully recognize the gesture), and the first supplemental gesture recognizer is a drag start gesture recognizer. See discussion of FIG. 6E above, which graphically depicts a corresponding gesture recognizer hierarchy 600-B.

In some embodiments of method 900, the first supplemental gesture recognizer (944) is a drag start gesture recognizer, and the drag start gesture recognizer includes, in order for a drag start gesture to be recognized: a requirement that the user input include a contact at a location that corresponds to a respective user interface element in the user interface for at least a predefined period of time; and a requirement that, subsequent to the location of the contact corresponding to the respective user interface element for at least the predefined period of time, a change in location of the contact satisfy a lateral displacement threshold (e.g., while continuing to detect the contact). In such embodiments, the touch input recognized as a drag start gesture initially remains at one location, typically on or over an object (e.g., Touch1 on Object4, FIG. 5D), for at least a predefined period of time before moving and satisfying a lateral displacement threshold (e.g., by laterally moving at least a certain number of pixels).

In some embodiments of method 900, the first supplemental gesture recognizer is a drag start gesture recognizer (946), and the drag start gesture recognizer includes, in order for a drag start gesture to be recognized: a requirement that the user input include two concurrent contacts (e.g., two distinct contacts detected concurrently, as shown in FIG. 5F), on the touch-sensitive surface, at locations that correspond to a respective user interface element in the user interface (e.g., Object4 in user interface region 502, FIG. 5F); and a requirement that changes in locations of the two concurrent contacts satisfy a lateral displacement threshold. In some embodiments, for user inputs that include two concurrent contacts on a user interface element, the drag start gesture recognizer does not include a requirement that the user input be detected for at least the predefined period of time. In such embodiments, the use of a two-finger input enables the user to start the lateral displacement phase of a drag gesture as soon as the two-finger input makes contact with the touch-sensitive surface. In some embodiments, the drag start gesture recognizer includes a requirement that the two concurrent contacts be maintained within a second predefined proximity threshold from each other (e.g., the two concurrent contacts move substantially together rather than away from each other).

In some embodiments of method 900, the first supplemental gesture recognizer is a drag add gesture recognizer (948), and the drag add gesture recognizer includes, in order for a drag add gesture to be recognized, a requirement that the user input include two concurrent contacts, at locations that correspond to a respective user interface element in the user interface, and liftoff of the two concurrent contacts within a predefined period of time (e.g., the user input is a two-finger tap gesture, instead of the one finger tap gesture discussed above with reference to FIGS. 5I and 5L). In some embodiments, the drag add gesture recognizer further includes a requirement that the user input include a third contact (e.g., corresponding to a drag operation, started before the drag add gesture). In some embodiments, the drag add gesture recognizer further includes a requirement that a distance from the third contact to a closest of the two contacts be less than a predefined proximity threshold. When these requirements are met, the respective user interface element is added, using the two-finger drag add gesture (e.g., the two concurrent contacts), to an ongoing drag operation (e.g., the third contact). Thus, the respective user interface element is added to a "nearby" ongoing drag operation (e.g., within the proximity threshold).

It should be understood that the particular order in which the operations in FIGS. 9A-9D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 900 described above with respect to FIGS. 9A-9D. For example, the association of interaction identifiers with different views to determine which supplemental gesture recognizers to add to a respective view, described above with reference to method 800, and the processing of touch inputs that meet predefined criteria as detached touches, using automatically added supplemental gesture recognizers to recognize drag, drop and springloading gestures, described above with reference to method 700, are also applicable in an analogous manner to method 900. For brevity, these details are not repeated here.

The operations in the information processing methods described above are optionally implemented by running one or more functional modules in information processing apparatus such as general purpose processors (e.g., as described above with respect to FIGS. 1A and 3) or application specific chips.

The operations described above with reference to FIGS. 7A-7F are, optionally, implemented by components depicted in FIG. 1 or FIG. 3A. For example, initiating user interface operations, such as drag operations or springloading operations, and many of the other operations of method 700, is, optionally, implemented by contact/motion module 130 or it event recognizer modules 312.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display and a touch-sensitive surface:
     displaying, on the display, a user interface of an application;
     while displaying the user interface of the application, detecting a user input that corresponds to a portion of the user interface of the application that is associated with a plurality of gesture recognizers; and
   in response to detecting the user input:
     in accordance with a determination that the user input corresponds to a first type of gesture, processing the user input in accordance with a first standard gesture recognizer, a first supplemental gesture recognizer, and a first failure requirement involving the first standard gesture recognizer and the first supplemental gesture recognizer, wherein:
       a first set of one or more standard gesture recognizers of the plurality of gesture recognizers were associated with the portion of the user interface by the application, the first set of one or more standard gesture recognizers including the first standard gesture recognizer;
       a second set of one or more supplemental gesture recognizers in the plurality of gesture recognizers were associated with the portion of the user interface by a system process, the second set of one or more supplemental gesture recognizers including the first supplemental gesture recognizer; and
       the first failure requirement involving the first standard gesture recognizer and the first supplemental gesture recognizer was associated with the portion of the user interface by the system process; and
     in accordance with a determination that the user input corresponds to a second type of gesture that is different from the first type of gesture, processing the user input in accordance with the first standard gesture recognizer without using the first supplemental gesture recognizer and the first failure requirement.

2. The method of claim 1, wherein the first set of one or more standard gesture recognizers and the second set of one or more supplemental gesture recognizers are arranged in a gesture recognition hierarchy, wherein the first failure requirement includes a requirement that a first respective gesture recognizer fail in order for a second respective gesture recognizer to successfully recognize a gesture, wherein the first respective gesture recognizer is at a higher level in the gesture recognition hierarchy than the second respective gesture recognizer.

3. The method of claim 1, wherein the first failure requirement includes a requirement that the first supplemental gesture recognizer fail in order for the first standard gesture recognizer to successfully recognize a gesture.

4. The method of claim 3, wherein the first supplemental gesture recognizer is a drag add gesture recognizer, and the first standard gesture recognizer is a tap gesture recognizer.

5. The method of claim 4, wherein the drag add gesture recognizer includes, in order for a drag add gesture to be recognized, a requirement that the user input include a contact, at a location that corresponds to a respective user interface element in the user interface, and liftoff of the contact within a predefined period of time.

6. The method of claim 5, wherein processing the user input in accordance with the first standard gesture recognizer, the first supplemental gesture recognizer, and the first failure requirement includes:
   in accordance with a determination that content associated with the respective user interface element cannot be added to a drag operation, failing to recognize the user input using the drag add gesture recognizer, and processing the user input using the tap gesture recognizer; and
   in accordance with a determination that the content associated with the respective user interface element can be added to the drag operation, recognizing a drag add gesture and adding the content to the drag operation.

7. The method of claim 3, wherein the first supplemental gesture recognizer is a drag start gesture recognizer, and the first standard gesture recognizer is a long press gesture recognizer.

8. The method of claim 7, wherein processing the user input in accordance with the first standard gesture recognizer, the first supplemental gesture recognizer, and the first failure requirement is performed in accordance with a determination that the electronic device satisfies compact display criteria.

9. The method of claim 1, wherein, in accordance with a determination that the electronic device does not satisfy compact display criteria:
   the first failure requirement includes a requirement that successful recognition of the user input as a first gesture by the first standard gesture recognizer be canceled in accordance with successful recognition of the user input as a second gesture by the first supplemental gesture recognizer; and
   processing the user input in accordance with the first standard gesture recognizer, the first supplemental gesture recognizer, and the first failure requirement includes:
     recognizing, using the first standard gesture recognizer, the user input as the first gesture; and
     subsequent to recognizing the user input as the first gesture using the first standard gesture recognizer:
       recognizing, using the first supplemental gesture recognizer, the user input as the second gesture; and
       ceasing to recognize the user input as the first gesture using the first standard gesture recognizer.

10. The method of claim 1, wherein the first failure requirement includes a requirement that the first standard gesture recognizer fail in order for the first supplemental gesture recognizer to successfully recognize a gesture.

11. The method of claim 10, wherein the first standard gesture recognizer is an intensity-based gesture recognizer, and the first supplemental gesture recognizer is a drag start gesture recognizer.

12. The method of claim 1, wherein the first supplemental gesture recognizer is a drag start gesture recognizer, and wherein the drag start gesture recognizer includes, in order for a drag start gesture to be recognized:
- a requirement that the user input include a contact at a location that corresponds to a respective user interface element in the user interface for at least a predefined period of time; and
- a requirement that, subsequent to the location of the contact corresponding to the respective user interface element for at least the predefined period of time, a change in location of the contact satisfy a lateral displacement threshold.

13. The method of claim 1, wherein the first supplemental gesture recognizer is a drag start gesture recognizer, and wherein the drag start gesture recognizer includes, in order for a drag start gesture to be recognized:
- a requirement that the user input include two concurrent contacts, on the touch-sensitive surface, at locations that correspond to a respective user interface element in the user interface; and
- a requirement that changes in locations of the two concurrent contacts satisfy a lateral displacement threshold.

14. The method of claim 1, wherein the first supplemental gesture recognizer is a drag add gesture recognizer, and wherein the drag add gesture recognizer includes, in order for a drag add gesture to be recognized, a requirement that the user input include two concurrent contacts, at locations that correspond to a respective user interface element in the user interface, and liftoff of the two concurrent contacts within a predefined period of time.

15. The method of claim 1, including:
in response to detecting the user input:
in accordance with the determination that the user input corresponds to the first type of gesture:
- associating, by the system process, the second set of one or more supplemental gesture recognizers including the first supplemental gesture recognizer with the portion of the user interface; and
- associating, by the system process, the first failure requirement involving the first standard gesture recognizer and the first supplemental gesture recognizer with the portion of the user interface.

16. The method of claim 15, including:
in response to detecting the user input:
in accordance with the determination that the user input corresponds to the second type of gesture:
- forgoing associating, by the system process, the second set of one or more supplemental gesture recognizers and the first failure requirement with the portion of the user interface.

17. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
- displaying, on the display, a user interface of an application;
- while displaying the user interface of the application, detecting a user input that corresponds to a portion of the user interface of the application that is associated with a plurality of gesture recognizers; and
- in response to detecting the user input:
  - in accordance with a determination that the user input corresponds to a first type of gesture, processing the user input in accordance with a first standard gesture recognizer, a first supplemental gesture recognizer, and a first failure requirement involving the first standard gesture recognizer and the first supplemental gesture recognizer, wherein:
    - a first set of one or more standard gesture recognizers of the plurality of gesture recognizers were associated with the portion of the user interface by the application, the first set of one or more standard gesture recognizers including the first standard gesture recognizer;
    - a second set of one or more supplemental gesture recognizers in the plurality of gesture recognizers were associated with the portion of the user interface by a system process, the second set of one or more supplemental gesture recognizers including the first supplemental gesture recognizer; and
    - the first failure requirement involving the first standard gesture recognizer and the first supplemental gesture recognizer was associated with the portion of the user interface by the system process; and
  - in accordance with a determination that the user input corresponds to a second type of gesture that is different from the first type of gesture, processing the user input in accordance with the first standard gesture recognizer without using the first supplemental gesture recognizer and the first failure requirement.

18. The electronic device of claim 17, wherein the first set of one or more standard gesture recognizers and the second set of one or more supplemental gesture recognizers are arranged in a gesture recognition hierarchy, wherein the first failure requirement includes a requirement that a first respective gesture recognizer fail in order for a second respective gesture recognizer to successfully recognize a gesture, wherein the first respective gesture recognizer is at a higher level in the gesture recognition hierarchy than the second respective gesture recognizer.

19. The electronic device of claim 17, wherein the first failure requirement includes a requirement that the first supplemental gesture recognizer fail in order for the first standard gesture recognizer to successfully recognize a gesture.

20. The electronic device of claim 19, wherein the first supplemental gesture recognizer is a drag add gesture recognizer, and the first standard gesture recognizer is a tap gesture recognizer.

21. The electronic device of claim 20, wherein the drag add gesture recognizer includes, in order for a drag add gesture to be recognized, a requirement that the user input include a contact, at a location that corresponds to a respective user interface element in the user interface, and liftoff of the contact within a predefined period of time.

22. The electronic device of claim 21, wherein processing the user input in accordance with the first standard gesture recognizer, the first supplemental gesture recognizer, and the first failure requirement includes:

in accordance with a determination that content associated with the respective user interface element cannot be added to a drag operation, failing to recognize the user input using the drag add gesture recognizer, and processing the user input using the tap gesture recognizer; and in accordance with a determination that the content associated with the respective user interface element can be added to the drag operation, recognizing a drag add gesture and adding the content to the drag operation.

23. The electronic device of claim 19, wherein the first supplemental gesture recognizer is a drag start gesture recognizer, and the first standard gesture recognizer is a long press gesture recognizer.

24. The electronic device of claim 23, wherein processing the user input in accordance with the first standard gesture recognizer, the first supplemental gesture recognizer, and the first failure requirement is performed in accordance with a determination that the electronic device satisfies compact display criteria.

25. The electronic device of claim 17, wherein:

in accordance with a determination that the electronic device does not satisfy compact display criteria:

the first failure requirement includes a requirement that successful recognition of the user input as a first gesture by the first standard gesture recognizer be canceled in accordance with successful recognition of the user input as a second gesture by the first supplemental gesture recognizer; and processing the user input in accordance with the first standard gesture recognizer, the first supplemental gesture recognizer, and the first failure requirement includes:

recognizing, using the first standard gesture recognizer, the user input as the first gesture; and subsequent to recognizing the user input as the first gesture using the first standard gesture recognizer:

recognizing, using the first supplemental gesture recognizer, the user input as the second gesture; and ceasing to recognize the user input as the first gesture using the first standard gesture recognizer.

26. The electronic device of claim 17, wherein the first failure requirement includes a requirement that the first standard gesture recognizer fail in order for the first supplemental gesture recognizer to successfully recognize a gesture.

27. The electronic device of claim 26, wherein the first standard gesture recognizer is an intensity-based gesture recognizer, and the first supplemental gesture recognizer is a drag start gesture recognizer.

28. The electronic device of claim 17, wherein the first supplemental gesture recognizer is a drag start gesture recognizer, and wherein the drag start gesture recognizer includes, in order for a drag start gesture to be recognized:

a requirement that the user input include a contact at a location that corresponds to a respective user interface element in the user interface for at least a predefined period of time; and a requirement that, subsequent to the location of the contact corresponding to the respective user interface element for at least the predefined period of time, a change in location of the contact satisfy a lateral displacement threshold.

29. The electronic device of claim 17, wherein the first supplemental gesture recognizer is a drag start gesture recognizer, and wherein the drag start gesture recognizer includes, in order for a drag start gesture to be recognized:

a requirement that the user input include two concurrent contacts, on the touch-sensitive surface, at locations that correspond to a respective user interface element in the user interface; and a requirement that changes in locations of the two concurrent contacts satisfy a lateral displacement threshold.

30. The electronic device of claim 17, wherein the first supplemental gesture recognizer is a drag add gesture recognizer, and wherein the drag add gesture recognizer includes, in order for a drag add gesture to be recognized, a requirement that the user input include two concurrent contacts, at locations that correspond to a respective user interface element in the user interface, and liftoff of the two concurrent contacts within a predefined period of time.

31. The electronic device of claim 17, wherein the one or more programs include instructions for:

in response to detecting the user input:

in accordance with the determination that the user input corresponds to the first type of gesture:

associating, by the system process, the second set of one or more supplemental gesture recognizers including the first supplemental gesture recognizer with the portion of the user interface; and associating, by the system process, the first failure requirement involving the first standard gesture recognizer and the first supplemental gesture recognizer with the portion of the user interface.

32. The electronic device of claim 31, wherein the one or more programs include instructions for:

in response to detecting the user input:

in accordance with the determination that the user input corresponds to the second type of gesture:

forgoing associating, by the system process, the second set of one or more supplemental gesture recognizers and the first failure requirement with the portion of the user interface.

33. A non-transitory computer readable storage medium storing one or more programs, the one or more programs comprising instructions, which when executed by an electronic device with a display, and a touch-sensitive surface, cause the electronic device to:

display, on the display, a user interface of an application;

while displaying the user interface of the application, detect a user input that corresponds to a portion of the user interface of the application that is associated with a plurality of gesture recognizers; and in response to detecting the user input:

in accordance with a determination that the user input corresponds to a first type of gesture, process the user input in accordance with a first standard gesture recognizer, a first supplemental gesture recognizer, and a first failure requirement involving the first standard gesture recognizer and the first supplemental gesture recognizer, wherein:

a first set of one or more standard gesture recognizers of the plurality of gesture recognizers were associated with the portion of the user interface by the application, the first set of one or more standard gesture recognizers including the first standard gesture recognizer;

a second set of one or more supplemental gesture recognizers in the plurality of gesture recognizers were associated with the portion of the user interface by a system process, the second set of one or more supplemental gesture recognizers including the first supplemental gesture recognizer; and the first failure requirement involving the first standard gesture recognizer and the first supplemental gesture recognizer was associated with the portion of the user interface by the system process; and in accordance with a determination that the user input corresponds to a second type of gesture that is different from the first type of gesture, process the user input in accordance with the first standard gesture recognizer without using the first supplemental gesture recognizer and the first failure requirement.

34. The non-transitory computer readable storage medium of claim 33, wherein the first set of one or more standard gesture recognizers and the second set of one or more supplemental gesture recognizers are arranged in a gesture recognition hierarchy, wherein the first failure requirement includes a requirement that a first respective gesture recognizer fail in order for a second respective gesture recognizer to successfully recognize a gesture, wherein the first respective gesture recognizer is at a higher level in the gesture recognition hierarchy than the second respective gesture recognizer.

35. The non-transitory computer readable storage medium of claim 33, wherein the first failure requirement includes a requirement that the first supplemental gesture recognizer fail in order for the first standard gesture recognizer to successfully recognize a gesture.

36. The non-transitory computer readable storage medium of claim 35, wherein the first supplemental gesture recognizer is a drag add gesture recognizer, and the first standard gesture recognizer is a tap gesture recognizer.

37. The non-transitory computer readable storage medium of claim 36, wherein the drag add gesture recognizer includes, in order for a drag add gesture to be recognized, a requirement that the user input include a contact, at a location that corresponds to a respective user interface element in the user interface, and liftoff of the contact within a predefined period of time.

38. The non-transitory computer readable storage medium of claim 37. wherein processing the user input in accordance with the first standard gesture recognizer, the first supplemental gesture recognizer, and the first failure requirement includes:

in accordance with a determination that content associated with the respective user interface element cannot be added to a drag operation, failing to recognize the user input using the drag add gesture recognizer, and processing the user input using the tap gesture recognizer; and in accordance with a determination that the content associated with the respective user interface element can be added to the drag operation, recognizing a drag add gesture and add the content to the drag operation.

39. The non-transitory computer readable storage medium of claim 35, wherein the first supplemental gesture recognizer is a drag start gesture recognizer, and the first standard gesture recognizer is a long press gesture recognizer.

40. The non-transitory computer readable storage medium of claim 39, wherein processing the user input in accordance with the first standard gesture recognizer, the first supplemental gesture recognizer, and the first failure requirement is performed in accordance with a determination that the electronic device satisfies compact display criteria.

41. The non-transitory computer readable storage medium of claim 33, wherein:

in accordance with a determination that the electronic device does not satisfy compact display criteria:

the first failure requirement includes a requirement that successful recognition of the user input as a first gesture by the first standard gesture recognizer be canceled in accordance with successful recognition of the user input as a second gesture by the first supplemental gesture recognizer; and processing the user input in accordance with the first standard gesture recognizer, the first supplemental gesture recognizer, and the first failure requirement includes:

recognizing, using the first standard gesture recognizer, the user input as the first gesture; and subsequent to recognizing the user input as the first gesture using the first standard gesture recognizer:

recognizing, using the first supplemental gesture recognizer, the user input as the second gesture; and ceasing to recognize the user input as the first gesture using the first standard gesture recognizer.

42. The non-transitory computer readable storage medium of claim 33, wherein the first failure requirement includes a requirement that the first standard gesture recognizer fail in order for the first supplemental gesture recognizer to successfully recognize a gesture.

43. The non-transitory computer readable storage medium of claim 42, wherein the first standard gesture recognizer is an intensity-based gesture recognizer, and the first supplemental gesture recognizer is a drag start gesture recognizer.

44. The non-transitory computer readable storage medium of claim 33, wherein the first supplemental gesture recognizer is a drag start gesture recognizer, and wherein the drag start gesture recognizer includes, in order for a drag start gesture to be recognized:

a requirement that the user input include a contact at a location that corresponds to a respective user interface element in the user interface for at least a predefined period of time; and a requirement that, subsequent to the location of the contact corresponding to the respective user interface element for at least the predefined period of time, a change in location of the contact satisfy a lateral displacement threshold.

45. The non-transitory computer readable storage medium of claim 33, wherein the first supplemental gesture recognizer is a drag start gesture recognizer, and wherein the drag start gesture recognizer includes, in order for a drag start gesture to be recognized:

a requirement that the user input include two concurrent contacts, on the touch-sensitive surface, at locations that correspond to a respective user interface element in the user interface; and a requirement that changes in locations of the two concurrent contacts satisfy a lateral displacement threshold.

46. The non-transitory computer readable storage medium of claim 33, wherein the first supplemental gesture recognizer is a drag add gesture recognizer, and wherein the drag add gesture recognizer includes, in order for a drag add gesture to be recognized, a requirement that the user input include two concurrent contacts, at locations that correspond to a respective user interface element in the user interface, and liftoff of the two concurrent contacts within a predefined period of time.

47. The non-transitory computer readable storage medium of claim 33, wherein the one or more programs include instructions that, when executed by the computer system, cause the computer system to:
> in response to detecting the user input:
>> in accordance with the determination that the user input corresponds to the first type of gesture:
>>> associate, by the system process, the second set of one or more supplemental gesture recognizers including the first supplemental gesture recognizer with the portion of the user interface; and
>>> associate, by the system process, the first failure requirement involving the first standard gesture recognizer and the first supplemental gesture recognizer with the portion of the user interface.

48. The non-transitory computer readable storage medium of claim 47, wherein the one or more programs include instructions that, when executed by the computer system, cause the computer system to:
> in response to detecting the user input:
>> in accordance with the determination that the user input corresponds to the second type of gesture:
>>> forgo associating, by the system process, the second set of one or more supplemental gesture recognizers and the first failure requirement with the portion of the user interface.

\* \* \* \* \*